United States Patent
Ato et al.

(10) Patent No.: US 9,791,701 B2
(45) Date of Patent: Oct. 17, 2017

(54) DISPLAY DEVICE

(71) Applicant: Sony Corporation, Tokyo (JP)

(72) Inventors: Masayuki Ato, Tokyo (JP); Akio Machida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/762,615

(22) PCT Filed: Jan. 23, 2014

(86) PCT No.: PCT/JP2014/000338
§ 371 (c)(1),
(2) Date: Jul. 22, 2015

(87) PCT Pub. No.: WO2014/129109
PCT Pub. Date: Aug. 28, 2014

(65) Prior Publication Data
US 2015/0370075 A1    Dec. 24, 2015

(30) Foreign Application Priority Data
Feb. 20, 2013 (JP) ................. 2013-030773

(51) Int. Cl.
*G02F 1/01* (2006.01)
*G02B 27/14* (2006.01)
*G02B 27/01* (2006.01)

(52) U.S. Cl.
CPC ....... *G02B 27/0172* (2013.01); *G02B 27/017* (2013.01); *G02F 1/0121* (2013.01); *G02B 2027/014* (2013.01); *G02B 2027/0118* (2013.01); *G02B 2027/0178* (2013.01)

(58) Field of Classification Search
CPC .............. G02B 27/0172; G02B 27/017; G02B 2027/014; G02B 2027/0118; G02B 2027/0178; G02F 1/0121
USPC .......... 359/240, 630, 880; 345/7, 8; 348/115
See application file for complete search history.

(56) References Cited

U.S. PATENT DOCUMENTS

| | | |
|---|---|---|
| 6,137,457 A | 10/2000 | Tokuhashi et al. |
| 7,924,506 B2 | 4/2011 | Rieger |
| 8,411,134 B2 | 4/2013 | Tomita |
| 8,570,242 B2 | 10/2013 | Chosokabe et al. |
| 8,797,433 B2 | 8/2014 | Kaizu et al. |
| 8,861,090 B2 | 10/2014 | Mukawa |
| 8,907,865 B2 | 12/2014 | Miyawaki et al. |
| 8,976,453 B2 | 3/2015 | Akutsu et al. |
| 8,988,315 B2 | 3/2015 | Mukawa et al. |
| 9,016,864 B2 | 4/2015 | Sasazaki et al. |
| 9,096,920 B1 | 8/2015 | Gomez et al. |

(Continued)

FOREIGN PATENT DOCUMENTS

| | | |
|---|---|---|
| CN | 1071262 A | 4/1993 |
| CN | 1774661 A | 5/2006 |

(Continued)

*Primary Examiner* — Tuyen Tra
(74) *Attorney, Agent, or Firm* — Wolf, Greenfield & Sacks, P.C.

(57) ABSTRACT

A display device comprising a first image display device comprising a light guide plate, a dimmer, and a light control device. The light control device is configured to identify a start time of change in quantity of light received by the display device, and control transmissivity of the dimmer based on quantity of light received by the display device, after a predetermined amount of time after the start time has elapsed.

15 Claims, 35 Drawing Sheets

(56) References Cited

U.S. PATENT DOCUMENTS

| | | |
|---|---|---|
| 9,164,221 B2 | 10/2015 | Akutsu et al. |
| 9,201,242 B2 | 12/2015 | Miyawaki et al. |
| 9,311,752 B2 | 4/2016 | Chosokabe et al. |
| 9,451,244 B2 | 9/2016 | Sasazaki et al. |
| 9,488,846 B2 | 11/2016 | Hayashi |
| 9,558,540 B2 | 1/2017 | Mukawa |
| 9,569,897 B2 | 2/2017 | Miyawaki et al. |
| 9,658,456 B2 | 5/2017 | Mukawa |
| 2006/0228073 A1 | 10/2006 | Mukawa et al. |
| 2007/0012925 A1 | 1/2007 | Hong et al. |
| 2007/0070859 A1 | 3/2007 | Hirayama |
| 2007/0091445 A1 | 4/2007 | Amitai |
| 2007/0159673 A1 | 7/2007 | Freeman et al. |
| 2008/0285140 A1 | 11/2008 | Amitai |
| 2010/0110368 A1 | 5/2010 | Chaum |
| 2010/0128107 A1 | 5/2010 | Tomita |
| 2010/0277687 A1 | 11/2010 | Shehadeh et al. |
| 2011/0090389 A1 | 4/2011 | Saito |
| 2011/0241975 A1 | 10/2011 | Mukawa et al. |
| 2011/0248905 A1 | 10/2011 | Chosokabe et al. |
| 2012/0044571 A1 | 2/2012 | Mukawa |
| 2012/0127434 A1 | 5/2012 | Sasazaki et al. |
| 2012/0194420 A1 | 8/2012 | Osterhout et al. |
| 2012/0212398 A1 | 8/2012 | Border et al. |
| 2012/0218426 A1 | 8/2012 | Kaizu et al. |
| 2012/0249895 A1 | 10/2012 | Kaifu |
| 2013/0113973 A1 | 5/2013 | Miao |
| 2013/0128611 A1 | 5/2013 | Akutsu et al. |
| 2013/0135749 A1 | 5/2013 | Akutsu et al. |
| 2013/0241948 A1 | 9/2013 | Kimura |
| 2013/0242555 A1 | 9/2013 | Mukawa |
| 2013/0300766 A1 | 11/2013 | Mukawa |
| 2014/0022284 A1 | 1/2014 | Chosokabe et al. |
| 2014/0253605 A1 | 9/2014 | Border et al. |
| 2014/0334010 A1 | 11/2014 | Mukawa |
| 2014/0340286 A1 | 11/2014 | Machida et al. |
| 2014/0340550 A1 | 11/2014 | Kaizu et al. |
| 2015/0062699 A1 | 3/2015 | Hayashi |
| 2015/0109679 A1 | 4/2015 | Mukawa et al. |
| 2015/0138647 A1 | 5/2015 | Akutsu et al. |
| 2015/0226970 A1 | 8/2015 | Mukawa |
| 2015/0229897 A1 | 8/2015 | Mukawa |
| 2015/0235620 A1 | 8/2015 | Takahota et al. |
| 2015/0260994 A1 | 9/2015 | Akutsu et al. |
| 2015/0260995 A1 | 9/2015 | Mukawa |
| 2015/0277125 A1 | 10/2015 | Hirano et al. |
| 2015/0277126 A1 | 10/2015 | Hirano et al. |
| 2015/0288954 A1 | 10/2015 | Sasazaki et al. |
| 2015/0338660 A1 | 11/2015 | Mukawa |
| 2015/0346494 A1 | 12/2015 | Tanaka et al. |
| 2015/0362735 A1 | 12/2015 | Akutsu et al. |
| 2016/0041394 A1 | 2/2016 | Tanaka et al. |
| 2016/0062123 A1 | 3/2016 | Tanaka et al. |
| 2016/0097931 A1 | 4/2016 | Takahota et al. |
| 2016/0147069 A1 | 5/2016 | Tanaka et al. |
| 2016/0154243 A1 | 6/2016 | Aiki |
| 2017/0069140 A1 | 3/2017 | Mukawa |
| 2017/0115492 A1 | 4/2017 | Miyawaki et al. |

FOREIGN PATENT DOCUMENTS

| | | |
|---|---|---|
| CN | 1957269 A | 5/2007 |
| CN | 101141568 A | 3/2008 |
| CN | 103119512 A | 5/2013 |
| EP | 2 535 760 A2 | 12/2012 |
| EP | 2 662 723 A1 | 11/2013 |
| JP | 57-026822 A | 2/1982 |
| JP | 08-160340 A | 6/1996 |
| JP | 08-160344 A | 6/1996 |
| JP | 10-126711 A | 5/1998 |
| JP | 10-319240 A | 12/1998 |
| JP | 2000-171750 A | 6/2000 |
| JP | 2003-015075 | 1/2003 |
| JP | 2004-101197 A | 4/2004 |
| JP | 2004-191197 A | 7/2004 |
| JP | 2005-172851 A | 6/2005 |
| JP | 2005-308889 A | 11/2005 |
| JP | 2006-162767 A | 6/2006 |
| JP | 2006-209144 A | 8/2006 |
| JP | 2006-267887 A | 10/2006 |
| JP | 2006-308858 | 11/2006 |
| JP | 2006-343747 | 12/2006 |
| JP | 2007-094175 A | 4/2007 |
| JP | 2007-264324 A | 10/2007 |
| JP | 2008-085548 A | 4/2008 |
| JP | 2008-103916 A | 5/2008 |
| JP | 2009-104170 | 5/2009 |
| JP | 2010-145674 A | 7/2010 |
| JP | 2010-282231 A | 12/2010 |
| JP | 2012-013940 | 1/2012 |
| JP | 2012-088472 A | 5/2012 |
| JP | 2012-252091 A | 12/2012 |
| JP | 2013-005201 A | 1/2013 |
| JP | 2013-122519 A | 6/2013 |
| JP | 2013-210643 A | 10/2013 |
| JP | 2013-214856 A | 10/2013 |
| WO | WO 2005/093493 | 10/2005 |
| WO | WO 2006/085310 A1 | 8/2006 |
| WO | WO 2008/078320 A2 | 7/2008 |
| WO | WO 2010/087293 A1 | 8/2010 |

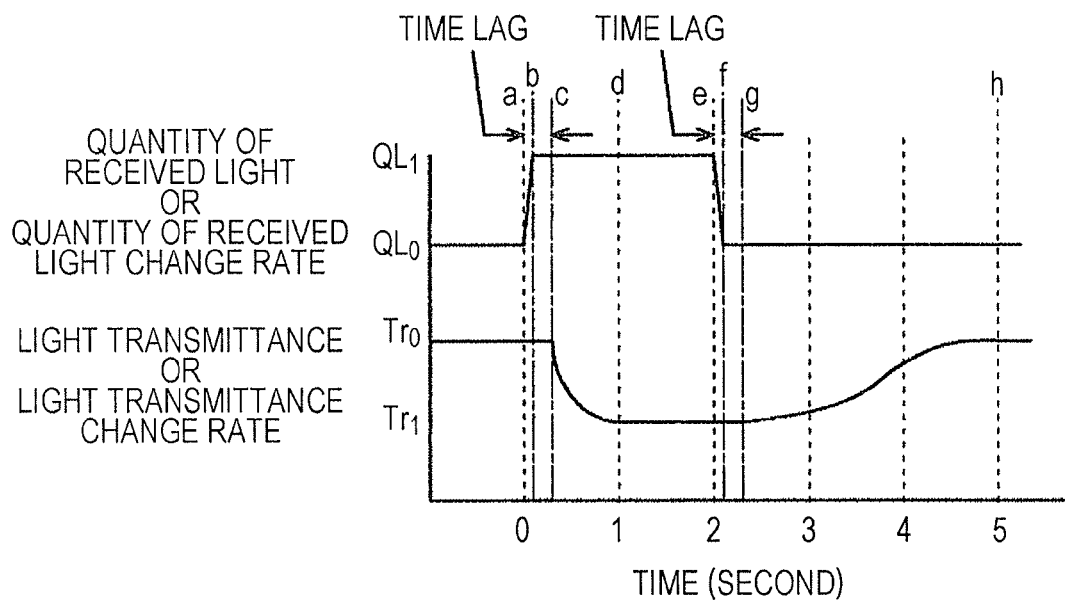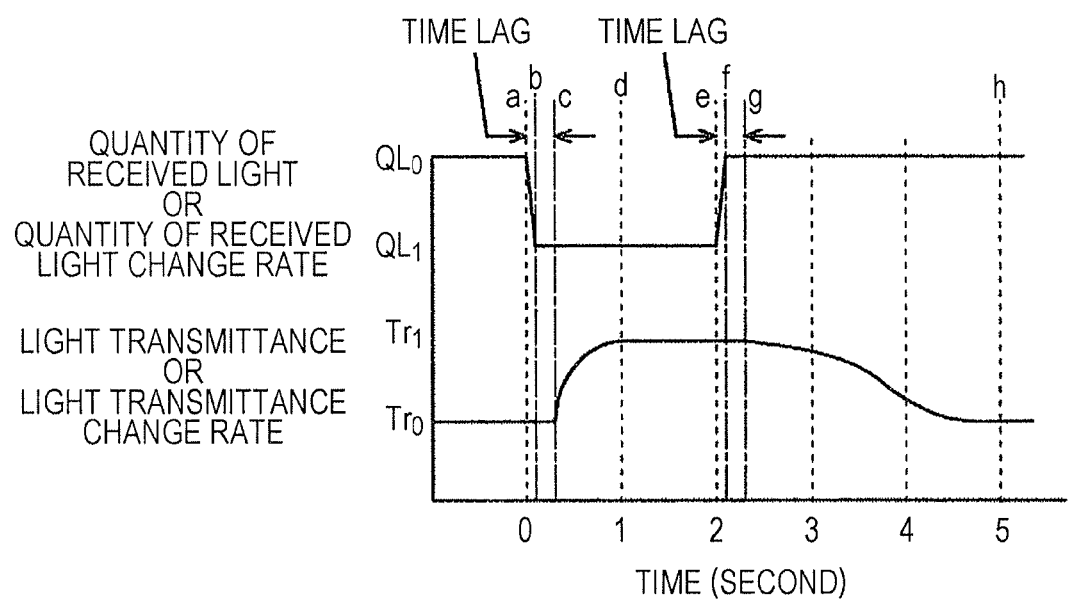

DISPLAY DEVICE

CROSS REFERENCE TO RELATED APPLICATIONS

This application claims the benefit of Japanese Priority Patent Application JP 2013-030773 filed on Feb. 20, 2013, the entire contents of which are incorporated herein by reference.

TECHNICAL FIELD

The present disclosure relates to a display device and more particularly, to a display device using a head-mounted display (HMD).

BACKGROUND ART

In recent years, an augmented reality technology (AR technology) has drawn attention, which combines virtual objects or various kinds of information as additional information and as electronic information with a real environment (or a portion thereof), and presents the combined information. To achieve the augmented reality technology, a head-mounted display has been examined as a device for presenting visual information, for example. The head-mounted display is expected to be applied for job support in the reality environment. For example, the head-mounted display may be applied for providing of route guidance information and of technical information to the engineer who performs maintenance, for example. In particular, the head-mounted display is very convenient since the hands are free. In addition, even when enjoying a video or an image while moving outdoors, the user can see the video or the image and an external environment at the same time. Therefore, the user can move smoothly.

For example, JP 2006-162767 A discloses a virtual image display device (image display device) in which a virtual image optical system changes a two-dimensional image formed by an image forming device into an enlarged virtual image such that the observer can observe the virtual image.

As illustrated in FIG. 34, which is a conceptual diagram, an image display device 100' includes an image forming device 111 including a plurality of pixels arranged in a two-dimensional matrix, a collimating optical system 112 that converts light emitted from the pixels of the image forming device 111 into parallel light, and an optical device (light guide unit) 120 on which the parallel light converted in the collimating optical system 112 is incident, in which the light is guided, and from which the light is emitted. The optical device 120 includes a light guide plate 121 in which incident light propagates while being totally reflected and from which the light is emitted, a first deflection unit 130 (for example, a single-layer light reflecting film) that reflects light incident on the light guide plate 121 so as to be totally reflected in the light guide plate 121, and a second deflection unit 140 (for example, a multi-layer light reflecting film having a multi-layer structure) that allows the light, which has propagated in the light guide plate 121 while being totally reflected, to be emitted from the light guide plate 121. For example, when an HMD is formed by the image display device 100', the weight and the size of the device can be reduced. Refer to the image display device according to Example 1 illustrated in FIG. 1 with regard to reference numerals denoting the other components illustrated in FIG. 34 are.

In addition, for example, JP 2007-94175 A discloses a virtual image display device (image display device) using a hologram diffraction grating in which a virtual image optical system changes a two-dimensional image formed by an image forming device into an enlarged virtual image such that the observer can observe the virtual image.

As illustrated in FIG. 35, which is a conceptual diagram, an image display device 300' basically includes an image forming device 111 that displays an image, a collimating optical system 112, and an optical device (light guide unit) 320, which light displayed on the image forming device 111 is incident on, and which guides the light to a pupil 21 of the observer. Here, the optical device 320 includes a light guide plate 321, and first and second diffraction grating members 330 and 340 that are reflective volume hologram diffraction gratings provided on the light guide plate 321. Light emitted from each pixel of the image forming device 111 is incident on the collimating optical system 112, and a plurality of parallel light with different incident angles to be incident on the light guide plate 321 is generated by the collimating optical system 112 and is then incident on the light guide plate 321. The parallel light is incident on a first surface 322 of the light guide plate 321, and is then emitted therefrom. Meanwhile, the first diffraction grating member 330 and the second diffraction grating member 340 are attached to a second surface 323 of the light guide plate 321 that is parallel to the first surface 322 of the light guide plate 321. Refer to the image display device according to Example 3 with reference to FIG. 12 with regard to reference numerals denoting the other components illustrated in FIG. 35.

When images are displayed on the image display devices 100' and 300', the observer can view the displayed image and an external image in an overlapped manner.

However, sufficiently high contrast may not be given to the image observed by the observer when the brightness of a surrounding environment in which the image display devices 100' and 300' are located is very high or depending on the content of the displayed image.

For example, JP 2004-101197 A discloses means for solving the problem. In the technology disclosed in JP 2004-101197 A, a liquid crystal shutter controls the quantity of incident light incident on the pupil of the observer from an outside.

CITATION LIST

Patent Literature

PTL 1: JP 2006-162767 A
PTL 2: JP 2007-94175 A
PTL 3: JP 2004-101197 A

SUMMARY

Technical Problem

When the quantity of incident light from an outside is suddenly changed, for example, when a vehicle in traveling is incident on a tunnel, the quantity of incident light from an outside is sharply decreased. Therefore, in the technology disclosed in JP 2004-101197 A, the liquid crystal shutter changes the state from being closed to some extent to be sharply opened. Therefore, it is difficult for the pupil of the observer to follow such a sharp operation of the liquid crystal shutter. Therefore, such a sharp operation not only provides the observer who wears the display device with an unpleasant feeling, but also provides the eyes with a substantial burden.

Further, when the liquid crystal shutter disclosed in JP 2004-101197 A is applied to the above-described image display device 100' or 300', problems like the following may be caused. That is, as a result of changing the quantity of incident light from an outside due to the operation of the liquid crystal shutter, there is a change in the quantity of light that is incident on the first deflection unit 130 or the first diffraction grating member 330 from an outside. Therefore, undesired stray light occurs, and a decrease in image display quality in the virtual image display device (image display device) may be caused. Furthermore, since a dimmer is installed to the virtual image display device (image display device), the overall weight of the virtual image display device (image display device) is increased, and this may provide the user of the virtual image display device (image display device) with an unpleasant feeling.

Therefore, a first objective of the present disclosure is to provide a display device that provides the observer who wears the display device with a less unpleasant feeling and that does not force the eyes to bear substantial burden even if the quantity of incident light from an outside is changed. Further, a second objective of the present disclosure is to provide a display device that does not cause a drop in image display quality due to incident light from an outside, in addition to the first objective of the present disclosure display device. Furthermore, a third objective of the present disclosure is to provide a display device having a configuration or a structure that may suppress an increase in overall weight, in addition to the first objective of the present disclosure.

Solution to Problem

Some embodiments are directed to a display device comprising a first image display device comprising a light guide plate, a dimmer, and a light control device. The light control device is configured to identify a start time of change in quantity of light received by the display device, and control transmissivity of the dimmer based on quantity of light received by the display device, after a predetermined amount of time after the start time has elapsed.

Some embodiments are directed to a method for use in connection with a display device comprising an image display device and a dimmer, the image display device comprising a light guide plate, the method comprising identifying a start time of change in quantity of light received by the display device, and controlling transmissivity of the dimmer based on quantity of light received by the display device, after a predetermined amount of time after the start time has elapsed.

Some embodiments are directed to at least one non-transitory computer-readable storage medium storing processor-executable instructions that, when executed by at least one processor, cause the at least one processor to perform a method for use in connection with a display device comprising an image display device and a dimmer, the image display device comprising a light guide plate. The method comprises identifying a start time of change in quantity of light received by the display device, and controlling transmissivity of the dimmer based on quantity of light received by the display device, after a predetermined amount of time after the start time has elapsed.

Advantageous Effects of Invention

In the display device according to the first embodiment of the present disclosure, the light control device calculates a quantity of received light change rate based on a quantity of received light measurement result of the light receiving element, determines a light transmittance change rate in the dimmer based on the quantity of received light change rate, and controls light transmittance of the dimmer based on the determined light transmittance change rate. Therefore, a display device that provides the observer who wears the display device with a less unpleasant feeling and that does not force the eyes to bear substantial burden can be provided even if the quantity of incident light from an outside is changed. Further, in the display device according to the second embodiment of the present disclosure, the light control device determines a start time of a change of a quantity of received light based on a quantity of received light measurement result of the light receiving element, and starts control of light transmittance of the dimmer after elapse of a predetermined time from the start time of the change of the quantity of received light. Therefore, a display device that provides the observer who wears the display device with a less unpleasant feeling and that does not force the eyes to bear substantial burden can be provided even if the quantity of incident light from an outside is changed. Furthermore, the light transmittance of the dimmer is controlled based on the quantity of received light measurement result of the light receiving element. Therefore, the overall structure of the display device can be simplified, and high contrast can be provided to an image observed by the observer. In addition, for example, an observation state of the image can be optimized depending on the illumination of surrounding environment of the display device.

In the display device according to the third or fourth embodiment of the present disclosure, the dimmer starts a change of light transmittance after elapse of a predetermined time from a start of a change of the quantity of light from an outside. Therefore, a display device that provides the observer who wears the display device with a less unpleasant feeling and that does not force the eyes to bear substantial burden can be provided even if the quantity of incident light from an outside is changed. In addition, in the display device according to the third embodiment of the present disclosure, a shielding member that shields incident light to the optical device is arranged in an area of the optical device on which the light emitted from the image forming device is incident. Therefore, even if there is a change in the quantity of incident light from an outside due to the operation of the dimmer, the light from an outside is not incident on the area of the optical device on which the light emitted from the image forming device is incident. Therefore, undesired stray light does not occur, and a decrease in image display quality in the display device is not caused. In addition, in the display device according to the fourth embodiment of the present disclosure, the first substrate that forms the dimmer also serves as a component member of the optical device. Therefore, the overall weight of the display device can be decreased, and there is little possibility to provide the user of the display device with an unpleasant feeling.

BRIEF DESCRIPTION OF DRAWINGS

FIGS. 6A and 6B are diagrams schematically illustrating a temporal change of a quantity of received light and the light transmittance of the dimmer.

FIGS. 18A and 18B are a diagram schematically illustrating propagation of light in a light guide plate that forms an image display device in a display device of Example 8, and a conceptual diagram illustrating an arrangement state of a light guide plate, and the like.

FIGS. 21A and 21B are a diagram schematically illustrating propagation of light in a light guide plate that forms an image display device in a display device of Example 9, and a conceptual diagram illustrating an arrangement state of the light guide plate, and the like.

DESCRIPTION OF EMBODIMENTS

Figure 1A:
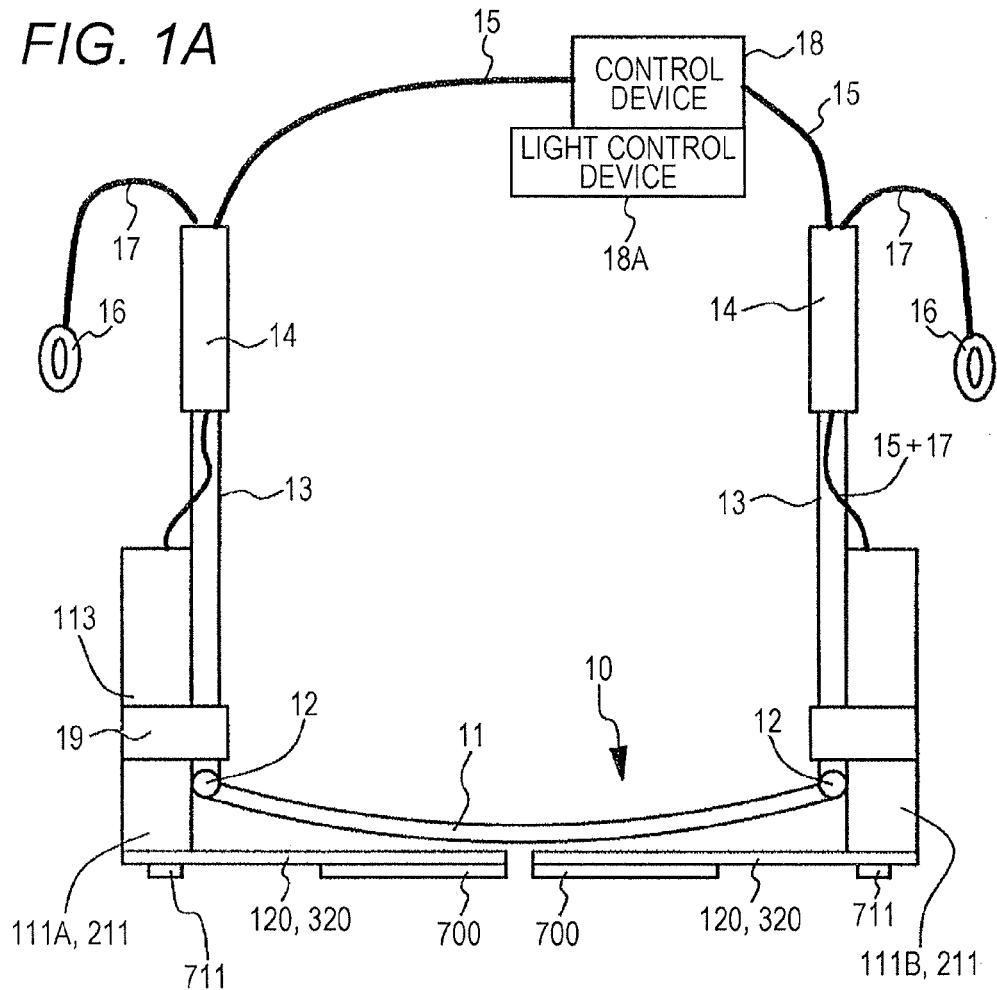
FIGS. 1A and 1B are a schematic diagram of a display device of Example 1, as viewed from above, and a block diagram of a light control device, respectively.

Hereinafter, the present disclosure will be described based on examples with reference to the drawings. However, the present disclosure is not limited to the examples, and various numerical values or materials are illustrative. The present disclosure will be described in the following order.

1. Overall description of display devices according to first to fourth embodiments of the present disclosure
2. Example 1 (display device according to the first and second embodiments of the present disclosure)
3. Example 2 (modification example of Example 1)
4. Example 3 (another modification example of Example 1)
5. Example 4 (modification example of Example 3)
6. Example 5 (modification example of Examples 1 to 4)
7. Example 6 (modification example of Examples 1 to 5)
8. Example 7 (modification example of Examples 1 to 6)
9. Example 8 (modification example of Examples 1 to 7)
10. Example 9 (modification example of Example 8)
11. Example 10 (modification example of Examples 1 to 9)
12. Example 11 (another modification example of Examples 1 to 9)
13. Example 12 (display device according to the third embodiment of the present disclosure)
14. Example 13 (modification example of Example 12)
15. Example 14 (another modification example of Example 12)
16. Example 15 (display device according to the fourth embodiment of the present disclosure) and others (Overall Description of Display Devices According to First to Fourth Embodiments of Present Disclosure)

In the display device according to the first embodiment of the present disclosure, the light control device can include a table related to a relationship between the quantity of received light change rate and the light transmittance change rate in the dimmer. Here, it is favorable to create the table based on a change of the pupil (pupil diameter) of the observer that follows the change of the quantity of light incident from an outside. By employing such an embodiment that includes the table, it is not necessary to measure the change of the pupil (pupil diameter) of the observer with a camera, for example, and the overall structure of the device can be simplified, the weight of the device can be reduced, and the power consumption can be suppressed.

In the display device according to the first embodiment of the present disclosure that includes the above-described various favorable embodiments, the light control device can further determine a start time of a change of the quantity of received light based on the quantity of received light measurement result of the light receiving element, and can start control of the light transmittance of the dimmer after elapse of a predetermined time from the start time of the change of the quantity of received light. Further, in this case, the light control device can further include a moving speed calculation unit that calculates a moving speed of the display device, and the light control device can further start control of the light transmittance of the dimmer based on the moving speed of the display device calculated by the moving speed calculation unit.

Further, in the display device according to the first embodiment of the present disclosure that includes the above-described various favorable embodiments, the light control device can further include a moving speed calculation unit that calculates a moving speed of the display device, and the light control device can further determine the light transmittance change rate in the dimmer based on the moving speed of the display device calculated by the moving speed calculation unit. Further, in this case, the light control device can further determine a start time of a change of the quantity of received light based on the quantity of received light measurement result of the light receiving element, and the light control device can further start control of the light transmittance of the dimmer based on the moving speed of the display device calculated by the moving speed calculation unit.

In the display device according to the third embodiment of the present disclosure, it is favorable to include an area of the optical device on which the light emitted from the image forming device is incident, in a projected image of the shielding member to the optical device.

In the display device according to the third embodiment of the present disclosure that includes the above-described various favorable embodiments, the shielding member can be arranged to the optical device way from each other on a side opposite to the image forming device. Note that, in such a configuration, the shielding member may be produced with an opaque plastic material, and such a shielding member can integrally extend from a housing of the image display device, can be installed to the housing of the image display device, can integrally extend from a frame, or can be installed to the frame. Further, in the display device according to the third embodiment of the present disclosure that includes the above-described various favorable embodiments, the shielding member can be arranged on a portion of the optical device on a side opposite to the image forming device, and the shielding member can be arranged in the dimmer. Note that, in such a configuration, the shielding member formed of an opaque material may be, for example, formed on a surface of the optical device based on a physical vapor deposition method (PVD method) or a chemical vapor deposition method (CVD method), may be formed by a printing method, or the like, or may be formed by attaching a film, a sheet, or a foil formed of the opaque material (plastic material, metal material, or alloy material, or the like).

Further, in the display device according to the third embodiment of the present disclosure that includes the above-described various favorable embodiments, it is favorable to include a projected image of an end portion of the dimmer to the optical device, in a projected image of the shielding member to the optical device.

In the display device according to the fourth embodiment of the present disclosure, the second substrate can be thinner than the first substrate.

Further, in the display device according to the third to fourth embodiments of the present disclosure that include the above-described favorable embodiments, the display device further includes (v) a light control device, and (vi) a light receiving element that measures the quantity of light from an outside, and the light control device can determine a start time of a change of a quantity of received light based on a quantity of received light measurement result of the light receiving element, and can start control of light transmittance of the dimmer after elapse of a predetermined time from the start time of the change of the quantity of received light.

Further, in the display device according to the second embodiment of the present disclosure, or in a favorable configuration of the display device according to the third to fourth embodiments of the present disclosure, the light control device can further include a moving speed calculation unit that calculates a moving speed of the display device, and the light control device can further start control of the light transmittance of the dimmer based on the moving speed of the display device calculated by the moving speed calculation unit.

In the display device according to the first or second embodiment that includes the above-described various favorable embodiments or configurations, or in a favorable embodiment or structure of the display device according to the third to fourth embodiments of the present disclosure, the quantity of light of the external environment can be measured by the light receiving element. However, it is further favorable that the light receiving element measures the quantity of light of an outside area corresponding to a background of an image observed by the observer in the optical device. Further, in the latter case, it is favorable that the light receiving element has directivity to the light to be received. Examples of a method of providing the light receiving element with the directivity to the light to be received include a method of arranging a lens on a light incident side of the light receiving element, a method of arranging an aperture on the light incident side of the light receiving element, and a method of providing a slit on the light incident side of the light receiving element and shielding stray light from the side.

Further, in the display device according to the first to fourth embodiments of the present disclosure, which includes favorable embodiments and configurations described above, the optical device may include (a) a light guide plate in which an incident light is propagated inside with total reflection and from which the incident light is then emitted, (b) a first deflection unit that deflects the light incident on the light guide plate so that the light incident on the light guide plate is totally reflected inside the light guide plate, and (c) a second deflection unit that deflects the light propagated inside the light guide plate with total reflection over a plurality of times so as to allow the light propagated inside the light guide plate with total reflection to be output from the light guide plate. Note that the term "total reflection" means total internal reflection or total reflection inside the light guide plate. Hereinafter, this meaning is similarly applied. Further, in the display device according to the first and second embodiments of the present disclosure, the second deflection unit may be positioned in a projected image of the dimmer, or the dimmer may be positioned in a projected image of the second deflection unit. Further, at least the second deflection unit (specifically, the second deflection unit, or the first deflection unit and the second deflection unit) may be coated by the dimmer (specifically, by one (first substrate) of substrates that form the dimmer, described below).

Further, in the display device according to the first to fourth embodiments of the present disclosure that includes the above-described favorable embodiments, the dimmer can be formed of an optical shutter applying a liquid crystal shutter or a color change of a substance generated by an oxidation-reduction reaction of an electrochromic material. That is, the dimmer can be formed of an optical shutter in which a light transmission control material layer is made of a liquid crystal material layer, or an optical shutter in which the light transmission control material layer is made of a substance generated by an oxidation-reduction reaction of an electrochromic material. Note that the dimmer is not limited to the above-described examples, and the dimmer can be formed of an optical shutter in which the light transmission control material layer is made of an inorganic electroluminescence material layer, an optical shutter formed of an electrophoretic dispersion liquid in which the light transmission control material layer is made of a number of charged electrophoretic particles and a dispersion medium having a different color from the electrophoretic particles, an optical shutter by an electrodeposition method (electrodeposition) that applies the electrodeposition/dissociation phenomena generated a lossless oxidation-reduction reaction of metal (for example, silver particles), or an optical shutter that controls the light transmittance by an electro-wetting phenomenon.

Here, in a case where the dimmer is an optical shutter in which the light transmission control material layer is made of a liquid crystal material layer, examples of the material that forms the light transmission control material layer include, but is not limited to, a twisted nematic (TN) type liquid crystal and a super twisted nematic (STN) type liquid crystal. Further, in a case where the dimmer is an optical shutter in which the light transmission control material layer is formed of a substance generated by an oxidation-reduction reaction of an electrochromic material, the light transmission control material layer can be formed of a layered structure of $IrO_x/Ta_2O_5/WO_3$, or the light transmission control material layer can be formed of a material obtained by dissolving thiocyanate (AgSCN) or silver halide (AgX: X is a halogen atom) in water or nonaqueous solution (for example, an organic solvent such as acetonitrile, dimethyl sulfoxide, or methanol). Further, in a case where the dimmer is an optical shutter in which the light transmission control material layer is made of an inorganic electroluminescence material layer, an example of a material that forms the light transmission control material layer includes, but is not limited to, tungsten oxides ($WO_3$).

Further, in the display device according to the first to third embodiments of the present disclosure, which includes favorable embodiments and configurations described above, the dimmer can be specifically made of
the first substrate facing the optical device, and a second substrate facing the first substrate,
electrodes respectively provided in the first substrate and in the second substrate, and
a light transmission control material layer sealed between the first substrate and the second substrate.

Note that, in this case, the second substrate can be thinner than the first substrate, and further, in this case, the first substrate can also serve as a component member of the optical device.

Examples of the materials that form the first and the second substrates include, specifically, a transparent glass substrate such as sodalime glass or white plate glass, a plastic substrate, a plastic sheet, or a plastic film. Here, examples of the plastic include cellulose ester such as polyethylene terephthalate, polyethylene naphthalate, polycarbonate or cellulose acetate; fluoropolymer such as copolymer of polyvinylidene fluoride or polytetra fluoro ethylene and hexafuloropropylene; polyether such as polyoxymethylene, polyolefin such as polyacetal, polystyrene, polyethylene, polypropylene or methyl pentane polymer; polyimide such as polyamide imide or polyethylene imide; polyamide; polyether sulfone; polyphenylene sulfide; polyviniylidene chloride; tetraacetyl cellulose; or brominated phenoxy; polyalylate; polysulfone. The plastic sheet and the plastic film may have stiffness which does not allow easy bending, and may also have flexibility. In a case where the first substrate and the second substrate are formed of a transparent plastic substrate, a barrier layer formed of an inorganic material or of an organic material may be formed on an inner surface of the substrate.

As the first and second electrodes, a so-called transparent electrode may be employed. Specifically, conductive polymer such as indium-tin oxide (ITO, including Sn-doped $In_2O_3$, crystalline ITO and amorphous ITO), fluorine-doped $SnO_2$ (FTO), IFO (F-doped $In_2O_3$), antimony-doped $SnO_2$ (ATO), $SnO_2$, ZnO (including Al-doped ZnO or B-doped ZnO), indium-zinc oxide (IZO), spinel type oxide, oxide having an $YbFe_2O_4$ structure, polyanilline, polypinol, or polythiophene may be used. However, examples are not limited to these materials, and it is also possible to use a material obtained by combining two or more types of material among the materials. The first and second electrodes can be formed based on a physical vapor deposition method (PVD method) such as vacuum deposition or sputtering, various chemical vapor deposition methods (CVD method), or various coating methods. Patterning of the electrodes is basically not necessary. However, if patterning is performed in response to requests, any method such as an etching method, a lift-off method, or a method using various masks may be employed.

The first and the second substrates are sealed by a sealant in an outer edge portion and are adhered to each other. Examples of the sealant called a sealing agent include various resins of a thermosetting type, photo-curing type, moisture curing type, anaerobic curing type or the like such as epoxy resin, urethane based resin, acryl based resin, vinyl acetate based resin, enthiol based resin, silicon based resin, degeneration polymer resin, or the like.

In the display device according to the first to fourth embodiments of the present disclosure that includes the above-described favorable embodiments, the brightness of an image formed by the image forming device can be controlled based on the quantity of received light measurement result of the light receiving element. Further, in the display device according to the first to fourth embodiments of the present disclosure that includes the above-described favorable embodiments, the light receiving element can be arranged outside the optical device. Further, in the display device according to the first to fourth embodiments of the present disclosure that includes the above-described favorable embodiments, an illumination sensor (may be referred to as "transmitted light illumination measuring sensor") that measures illumination based on the light transmitted through the dimmer from an outside is further included, and the light transmittance of the dimmer can be controlled based on a measurement result of the transmitted light illumination measuring sensor and/or the brightness of an image formed by the image forming device can be controlled based on a measurement result of the transmitted light illumination measuring sensor. If the brightness of an image formed by the image forming device is controlled based on the measurement result of the light receiving element, the light transmittance of the dimmer is controlled based on the measurement result of the transmitted light illumination measuring sensor, and the brightness of an image formed by the image forming device is controlled based on the measurement result of the transmitted light illumination measuring sensor, high contrast can be provided to an image observed by the observer, and an observation state of the image can be optimized depending on the illumination of surrounding environment of the display device. Here, the transmitted light illumination measuring sensor can be arranged on an observer side than the dimmer.

When the measurement result of the light receiving element becomes equal to or larger than a predetermined value (for convenience of description, can be referred to as a "first illumination measurement value"), the light transmittance of the dimmer may be equal to or smaller than a predetermined value (for convenience of description, may be referred to as a "first light transmittance"). Alternately, when the measurement result of the light receiving element becomes equal to or smaller than a predetermined value (for convenience of description, may be referred to as a "second illumination measurement value"), the light transmittance of the dimmer may be equal to or larger than a predetermined value (for convenience of description, can be referred to as a "second light transmittance"). Further, in consideration of the measurement result of the light receiving element, in a case where the measurement result of the light receiving element does not reach a desired quantity of received light (illumination), or in a case where finer illumination adjustment is necessary, the light transmittance of the dimmer may be adjusted while monitoring the value of the illumination sensor (transmitted light illumination measuring sensor). Here, the first illumination measurement value may be set to 10 lux, the first light transmittance may be set to any value of 1% to 20%, the second illumination measurement value may be set to 0.01 lux, and the second transmittance may be set to any value of 30% to 99%. Further, in a case where the illumination measurement value of the quantity of received light (illumination) of the light receiving element is $1 \times 10^{-3}$ lux or less, for example, it is favorable to control a drive voltage of the dimmer to reduce a drive time, and to increase the light transmittance of the dimmer as fast as possible.

In the display devices according to the first to fourth embodiments of the present disclosure that includes the above-described various favorable embodiments or configurations, it is favorable to arrange the optical device and the dimmer in this order from the observer side. However, the dimmer and the optical device may be arranged in this order. Further, the light receiving element in the display device according to the first to fourth embodiments of the present disclosure that includes the above-described various favorable embodiments may be formed of a known light receiving element (for example, a photodiode), and the light receiving element and the illumination sensor (transmitted light illumination measuring sensor) may be controlled by the light control device, for example. The light control device itself can be formed of a known control circuit.

In the display device according to the first embodiment of the present disclosure, the quantity of received light change rate is calculated based on the quantity of received light measurement result of the light receiving element. Here, specifically, the quantity of received light QL may be measured by the light receiving element for each (DELTA)t seconds (for example, 0.1 seconds). A change amount of the quantity of received light during (DELTA)t second (for example, 0.1 seconds) is caused to be a quantity of received light change rate (DELTA)QL. As a table related to a relationship between the quantity of received light change rate and the light transmittance change rate in the dimmer, a relationship [t, (DELTA)$QL_t$, and (DELTA)$Tr_t$] between the quantity of received light change rate for each 0.1 seconds after a change is caused in the quantity of received light (the quantity of received light change rate from t seconds after a change is caused in the quantity of received light to (t+0.1) seconds is expressed in (DELTA)$QL_t$), and a light transmittance change rate (DELTA)$Tr_t$ in the dimmer after t seconds to (t+0.1) seconds is obtained or determined in advance, and may be stored in a non-volatile memory such as a ROM, a flash memory, or an EEPROM. By determining whether the quantity of received light change rate (DELTA)QL is a threshold (DELTA)$QL_{th}$ of the quantity of received light change rate set in advance or more, whether there is a change in the quantity of received light change rate can be determined.

Typically, it is favorable to make the value |(DELTA)Tr| larger as the value |(DELTA)QL| is larger. Plus and minus of (DELTA)QL is opposite to plus and minus of (DELTA)Tr. Further, even if the value |(DELTA)$QL_t$| that is not "0" is constant in a certain range, it may be favorable to make the value |(DELTA)Tr| smaller as the value t becomes larger. When |(DELTA)QL| is sharply changed and then no change is caused in |(DELTA)QL|, it may be favorable to sharply change the value |(DELTA)Tr|, and then to slowly change the value, and finally not to change the value. When the quantity of received light measurement result of the light receiving element is changed from a value $QL_0$ to a value $QL_1$, and is then roughly back to the value $QL_0$, it may be favorable that the value |(DELTA)Tr| when the value is returned from $QL_1$ to $QL_0$ be made smaller than the value |(DELTA)Tr| when the value is changed from $QL_0$ to $QL_1$. Typically, in case where the moving speed of the display device is fast, it is favorable to make the value |(DELTA)Tr| large. Processing may be applied to the value (DELTA)Tr so that the value (DELTA)Tr can be smoothly changed (a sort of smoothing processing).

In the display device according to the second embodiment of the present disclosure or in a favorable embodiment or configuration of the display devices according to the first, third and fourth embodiments of the present disclosure, a start time of the change of the quantity of received light (a timing when the change of the quantity of received light is started) is determined based on the quantity of received light measurement result of the light receiving element. In this case, when the quantity of received light change rate (DELTA)QL obtained from the quantity of received light measurement result of the light receiving element becomes the threshold (DELTA)$QL_{th}$ or more, the start time of the change of the quantity of received light may be caused to "0". Control of the light transmittance of the dimmer is started after elapse of a predetermined time from the start time of the change of the quantity of received light. Here, as the predetermined time (so-called, a time lag), 0.2 to 0.3 seconds may be employed. Typically, when the moving speed of the display device is fast, the predetermined time may be made short.

In the display devices according to the first to fourth embodiments of the present disclosure, which includes the various favorable embodiments and configurations described above, the highest light transmittance of the dimmer may be 30% or more, and the lowest light transmittance of the dimmer may be 20% or less. The upper limit of the highest light transmittance of the dimmer may be 99%, and the lower limit of the lowest light transmittance of the dimmer may be 1%.

Further, in the display device according to the first to fourth embodiments of the present disclosure that includes the above-described favorable embodiments, in some cases, the light passing through the dimmer can be colored in desired color. In this case, the color to be colored by the dimmer can be variable, or the color to be colored by the dimmer can be fixed. In the former case, the dimmer may be formed of a liquid crystal shutter that is capable of color display, or a dimmer to be colored in red, a dimmer to be colored in green, and a dimmer to be colored in blue may be layered. In the latter case, the color to be colored by the dimmer is not limited, but brown can be employed, for example.

Further, in the display device according to the first to fourth embodiments of the present disclosure, which includes the various favorable embodiments and configurations described above, the dimmer may be detachably disposed or may be fixed in an area of the optical device from which light is emitted. To detachably dispose the dimmer, the dimmer may be installed in the optical device using a screw made of transparent plastic, or the dimmer may be installed to a frame using a screw. Further, a groove may be cut in the frame and the dimmer may be then engaged with the groove. Further, a magnet may be installed in the frame, and the dimmer may be then installed to the frame. Further, a sliding section may be provided in the frame, and the dimmer may be then inserted in the sliding section. Further, a connector may be installed in the dimmer, and the dimmer may be then electrically connected to a light control device (for example, included in a control device that controls the image forming device) through the connector and a wire. The light receiving element may be installed to the dimmer, to the optical device, or to the frame, and an installation method may be a method suitable for the light receiving element in use. The transmitted light illumination measuring sensor may be installed to the optical device, or to the frame, and an installation method may be a method suitable for the transmitted light illumination measuring sensor in use.

In the display devices according to the first to fourth embodiments of the present disclosure that includes the various favorable embodiments and configurations described above (hereinafter, these may be simply and collectively referred to as "display device of the present disclosure"), the optical device is a semi-transmissive type (see-through type). Specifically, at least a portion of the optical device that faces the eyes of the observer is adapted to be semi-transmissive (see-through), and it is possible to see an outside scene through this portion of the optical device. The display device may have one or two image display devices.

Here, the first deflection unit may reflect the light incident on the light guide plate, and the second deflection unit may transmit and reflect the light propagated inside the light guide plate with total reflection over a plurality of times. Further, in this case, the first deflection unit may function as a reflecting mirror, and the second deflection unit may function as a semi-transmissive mirror.

In such a configuration, the first deflection unit may be formed of metal including alloy, for example, or may be formed by a light reflection film (a kind of mirror) which reflects the light incident on the light guide plate or a diffraction grating (for example, hologram diffraction grating film) that diffracts the light incident on the light guide plate. Further, the second deflection unit may be formed of a multi-layered structure in which a plurality of dielectric films are layered, a half mirror, a polarized beam splitter, or a hologram diffraction grating film. Further, the first and the second deflection units are disposed inside the light guide plate (incorporated inside the light guide plate). In the first deflection unit, parallel light incident on the light guide plate is reflected or diffracted so that the parallel light incident on the light guide plate is totally reflected inside the light guide plate. Meanwhile, in the second deflection unit, parallel light propagated inside the light guide plate with total reflection is reflected or diffracted over a plurality of times, and is then emitted from the light guide plate in the state of parallel light.

Further, the first deflection unit may diffract the light incident on the light guide plate, and the second deflection unit may diffract the light propagated inside the light guide plate with total reflection over a plurality of times. Further, in this case, the first and the second deflection units may include a configuration of a diffraction grating element. Here, the diffraction grating element may be formed of a reflective diffraction grating element or a transmissive diffraction grating element. Further, one diffraction grating element may be formed of the reflective diffraction grating element and the other diffraction grating element may be formed of the transmissive diffraction grating element. Further, an example of the reflective diffraction grating element includes a reflective volume hologram diffraction grating. For convenience of description, the first deflection unit formed of the reflective volume hologram diffraction grating may be referred to as a "first diffraction grating member", and the second deflection unit formed of the reflective volume hologram diffraction grating may be referred to as a "second diffraction grating member".

Image display of a single color (for example, green) may be performed by the image display device according to an embodiment of the present disclosure. When color image display is performed, the first diffraction grating member or the second diffraction grating member can have a configuration made by diffraction grating layers of P layers made of the reflective volume hologram diffraction grating being layered, in order to correspond to diffraction and reflection of P types of lights having wavelength bands (or wavelengths) of different P types (for example, P=3, and three types of red, green, and blue). Interference fringes corresponding to one type of wavelength band (or wavelength) are formed in each diffraction grating layer. Further, to correspond to P types of light diffractions and reflections having P types of different wavelength bands (or wavelengths), P types of interference fringes may be formed in the first diffraction grating member or on the second diffraction grating member that includes one diffraction grating layer. Further, a view angle may be equally divided into three, for example, and the first diffraction grating member or the second diffraction grating member can have a configuration made by diffraction grating layers corresponding to respective view angles being layered. For example, the first diffraction grating member and the second diffraction grating member formed of a diffraction grating layer formed of a reflective volume hologram diffraction grating that diffracts and reflects the light having a red wavelength band (or, a wavelength) may be arranged in the first light guide plate, the first diffraction grating member and the second diffraction grating member formed of a diffraction grating layer formed of a reflective volume hologram diffraction grating that diffracts and reflects the light having a green wavelength band (or a wavelength) may be arranged on the second light guide plate, and the first diffraction grating member and the second diffraction grating member formed of a diffraction grating layer formed of a reflective volume hologram diffraction grating that diffracts and reflects the light having a blue wavelength band (or, a wavelength) may be arranged on the third light guide plate, and these first light guide plate, second light guide plate, and third light guide plate may be layered with a specified gap. By employing such a configuration, the diffraction efficiency and the diffraction reception angle can be increased, and the diffraction angle can be optimized, when the light having each wavelength band (or, a wavelength) is diffracted and reflected in the first diffraction grating member or in the second diffraction grating member. It is favorable to arrange a protection member so that the reflective volume hologram diffraction grating does not directly contact with the air.

An example of the material that forms the first and the second diffraction grating members includes a photopolymer material. The material or basic structure that forms the first and the second diffraction grating member made of the reflective volume hologram diffraction grating may be the same as those of a reflective volume hologram diffraction grating in the related art. The reflective volume hologram diffraction grating refers to a hologram diffraction grating that diffracts and reflects only positive primary diffracted light. In the diffraction grating member, the interference fringes are formed over the front surface through the inside, and a method of forming the interference fringes may be the same as a forming method in the related art. Specifically, for example, a member (for example, photopolymer material) that forms the diffraction grating member may be irradiated with object light from a first predetermined direction on one side, and at the same time, the member that forms the diffraction grating member may be irradiated with reference light from a second predetermined direction on the other side, and the interference fringes formed by the object light and the reference light may be recorded inside the member that forms the diffraction grating member. By appropriately selecting the first predetermined direction, the second predetermined direction, and wavelengths of the object light and of the reference light, it is possible to obtain a desired pitch and a desired inclination angle (sliding angle) of the interference fringes on the front surface of the diffraction grating member. The inclination angle of the interference fringes refers to an angle that is formed by the front surface of the diffraction grating member (or diffraction grating layer) and the interference fringes. In a case where the first and the second diffraction grating members are formed of a layered structure of the diffraction grating layers of P layers made of the reflective volume hologram diffraction grating, such layering of the diffraction grating layers may be achieved by individually manufacturing the diffraction grating layers of P layers and then by layering (adhering) the diffraction grating layers of P layers using an ultraviolet curing adhesive, for example. Further, the diffraction grating layers of P layers may be manufactured by manufacturing one diffraction grating layer using an adhesive photopolymer material, and then, by sequentially attaching the adhesive photopolymer material thereon.

Further, in the image display device according to an embodiment of the present disclosure, the optical device may include a semi-transmissive mirror on which light emitted from the image forming device is incident and from which the light is then emitted toward the pupil of the observer. Here, the light emitted from the image forming device may be propagated in the air and be incident on the semi-transmissive mirror. For example, the light may be propagated inside a transparent member such as a glass plate or a plastic plate (specifically, a member formed of the same material as the material that forms the light guide plate described below), and may be then incident on the semi-transmissive mirror. The semi-transmissive mirror may be installed in the image forming device through this transparent member, or may be installed in the image forming device through a member different from the transparent member.

In the image forming device according to an embodiment of the present disclosure, which includes the various favorable embodiments and configurations described above, the image forming device may have a plurality of pixels arranged in a two-dimensional matrix manner. Note that such a configuration of the image forming device is referred to as an "image forming device of a first configuration" for convenience of description.

As the image forming device of the first configuration, for example, an image forming device formed of a reflective spatial light modulator and a light source; an image forming device formed of a transmissive spatial light modulator and a light source; or an image forming device formed of a light emitting element such as an organic EL (Electro Luminescence), an inorganic EL or a light emitting diode (LED) may be used. Among them, the image forming device formed of a reflective spatial light modulator and a light source is favorably used. As the spatial light modulator, a transmissive or reflective liquid crystal display such as a light bulb, for example or LCOS (Liquid Crystal On Silicon), or a digital micromirror device (DMD) may be used. Further, as the light source, a light emitting element may be used. Further, the reflective spatial light modulator may be formed of a polarized beam splitter that reflects a part of light from the liquid crystal display and the light source and guides it to the liquid crystal display, and transmits a part of the light reflected by the liquid crystal display and guides it to an optical system. As the light emitting element that forms the light source, a red light emitting element, a green light emitting element, a blue light emitting element, and a white light emitting element may be used. Further, red light, green light, and blue light emitted from the red light emitting element, the green light emitting element, and the blue light emitting element may be mixed and uniformized in brightness using a light pipe, to thereby obtain white light. As the light emitting element, for example, a semiconductor laser device, a solid laser or an LED may be used. The number of pixels may be determined based on a demanded specification in the image display device. As a specific value of the number of pixels, 320×240, 432×240, 640×480, 1024×768, 1920×1080 or the like may be used.

Further, in the image forming device according to an embodiment of the present disclosure, which includes the various favorable embodiments and configurations described above, the image forming device may have a configuration that includes a light source and a scanning section that scans parallel light emitted from the light source. Note that, such a configuration of the image forming device is referred to as an "image forming device of a second configuration" for convenience of description.

As the light source in the image forming device of the second configuration, a light emitting element may be used. Specifically, a red light emitting element, a green light emitting element, a blue light emitting element, and a white light emitting element may be used. Further, red light, green light, and blue light which are emitted from the red light emitting element, the green light emitting element, and the blue light emitting element are mixed and uniformized in brightness using a light pipe, to thereby obtain white light. As the light emitting element, for example, a semiconductor laser device, a solid laser or an LED may be used. The number of pixels (virtual pixels) in the image forming device of the second configuration may be determined based on a demanded specification in the image display device. As a specific value of the number of pixels (virtual pixels), 320×240, 432×240, 640×480, 1024×768, 1920×1080 or the like may be used. Further, in a case where color image display is performed, when the light source is formed of the red light emitting element, the green light emitting element, and the blue light emitting element, for example, color composition is favorably performed using a cross prism. As the scanning section, MEMS (Micro Electro Mechanical Systems) which scans light emitted from the light source horizontally and vertically, for example, which has a micromirrors or Galvano mirrors which are able to rotate in two-dimensional directions may be used.

In the image forming device of the first configuration and the image forming device of the second configuration, light collimated into a plurality of parallel light using the optical system (an optical system that collimates emitted light into parallel light, which may be referred to as a "parallel light emitting optical system", and specifically, for example, a collimating optical system or a relay optical system) is incident on the light guide plate, but such a request of the parallel light is based on the fact that it is necessary that light wave surface information at the time when the light is incident on the light guide plate be stored even after the light is emitted from the light guide plate through the first deflection unit and through the second deflection unit. Note that, to generate a plurality of parallel light, specifically, for example, a light outputting section of the image forming device may just be disposed at a position of the focal distance in the parallel light emitting optical system, for example. The parallel light emitting optical system has a function to convert pixel position information into angle information in the optical system of the optical device. As the parallel light emitting optical system, an optical system that has a generally positive optical power, which individually uses or combines a convex lens, a concave lens, a free-form surface prism and a hologram lens may be used. A light shielding section that includes an opening section may be arranged between the parallel light emitting optical system and the light guide plate to prevent undesired light from being emitted from the parallel light emitting optical system and incident on the light guide plate.

The light guide plate includes two parallel surfaces (a first surface and a second surface) that extend in parallel with an axis line (X axis) of the light guide plate. When a surface of the light guide plate that light is incident on is referred to as a light guide plate incident surface, and a surface of the light guide plate from which light is emitted is referred to as a light guide plate emitting surface, the light guide plate incident surface and the light guide plate emitting surface may be formed by the first surface, or the light guide plate incident surface may be formed by the first surface and the light guide plate emitting surface may be formed by the second surface. Examples of the material that forms the light guide plate include glass including optical glass such as quartz glass or BK7, and a plastic material (for example, PMMA, polycarbonate resin, acrylic based resin, amorphous polypropylene based resin, or styrene based resin which includes AS resin). The light guide plate is not limited to a flat plate, and may have a curved plate.

In the display device according to an embodiment of the present disclosure, the frame is favorably formed into a pair of glasses (spectacle type), and specifically, the frame can be formed of a front section arranged in front of the observer, and two temple sections rotatably attached to both ends of the front section through hinges. An end cover section is attached to a tip end portion of each temple section. The image forming device is installed to the frame. Specifically, for example, the image forming device may be installed in the temple section. Further, the front section and the two temple sections may be integrally formed. That is, when the overall display device of the present disclosure is viewed, the frame has the same structure as that of normal glasses. The material that forms the frame including a pad section may be formed of the same material as the material which forms the normal glasses, such as metal, alloy, plastic or a combination thereof. Further, a nose pad may be installed to the front section. That is, when the overall display device of the present disclosure is viewed, an assembly of the frame and the nose pad has approximately the same structure as that of normal glasses, except that there is no rim. The nose pad may have a known configuration or structure.

Further, in the display device according to an embodiment of the present disclosure, from the viewpoint of design or installability, it is favorable that wires (signal lines, power lines or the like) from one or two image forming devices extend outside from the tip end portion of the end cover section through the temple section and the inside of the end cover section and be connected to a control device (control circuit or control section). Further, each image forming device may include a headphone section, and a headphone section wire from each image forming device may extend to the headphone section from the tip end portion of the end cover section through the temple section and the inside of the end cover section. As the headphone section, for example, an inner ear type or a canal type of headphone section may be used. More specifically, it is favorable that the headphone section wire extends to the headphone section by wrapping around an auricle from the tip end portion of the end cover section.

Further, an imaging device may be installed in the central part of the front section. Specifically, the imaging device may be formed of a solid state imaging device made of a CCD or CMOS sensor, and a lens, for example. A wire from the imaging device may be connected to one image display device (or image forming device) through the front section, for example, and may be further included in a wire that extends from the image display device (or image forming device).

Light rays which emitted from the center of the image forming device and pass through a node of the optical system on the side of the image forming device are called "central light rays". A light ray that perpendicularly is incident on the optical device among the central light rays is called "central incident light ray". Further, a point of the optical device that the central incident light ray is incident on is represented as an optical device central point, an axis line that passes through the optical device central point and is parallel to an axis line direction of the optical device (to be specific, the light guide plate) is represented as the X axis, and an axis line that passes through the optical device central point and coincides with a normal line of the optical device (to be specific, the light guide plate) is represented as the Y axis. The horizontal direction in the display device according to an embodiment of the present disclosure is a direction parallel to the X axis, and may be referred to as an "X axis direction". Here, the optical system is disposed between the image forming device and the optical device, and collimates the light emitted from the image forming device into parallel light. Further, light flux which is collimated as parallel light by the optical system is incident on the optical device, is guided therein, and is then emitted therefrom. A central point of the first deflection unit is referred to as an "optical device central point".

In the display devices according to an embodiment of the present disclosure, which includes various modifications described above, although not being limited in the image display device, the central incident light ray may intersect with the XY plane at an angle (theta) other than 0 degrees. Accordingly, limitation to the installation angle of the image display device when the image display device is installed in the installation section of the frame can be reduced and a high degree of freedom in design can be obtained. Further, in this case, the central incident light ray may be included in the YZ plane, which is favorable from the point of view of easy handling, setting or installation of the image display device. Further, the optical axis of the optical system can be included in the YZ plane, and may intersect with the XY plane at an angle other than 0 degrees. Further, the optical axis of the optical system may be parallel to the YZ plane and to the XY plane, and may pass through a position away from the center of the image forming device. Further, when it is assumed that the XY plane coincides with the horizontal plane, the angle (theta) where the central incident light ray intersects with the XY plane may be an elevation angle. That is, the central incident light ray may be directed to the XY plane from below the XY plane, and may collide with the XY plane. Further, in this case, the XY plane favorably intersects with the vertical plane at an angle other than 0 degrees, and the XY plane more favorably intersects with the vertical plane at an angle (theta)'. The maximum value of the angle (theta)' may be 5 degrees although it is not limited to the value. Here, the horizontal plane is a plane in which the line of vision ("horizontal line of vision of an observer") when the observer views an object (for example, an object on an infinitely distant side in the horizontal direction such as a skyline or sealine) positioned in the horizontal direction and two pupils of the observer horizontally positioned are included. Further, the vertical plane is a plane perpendicular to the horizontal plane. Further, when the observer views an object (for example, an object on an infinitely distant side in the horizontal direction such as a skyline or sealine) positioned in the horizontal direction, a central incident light ray emitted from the optical device and to be incident on the pupils of the observer may form a depression angle. As the depression angle with reference to the horizontal plane, for example, 5 to 45 degrees may be used.

The display device according to an embodiment of the present disclosure, which includes the various modification examples described above, may be used in, for example, display of various explanations, marks, symbols, signs, emblems, designs or the like in operation, manipulation, maintenance, disassembly or the like of observation objects such as various apparatuses; display of maps; display of road information, route guide information, or traffic information; display of various explanations, marks, symbols, signs, emblems, designs or the like related to observation objects such as people or goods; display of moving images or still images; display of subtitles in a movie or the like; display of explanatory notes or closed captions related to images which are synchronized with the images; or display of various explanations related to observation objects, or explanatory notes or the like for describing their content, progress, background or the like, in plays or Kabukis, Nohs, Noh farces, operas, concerts, ballets, various plays, amusement parks, art museums, sightseeing areas, tourist resorts, visitor information, or may also be used for display of closed captions. Note that the various contents described above can be corresponding to information corresponding to the data related to the observation objects. In plays or Kabukis, Nohs, Noh farces, operas, concerts, ballets, various plays, amusement parks, art museums, sightseeing areas, tourist resorts, visitor information or the like, characters may be displayed in the display device as images related to the observation objects at an appropriate timing. Specifically, for example, an image control signal is transmitted to the display device by operation of an operator or under the control of a computer or the like, based on a predetermined schedule or time allocation, according to the progress of a movie, play or the like, so that an image is displayed in the display device. Further, in a case where various explanations related to observation objects such as various apparatuses, or people or goods is performed, by imaging the observation objects (objects) such as various apparatuses, or people or goods by the imaging device, and by analyzing the photographed content in the display device, it possible to display the various explanations related to the observation objects (objects) such as various apparatuses, or people or goods, which have been created in advance, in the display device. Further, the display device according to an embodiment of the present disclosure may be used as a stereopsis display device. In this case, as necessary, a polarizing plate or a polarizing film may be detachably installed in the optical device, or may be attached to the optical device.

As described above, the image signal input to the image forming device may include brightness data (brightness information) or chromaticity data (chromaticity information) related to images to be displayed, or both of the brightness data and the chromaticity data, in addition to the image signal (for example, character data). The brightness data may be brightness data corresponding to brightness of a predetermined area that includes an observation object when seen through the optical device, and the chromaticity data may be chromaticity data corresponding to chromaticity of the predetermined area that includes the observation object when seen through the optical device. In this way, by including the brightness data related to an image, it is possible to control the brightness (luminance) of an image to be displayed. Further, by including the chromaticity data related to the image, it is possible to control the chromaticity (color) of the image to be displayed. Further, by including the brightness data and the chromaticity data related to the image, it is possible to control the brightness (luminance) and the chromaticity (color) of the image to be displayed. In a case where the brightness data is brightness data corresponding to the brightness of the predetermined area that includes the observation object when seen through the optical device, the value of brightness data may just be set so that the value of brightness of an image becomes high (that is, so that the image is displayed brightly) as the value of brightness of the predetermined area that includes the observation object when seen through the optical device becomes higher. Further, in a case where the chrominance data is chrominance data corresponding to the chrominance of the predetermined area that includes the observation object when seen through the optical device, the value of chrominance data may just be set so that the chrominance of the predetermined area that includes the observation object when seen through the optical device and the chrominance of the image to be displayed form an approximately complementary color relationship. Here, complementary colors represent a set of colors having the relationship of opposite positions in the color circle. For example, red and green, yellow and violet, blue and orange, or the like form the complementary colors.

As understood from colors that cause a decrease in chromaticity as in light that becomes white and an article that becomes black when a specific color and different colors are mixed with each other at an appropriate ratio, the complementarity of a visual effect when colors are arranged in parallel is different from the complementarity of a visual effect when colors are mixed with each other. These colors are called, the complementary colors, contrast colors or opponent colors. Here, whereas the opponent colors directly indicate a color that is opposite to a complementary color, the range of colors indicated by the complementary colors is slightly broad. Combination of the complementary colors has a synergy effect of using the mutual colors, which is called a complementary color harmony.

Example 1

Figure 1B:
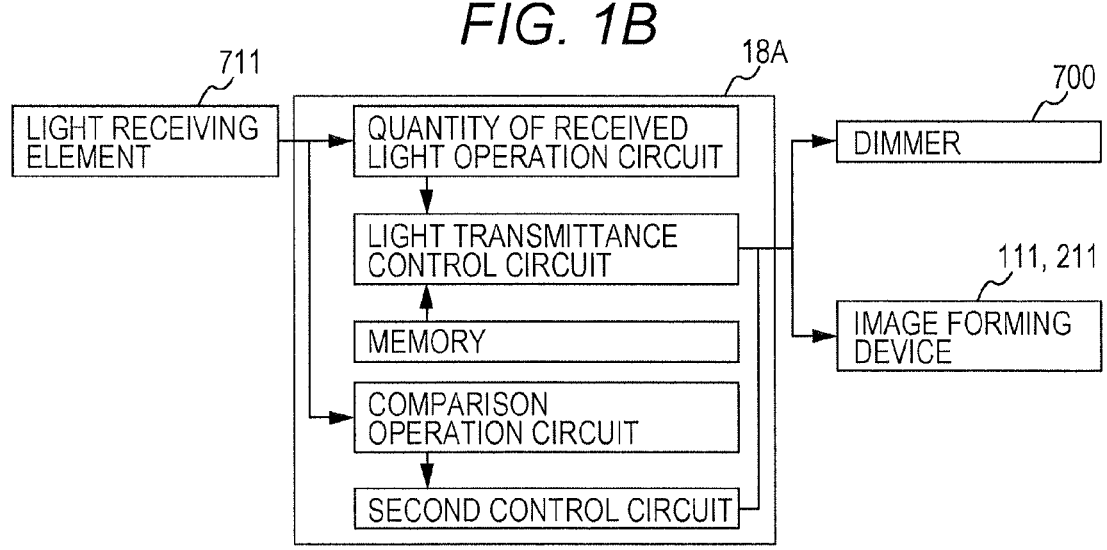
Figure 2:
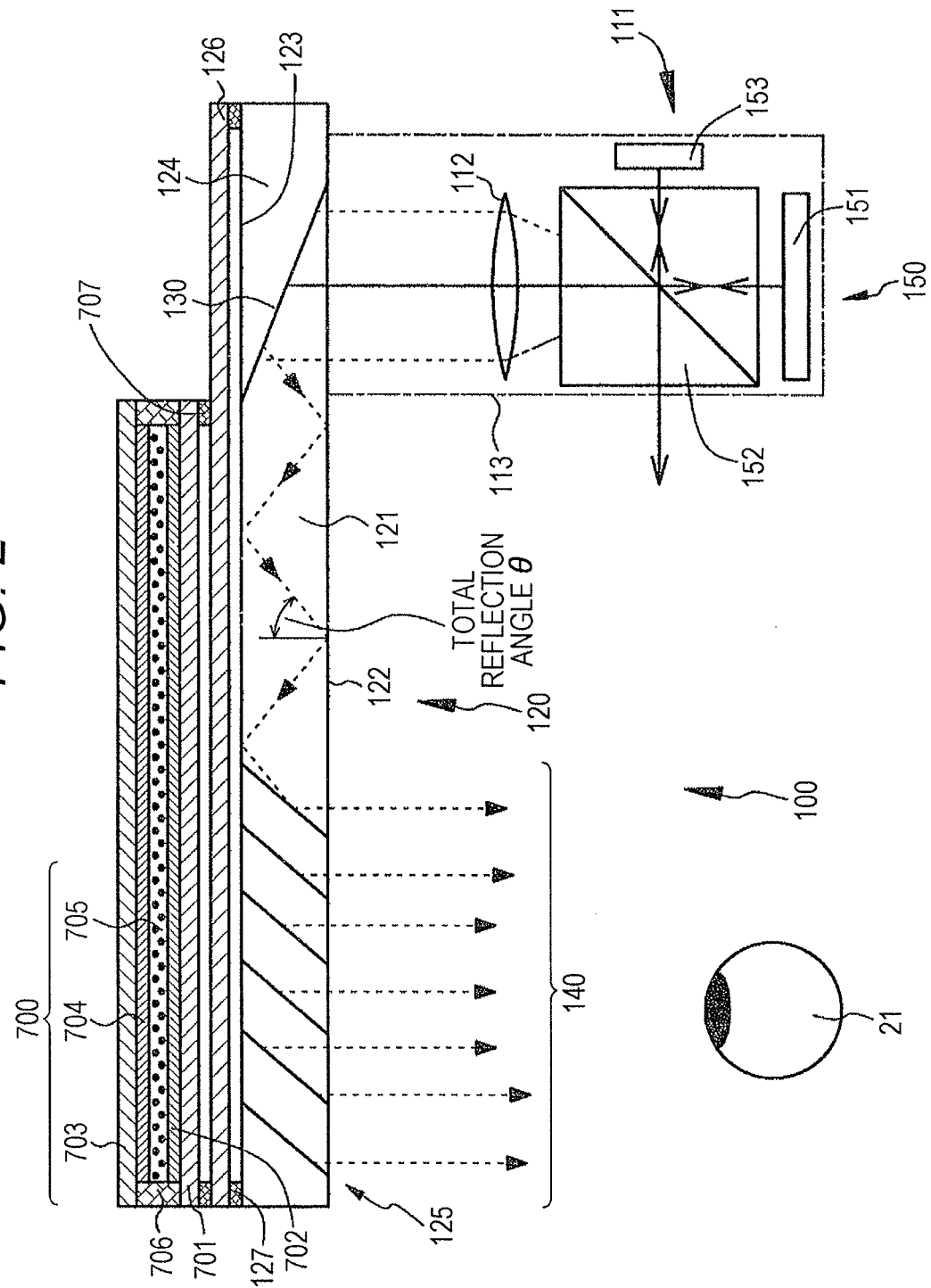
FIG. 2 is a conceptual diagram of an image display device in the display device of Example 1.
Figure 3A:
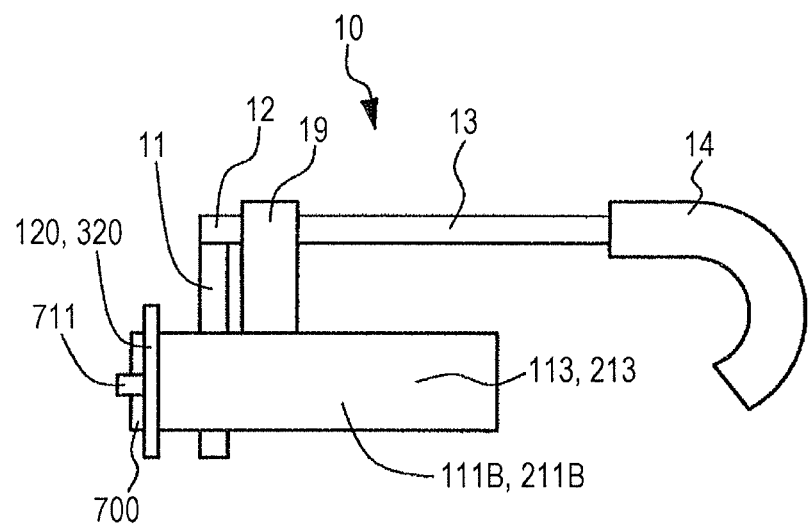
FIGS. 3A and 3B are a schematic diagram of the display device of Example 1, as viewed from the side, and a schematic diagram of an optical device and a part of a dimmer in the display device of Example 1, as viewed from the front, respectively.
Figure 3B:
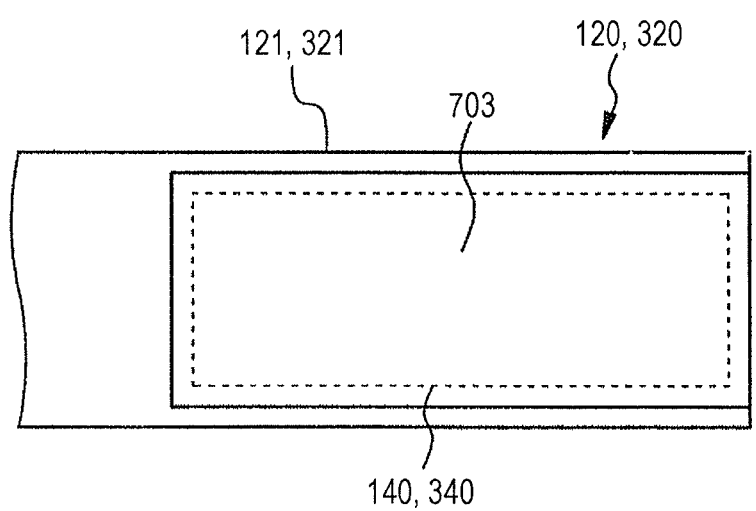
Figure 4A:
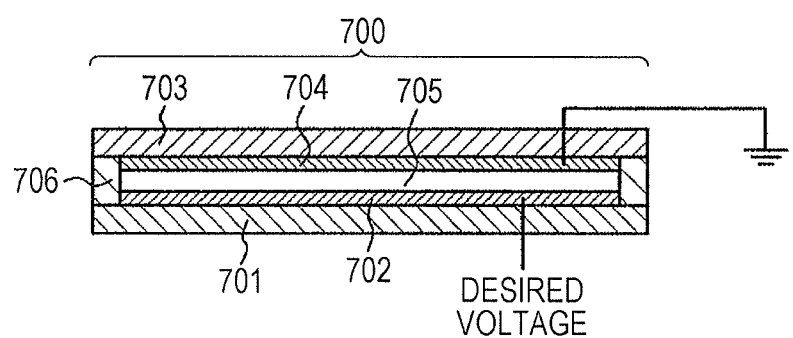
FIGS. 4A and 4B are schematic cross-sectional views schematically illustrating the behavior of the dimmer in the display device of Example 1.
Figure 4B:
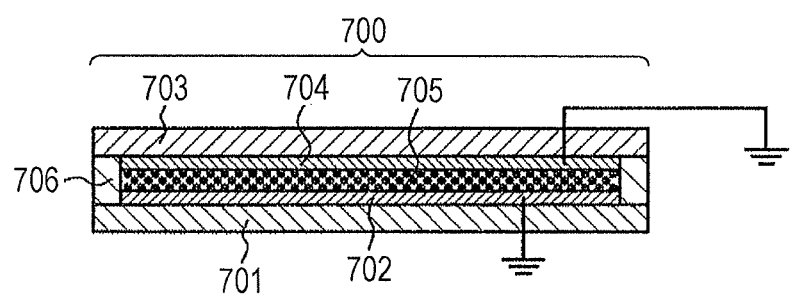
Figure 5:
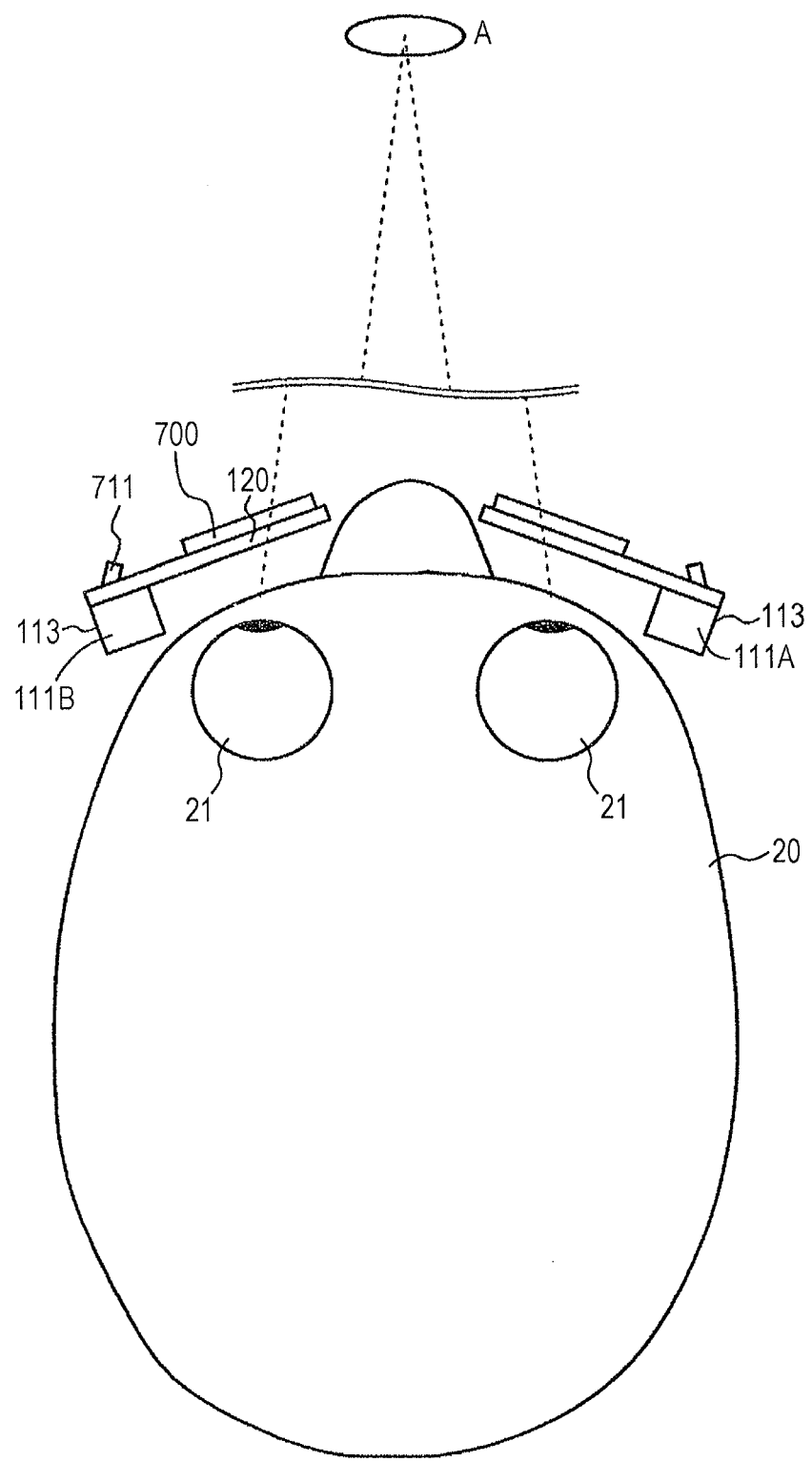
FIG. 5 is a diagram illustrating a state in which the display device of Example 1 is mounted on a head of the observer, as viewed from above (note that only the image display device is illustrated and illustration of a frame is omitted).

Example 1 relates to a display device according to the first and second embodiments of the present disclosure. FIG. 1A illustrates a schematic diagram of the display device of Example 1 (specifically, a head-mounted display, HMD), as viewed from above, FIG. 1B illustrated a block diagram of the light control device (color control circuit), FIG. 2 illustrates a conceptual diagram of the image display device of Example 1, FIG. 3A illustrates a schematic diagram, as viewed from the side, FIG. 3B illustrates a schematic diagram of the optical device and a part of the dimmer, as viewed from the front, FIGS. 4A and 4B illustrate schematic cross-sectional views of the dimmer schematically illustrating the behavior of the dimmer in the display device of Example 1, and FIG. 5 illustrates a diagram of a state where the display device of Example 1 is mounted on the head of the observer, as viewed from above (note that, only the image display device is illustrated and the frame and the like are omitted).

The display device according to Example 1 or Examples 2 to 15 described below includes (i) a frame 10 (specifically, a spectacle type frame) that is mounted on a head part of an observer 20, and (ii) an image display device 100, 200, 300, 400 or 500 that is installed in the frame 10. The display device according to Example 1, or any one of Examples 2 to 15 described below is a binocular type including two image display devices, but may be a monocular type including one image display device. Further, the image forming device 111 or 211 displays a single color image.

An image display device 100, 200, 300, 400 or 500 according to Example 1, or any one of Examples 2 to 15 described below includes (A) an image forming device 111 or 211, (B) an optical device 120, 320 or 520 on which light emitted from the image forming device 111 or 211 is incident, and from which the light is emitted to the pupil 21 of the observer 20, and (C) an optical system (parallel light emitting optical system) 112 or 254 that collimates the light emitted from the image forming device 111 or 211 into parallel light, wherein light flux that is collimated as parallel light by the optical system 112 or 254 is incident on the optical device 120, 320 or 520, is guided therein and is then emitted therefrom.

In addition to that, the display device according to Example 1, or any one of Examples 2 to 15 described below includes (iii) a dimmer 700 disposed in an area of the optical device 120, 320, or 520 from which the light is emitted, and controls the quantity of light incident from an outside, (iv) a light control device 18A, and (v) a light receiving element 711 that measures the quantity of light from an outside.

The light control device 18A is included in the control device (control circuit, control section) 18 described below.

To be specific, the dimmer 700 is disposed on the side opposite to the image forming device 111 or 211 of the optical device 120, 320, or 520. To be specific, the dimmer 700 that is a kind of optical shutter is fixed to the optical device 120, 320, or 520 (specifically, a protection member (protection plate) 126 or 326 that protects the light guide plate 121 or 321, or the semi-transmission mirror 520) using an adhesive 707. Further, the dimmer 700 is arranged in an area of the optical device 120, 320, or 520 on a side opposite to the observer 20. The protection member (protection plate) 126 or 326 adhere to the second surface 123 or 323 of the light guide plate 121 or 321 with the adhesive member 127 or 327. Further, the light receiving element 711 formed of a photodiode is arranged on an outside end part of the optical device 120 or 320 (specifically, on the outside end part of the light guide plate 121 or 321). The light receiving element 711 is connected to the light control device 18A through a connector or a wire (not illustrated). Specific operations of the light receiving element 711 and the dimmer 700 will be described below.

The optical device 120 or 320 according to Example 1, or any one of Example 2 to 4, and 6 to 15 described below includes (a) a light guide plate 121 or 321 in which an incident light is propagated inside with total reflection and from which the incident light is then emitted, (b) a first deflection unit 130 or 330 that deflects the light incident on the light guide plate 121 or 321 so that the light incident on the light guide plate 121 or 321 is totally reflected inside the light guide plate 121 or 321, and (c) a second deflection unit 140 or 340 that deflects the light propagated inside the light guide plate 121 or 321 with total reflection over a plurality of times so as to allow the light propagated inside the light guide plate 121 or 321 with total reflection to be emitted from the light guide plate 121 or 321. Further, the second deflection unit 140 and 340 is positioned in the projected image of the dimmer 700. Further, the second deflection unit 140 or 340 is at least coated by one (first substrate 701) of the substrates that forms the dimmer 700. The optical device 120 or 320 is a see-through type (semi-transmissive type).

Here, in Example 1, the first deflection unit 130 and the second deflection unit 140 are disposed inside the light guide plate 121. Further, the first deflection unit 130 reflects light incident on the light guide plate 121, and the second deflection unit 140 transmits and reflects the light propagated inside the light guide plate 121 with total reflection over a plurality of times. That is, the first deflection unit 130 functions as a reflecting mirror, and the second deflection unit 140 functions as a semi-transmissive mirror. More specifically, the first deflection unit 130 installed in the light guide plate 121 is formed by a light reflection layer (a kind of mirror) made of aluminum (Al) and reflects the light incident on the light guide plate 121. Meanwhile, the second deflection unit 140 provided inside the light guide plate 121 is formed by a multi-layered structure in which a plurality of dielectric films are layered. The dielectric film includes a TiO$_2$ film that is a high dielectric constant material and a SiO$_2$ film that is a low dielectric constant material, for example. The multi-layered structure in which the plurality of dielectric films are layered is disclosed in JP 2005-521099 W. In the figure, 6-layered dielectric films are illustrated, but it is not limited to the example. A thin piece formed of the same material as the material which forms the light guide plate 121 is interposed between the dielectric films. In the first deflection unit 130, parallel light incident on the light guide plate 121 is reflected (or diffracted) so that the parallel light incident on the light guide plate 121 is totally reflected inside the light guide plate 121. Meanwhile, in the second deflection unit 140, the parallel light propagated inside the light guide plate 121 with total reflection is reflected (or diffracted) over a plurality of times, and is emitted from the light guide plate 121 toward the pupil 21 of an observer 20 in the state of parallel light.

The first deflection unit 130 may be installed by cutting a portion 124 of the light guide plate 121 where the first deflection unit 130 is to be installed to form an inclination surface on which the first deflection unit 130 is to be formed in the light guide plate 121, by forming a light reflection film on the inclination surface by vacuum deposition, and then, by allowing the cut portion 124 of the light guide plate 121 to adhere to the first deflection unit 130. Further, the second deflection unit 140 may be installed by manufacturing a multi-layered structure obtained by layering a plurality of combinations of the same material (for example, glass) as the material that forms the light guide plate 121 and an dielectric film (which may be formed by vacuum deposition, for example), by cutting a portion 125 of the light guide plate 121 where the second deflection unit 140 is to be installed to form an inclination surface, by allowing the multi-layered structure to adhere to the inclination surface, and by performing polishing or the like to shape its appearance. In this way, the optical device 120 in which the first deflection unit 130 and the second deflection unit 140 are installed inside the light guide plate 121 can be obtained.

Here, in Example 1, or any one of Examples 2 to 4, and 6 to 15 described below, the light guide plate 121 or 321 formed of an optical glass or plastic material includes two parallel surfaces (a first surface 122 or 322 and a second surface 123 or 323) that extend in parallel in the light propagation direction (X axis) inside the light guide plate 121 or 321 with total reflection. The first surface 122 or 322 faces the second surface 123 or 323. Further, parallel light is incident on the first surface 122 or 322 corresponding to a light incident surface, is propagated inside with total reflection, and is then emitted through the first surface 122 and 322 corresponding to a light emitting surface. Here, the configuration is not limited thereto, and thus, the light incident surface may be formed by the second surface 123 or 323, and the light emitting surface may be formed by the first surface 122 or 322.

In Example 1 or Examples 3 and 12 described below, the image forming device 111 is an image forming device of a first configuration, and includes a plurality of pixels that are arranged in a two-dimensional matrix form. To be specific, the image forming device 111 includes a reflective spatial light modulator 150 and a light source 153 that includes a light emitting diode that emits white light. Each image forming device 111 is accommodated in a housing 113 (indicated by a dashed line in FIG. 1), and an opening section (not illustrated) is formed in the housing 113. Light is emitted from the optical system 112 (parallel light emitting optical system, collimating optical system) through the opening section. The reflective spatial light modulator 150 includes a liquid crystal display (LCD) 151 formed by LCOS that is a light bulb, and a polarized beam splitter 152 that reflects a part of light from the light source 153 to guide the reflected light to the liquid crystal display 151, and transmits part of the light reflected by the liquid crystal display 151 and guides the transmitted light to the optical system 112. The liquid crystal display 151 includes a plurality of (for example, 640×480) pixels (liquid crystal cells) which are arranged in the two-dimensional matrix form. The polarized beam splitter 152 has a known structure. Non-polarized light which is emitted from the light source 153 collides with the polarized beam splitter 152. In the polarized beam splitter 152, a P-polarized component passes therethrough and is emitted to the outside. Meanwhile, an S-polarized component is reflected in the polarized beam splitter 152, is incident on the liquid crystal display 151, is reflected inside the liquid crystal display 151, and is then emitted from the liquid crystal display 151. Here, in the light emitted from the liquid crystal display 151, a large amount of P-polarized components are included in light output from pixels that display "white", and a large amount of S-polarized components are included in light output from pixels that display "black". Accordingly, the P-polarized components in the light that is emitted from the liquid crystal display 151 and collides with the polarized beam splitter 152 pass through the polarized beam splitter 152 and are guided to the optical system 112. Meanwhile, the S-polarized components are reflected in the polarized beam splitter 152 and return to the light source 153. The optical system 112 includes a convex lens, for example. The image forming device 111 (more specifically, the liquid crystal display 151) is disposed in the position of the focal distance in the optical system 112 in order to generate parallel light.

The frame 10 formed of a spectacle type frame includes a front section 11 that is arranged in front of an observer 20, two temple sections 13 that are rotatably installed at opposite ends of the front section 11 through hinges 12, and an end cover section 14 (also referred to as a tip, earmuff or ear pad) that is installed in a tip end portion of each temple section 13. Further, a nose pad (not illustrated) is installed. That is, an assembly of the frame 10 and the nose pad basically has approximately the same structure as in normal glasses. Further, each housing 113 is detachably installed in or fixed to the temple section 13 by an installation member 19. The frame 10 is formed of metal or plastic. Each housing 113 may be installed the temple section 13 by the installation member 19 so as not to able to be detached from the temple section 13. Further, with respect to an observer 20 who owns and wears glasses, each housing 113 may be detachably installed at the temple section of a frame owned by the observer 20 by the installation member 19. Further, each housing 113 may be installed outside the temple section 13, or may be installed inside the temple section 13.

Further, a wire (signal line, power line or the like) 15 that extends from one image forming device 111A extends outside from the tip end portion of the end cover section 14 through the temple section 13 and the inside of the end cover section 14, and is connected to a control device (control circuit, control section) 18. Further, each of the image forming devices 111A and 111B includes a headphone section 16, and a headphone section wire 17 that extends from each of the respective image forming devices 111A and 111B extends to the headphone section 16 from the tip end portion of the end cover section 14 through the temple section 13 and the inside of the end cover section 14. More specifically, the headphone section wire 17 extends to the headphone section 16 so as to wrap around an auricle from the tip end portion of the end cover section 14. With such a configuration, without giving an impression that the headphone section 16 or the headphone section wire 17 are disorderedly arranged, it is possible to achieve a clean display device.

The dimmer 700 in Example 1 is formed of an optical shutter made of the liquid crystal shutter, to be specific, formed such that the light transmission control material layer 705 is formed of a liquid crystal material layer. That is, the dimmer 700 is formed of the transparent first substrate 701 that faces the optical device 120, and a transparent second substrate 703 that faces the first substrate 701, electrodes 702 and 704 respectively provided in the first substrate 701 and the second substrate 703, and the light transmission control material layer 705 sealed between the first substrate 701 and the second substrate 703.

Here, the first substrate 701 and the second substrate 703 are formed of a plastic material. Further, the first electrode 702 and the second electrode 704 are formed of a transparent electrode formed of an indium-tin oxide (ITO), and are formed based on a combination of a PVD method such as a sputtering method and a lift-off method. Further, the light transmission control material layer 705 is formed of a liquid crystal material layer formed of a TN (twisted nematic) liquid crystal material. The first electrode 702 and the second electrode 704 are not patterned, and are so-called solid electrodes. The first electrode 702 and the second electrode 704 are connected to the light control device 18A through a connector, or a wire (not illustrated). Outer edge portions of the two substrates 701 and 703 are sealed by a sealant 706. Further, the first substrate 701 and the protection member 126 (that protects the light guide plate 121) of the dimmer 700 adhere to each other by the adhesive 707. In addition, polarizing films are attached to the outer surfaces of the first substrate 701 and the second substrate 703. However, illustration of the polarizing films is omitted. The first substrate 701 of the dimmer 700 is made shorter than the light guide plate 121, and the first substrate 701 of the dimmer 700 is fixed to the protection member 126 by the adhesive 707. The adhesive 707 is arranged on an outer edge portion of the first substrate 701. The same applies to Examples 2 to 15 described below. The optical device 120 and the dimmer 700 are arranged in that order from the observer side.

The light transmittance of the dimmer 700 can be controlled by a voltage applied to the first electrode 702 and the second electrode 704. To be specific, for example, when the voltage is applied to the first electrode 702 while the second electrode 704 is grounded, the arrangement state of the liquid crystal in the liquid crystal material layer that forms the light transmission control material layer 705 is changed, and the light transmittance of the liquid crystal material layer is changed (see FIGS. 4A and 4B).

The light control device 18A calculates a quantity of received light change rate based on the quantity of received light measurement result of the light receiving element 711, determines a light transmittance change rate in the dimmer 700 based on the quantity of received light change rate, and controls light transmittance of the dimmer 700 based on the determined light transmittance change rate.

Further, the light control device 18A determines a start time of a change of the quantity of received light (a time when the change of the quantity of received light is started) based on the quantity of received light measurement result of the light receiving element 711, and starts control of the light transmittance of the dimmer 700 after elapse of a predetermined time from the start time of the change of the quantity of received light.

The light receiving element 711 measures the quantity of light of an outside area corresponding to a background of an image to be observed by the observer 20 in the optical device 120, 320, or 520 (for example, the space area indicated by "A" in FIG. 5). The light receiving element 711 includes directivity to light to be received. Specifically, by arranging a lens (not illustrated) on the light incident side of the light receiving element 711, the directivity to the light to be received is provided to the light receiving element 711.

The light control device 18A includes a table related to a relationship between the quantity of received light change rate and the light transmittance change rate in the dimmer 700.

This table is created based on the change of the pupil (pupil diameter) of the observer 20 that follows the change of the quantity of light incident from an outside. Specifically, the relationship between the change of the quantity of light and the change of the pupil (pupil diameter) is checked using an optical device called iriscorder that can measure the change of the pupil (pupil diameter) of a human with respect to photo stimulation, or based on a simplified measurement by an infrared camera, obtains a table related to the relationship between the quantity of received light change rate and the light transmittance change rate in the dimmer 700, and may store the table in a memory of the light control device 18A.

The light control device 18A that controls the light receiving element 711 and the dimmer 700 is formed of a quantity of received light operation circuit, a memory, and a light transmittance control circuit. The quantity of received light operation circuit receives a quantity of received light measurement value from the light receiving element 711, obtains the quantity of received light (illumination), and further obtains the quantity of received light change rate (DELTA)QL. The memory stores the table related to the relationship between the quantity of received light change rate (DELTA)QL and the light transmittance change rate (DELTA)Tr in the dimmer. The light transmittance control circuit determines the light transmittance change rate (DELTA)Tr based on the quantity of received light change rate (DELTA)QL, and controls the light transmittance of the dimmer based on the determined light transmittance change rate (DELTA)Tr. Further, as needed, the light control device 18A may employ a configuration that includes a comparison operation circuit that compares the obtained quantity of received light (illumination) and a standard value, and the second control circuit that controls the dimmer 700 or/and the image forming device 111 or 211 based on a value obtained by the comparison operation circuit. These circuits may be formed of a known circuit. In controlling the dimmer 700, the light transmittance of the dimmer 700 is controlled. Meanwhile, in controlling the image forming device 111 or 211, brightness of an image to be formed in the image forming device 111 or 211 is controlled. The control of the light transmittance in the dimmer 700 and the control of the brightness of an image in the image forming device 111 or 211 may be independently performed, or may be collectively performed.

Figure 10:
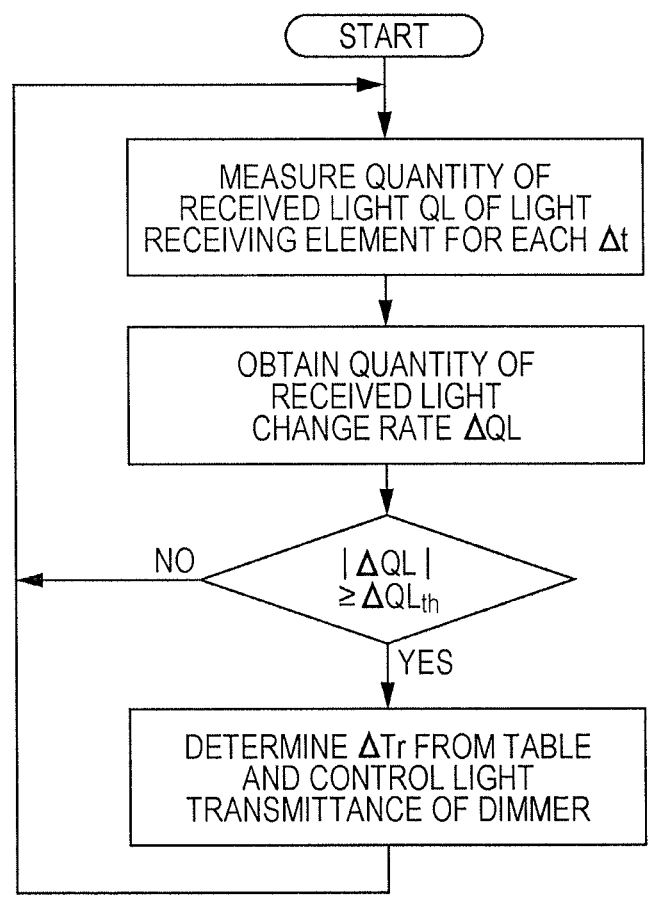
FIG. 10 is a flowchart illustrating a procedure to determine the light transmittance of the dimmer.

A flowchart illustrating a procedure to determine the light transmittance of the dimmer is illustrated in FIG. 10. In the display device of Example 1, the quantity of received light change rate (DELTA)QL is calculated based on the quantity of received light QL of the light receiving element 711. Specifically, for example, the quantity of received light QL is measured by the light receiving element 711 for each (DELTA)t=0.1 seconds. Then, a change amount of the quantity of received light QL during (DELTA)t=0.1 seconds is caused to be the quantity of received light change rate (DELTA)QL. That is, the quantity of received light operation circuit of the light control device 18A obtains the change amount of the quantity of received light QL during (DELTA)t=0.1 seconds as the quantity of received light change rate (DELTA)QL. As the table of the relationship between the quantity of received light change rate and the light transmittance change rate in the dimmer, a relationship [t, (DELTA)$QL_t$, and (DELTA)$Tr_t$] between a change amount (DELTA)$QL_t$ of the quantity of received light for each 0.1 seconds after a change is caused in the quantity of received light and the light transmittance change rate (DELTA)$Tr_t$ in the dimmer is obtained in advance, or determined in advance, and for example, the table is stored in the memory provided in the light control device 18A. Whether the change is caused in the quantity of received light is determined whether the quantity of received light change rate (DELTA)QL becomes a threshold (DELTA)$QL_{th}$ of the quantity of received light change rate set in advance or more, by the light control device 18A. Specifically, when the light transmittance control circuit of the light control device 18A determines the quantity of received light change rate (DELTA)QL has become the threshold (DELTA)$QL_{th}$ set in advance or more, the light transmittance control circuit reads out the light transmittance change rate (DELTA)$Tr_t$ from the table that stores the relationship [t, (DELTA)$QL_t$, and (DELTA)$Tr_t$] between the quantity of received light change rate (DELTA)QL and the light transmittance change rate (DELTA)Tr in the dimmer and determines the light transmittance Tr. The light transmittance control circuit then control the light transmittance of the dimmer 700 based on the determined light transmittance Tr.

Further, a start time of the change of the quantity of received light is determined based on the measurement result of the quantity of received light QL of the light receiving element 711. In this case, when the quantity of received light change rate (DELTA)QL obtained from the quantity of received light measurement result of the light receiving element 711 becomes the threshold (DELTA)$QL_{th}$ set in advance or more, the start time of the change of the quantity of received light is caused to be "0". The control of the light transmittance in the dimmer 700 is started after elapse of a predetermined time after the start time of the change of the quantity of received light. Here, the predetermined time (time lag) is 0.3 seconds. However, it is not limited to the example.

Various change states of the quantity of received light and the quantity of received light change rate are exemplarily illustrated in the upper parts of FIGS. 6A, 6B, 7A, 7B, 8A, 8B, 9A, and 9B, and the change states of the light transmittance and the light transmittance change rate are exemplarily illustrated in the lower parts of FIGS. 6A, 6B, 7A, 7B, 8A, 8B, 9A, and 9B. Note that, in the drawings, the change state of the quantity of received light and the quantity of received light change rate, and the change state of the light transmittance and the light transmittance change rate are illustrated by smooth curved lines. However, in reality, they are changed in a stepwise manner.

Hereinafter, description will be given by dividing the example illustrated in FIG. 6A into: a first stage (the period of "a" to "b" if FIG. 6A); a second stage (the period of "b" to "c" in FIG. 6A); a third stage (the period of "c" to "d" in FIG. 6A); a fourth stage (the period of "d" to "e" in FIG. 6A); a fifth stage (the period of "e" to "f" in FIG. 6A); a sixth stage (the period of "f" to "g" in FIG. 6A); and a seventh stage (the period of "g" to "h" in FIG. 6A). For example, a state in which a vehicle in traveling gets out of a tunnel, and immediately after, is incident on a tunnel again, a state of momentarily receiving light, or a state of momentarily glancing sunlight reflected on a mirror or a glass can be assumed.

(First Stage)

In the first stage (the period of "a" to "b" in FIG. 6A), the quantity of received light is sharply increased from a quantity of received light $QL_0$ of an initial state (here, (DELTA)$QL_t$ is approximately equal to 0) to $QL_1$. In the illustrated example, the time length of the first stage is 0.1 seconds. The time indicated by "a" corresponds to a first start time of the change of the quantity of received light. In the following description, a reference of an elapsed time is the first start time of the change of the quantity of received light. The light transmittance takes a value $Tr_0$ of an initial state.

(Second Stage)

In the second stage (the period of "b" to "c" in FIG. 6A, and after elapse of 0.1 seconds to elapse of 0.3 seconds), there is no change in the quantity of received light $QL_1$. The first and second stages correspond to the predetermined time (time lag), and the total time length of the first and second stages is 0.3 seconds. The light transmittance keeps the value $Tr_0$ of the initial state.

(Third Stage)

In the third stage (the period of "c" to "d" in FIG. 6A, and after elapse of 0.3 second to elapse of 1.0 second), there is no change in the quantity of received light $QL_1$. Meanwhile, at the start of this period, a value of |(DELTA)$Tr_t$| is sharply changed. Then, the value of |(DELTA)$Tr_t$| is continuously changed until the end of the third stage, and the value of |(DELTA)$Tr_t$| is slowly and gradually decreased. The light transmittance is changed from the value $Tr_0$ of the initial state to the value $Tr_1$ in the end of the third stage.

(Fourth Stage)

In the fourth stage (the period of "d" to "e" in FIG. 6A, and after elapse of 1.0 seconds to elapse of 2.0 seconds), there is no change in the quantity of received light $QL_1$, and the light transmittance keeps the value $Tr_1$.

(Fifth Stage)

In the fifth stage (the period of "e" to "f" in FIG. 6A, and after elapse of 2.0 seconds to elapse of 2.1 seconds), the quantity of received light is sharply decreased from the quantity of received light $QL_1$ to $QL_0$. The time indicated by "e" corresponds to a second start time of the change of the quantity of received light. The light transmittance keeps the value $Tr_1$.

(Sixth Stage)

In the sixth stage (the period of "f" to "g" in FIG. 6A, and after elapse of 2.1 second to elapse of 2.3 seconds), there is no change in the quantity of received light $QL_0$. The light transmittance keeps the value $Tr_1$. The fifth and sixth stages correspond to the predetermined time (time lag), and the total time length of the fifth and sixth stages is 0.3 seconds.

(Seventh Stage)

In the seventh stage (the period of "g" to "h" in FIG. 6A, and after elapse of 2.3 seconds to elapse of 5.0 seconds), the value of the light transmittance Tr is slowly increased, and the light transmittance Tr is returned to the value $Tr_0$ of the initial state at the end of the seventh stage. The change of the value |(DELTA)$Tr_t$| in the seventh stage is more slowly than the change of the value |(DELTA)$Tr_t$| in the third stage.

Various tests are conducted, and the voltage application state to the first electrode 702 of the dimmer is determined and is stored in the memory of the light control device 18A so that light transmittance change rate (change of the light transmittance) in the states described above can be obtained.

The example illustrated in FIG. 6B shows an inverse increase/decrease state of the change state of the quantity of received light and the quantity of received light change rate, and the change state of the light transmittance and the light transmittance change rate, with the example illustrated in FIG. 6A.

Next, description will be given by dividing the example illustrated in FIG. 7A into: a first stage (the period of "a" to "b" if FIG. 7A); a second stage (the period of "b" to "c" in FIG. 7A); a third stage (the period of "c" to "d" in FIG. 7A); and a fourth stage (the period of "d" and subsequent period in FIG. 7A). For example, a state in which a vehicle in traveling gets out of a tunnel, a state in which a vehicle in traveling is incident on a tunnel, a state of continuously receiving light, or a state of continuously viewing sunlight reflected on a mirror or a glass can be assumed.

(First Stage)

In the first stage (the period of "a" to "b" in FIG. 7A), the quantity of received light is sharply increased from a quantity of received light $QL_0$ of an initial state (here, (DELTA)$QL_t$ is approximately equal to 0) to $QL_1$. In the illustrated example, the time length of the first stage is 0.1 seconds. The time indicated by "a" corresponds to a start time of the change of the quantity of received light. In the following description, a reference of an elapsed time is the start time of the change of the quantity of received light. The light transmittance takes a value $Tr_0$ of an initial state.

(Second Stage)

In the second stage (the period of "b" to "c" in FIG. 7A, and after elapse of 0.1 seconds to elapse of 0.3 seconds), there is no change in the quantity of received light $QL_1$. The first and second stages correspond to the predetermined time (time lag), and the total time length of the first and second stages is 0.3 seconds. The light transmittance keeps the value $Tr_0$ of the initial state.

(Third Stage)

In the third stage (the period of "c" to "d" in FIG. 7A, and after elapse of 0.3 second to elapse of 1.0 second), there is no change in the quantity of received light $QL_1$. Meanwhile, at the start of this period, a value of |(DELTA)$Tr_t$| is sharply changed. Then, the value of |(DELTA)$Tr_t$| is continuously changed until the end of the third stage, and the value of |(DELTA)$Tr_t$| is slowly and gradually decreased. The light transmittance is changed from the value $Tr_0$ of the initial state to the value $Tr_1$ in the end of the third stage.

(Fourth Stage)

In the fourth stage (the period of "d" in FIG. 7A, and after elapse of 1.0 seconds), there is no change in the quantity of received light $QL_1$, and the light transmittance keeps the value $Tr_1$.

Various tests are conducted, and the voltage application state to the first electrode 702 of the dimmer is determined and is stored in the memory of the light control device 18A so that light transmittance change rate (change of the light transmittance) in the states described above can be obtained.

Figure 7A:
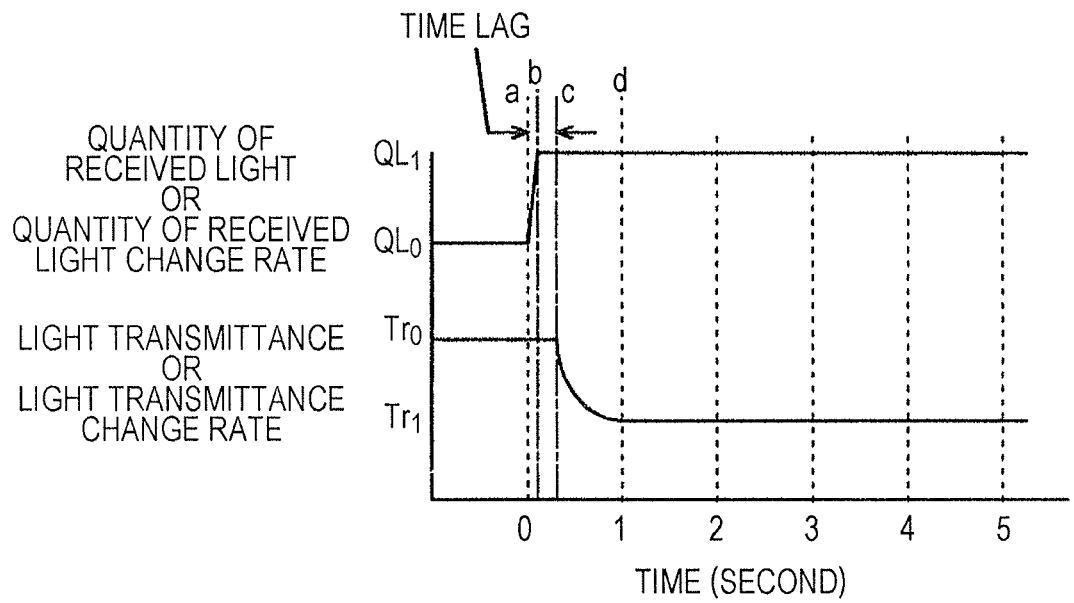
FIGS. 7A and 7B are diagrams schematically illustrating a temporal change of a quantity of received light and the light transmittance of the dimmer.
Figure 7B:
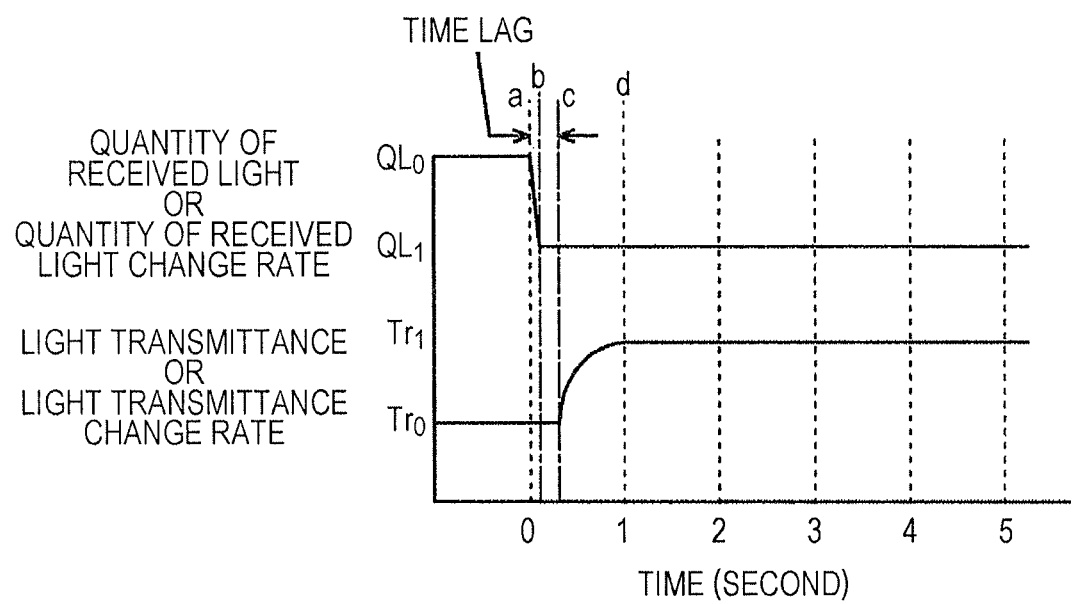

The example illustrated in FIG. 7B shows an inverse increase/decrease state of the change state of the quantity of received light and the quantity of received light change rate, and the change state of the light transmittance and the light transmittance change rate, with the example illustrated in FIG. 7A.

Next, description will be given by dividing the example illustrated in FIG. 8A into: a first stage (the period of "a" to "b" if FIG. 8A); a second stage (the period of "b" to "c" in FIG. 8A); a third stage (the period of "c" to "d" in FIG. 8A); a fourth stage (the period of "d" to "e" in FIG. 8A); and a fifth stage (the period of "e" to "f" in FIG. 8A).

(First Stage)

In the first stage (the period of "a" to "b" in FIG. 8A), the quantity of received light QL is increased from the quantity of received light $QL_0$ of an initial state (here, (DELTA)$QL_t$ is approximately equal to 0). Note that the |(DELTA)$QL_t$| is smaller than |(DELTA)$QL_t$| in the first stage (the period of "a" to "b" in FIG. 6A) in the example illustrated in FIG. 6A. In the illustrated example, the time length of the first stage is 0.3 seconds. The time indicated by "a" corresponds to a first start time of the change of the quantity of received light. In the following description, a reference of an elapsed time is the first start time of the change of the quantity of received light. The light transmittance takes a value $Tr_0$ of an initial state.

(Second Stage)

In the second stage (the period of "b" to "c" in FIG. 8A) and after elapse of 0.3 seconds to elapse of 2.0 seconds), the quantity of received light QL is continuously increased, and becomes $QL_1$ at the end of the second stage. When the second stage is started, the value |(DELTA)$Tr_t$| is started to change. Note that |(DELTA)$Tr_t$| is smaller than |(DELTA)$Tr_t$| in the third stage (the period of "c" to "d" in FIG. 6A) in the example illustrated in FIG. 6A. The value of the light transmittance is decreased from $Tr_0$ to $Tr_1$ from the start to the end of the second stage.

(Third Stage)

In the third stage (the period of "c" to "d" in FIG. 8A, and after elapse of 2.0 seconds to elapse of 2.3 seconds), the quantity of received light QL is started to decrease. The time indicated by "c" corresponds to a second start time of the change of the quantity of received light. The value of the light transmittance is slowly and continuously decreased.

(Fourth Stage)

In the fourth stage (the period of "d" to "e" in FIG. 8A, and after elapse of 2.3 second to elapse of 4.0 seconds), the quantity of received light $QL_1$ is continuously decreased, and becomes the quantity of received light $QL_0$ at the end of the fourth stage. The value of the light transmittance Tr is slowly increased. The value |(DELTA)$Tr_t$| in the fourth stage is more slowly changed than |(DELTA)$Tr_t$| in the second stage.

(Fifth Stage)

In the fifth stage (the period of "e" to "f" in FIG. 8A, and after elapse of 4.0 seconds to elapse of 5.0 seconds), there is no change in the quantity of received light $QL_0$. The value of the light transmittance Tr is slowly increased, and the light transmittance Tr is returned to the value $Tr_0$ as the initial value at the end of the fifth stage.

Various tests are conducted, and the voltage application state to the first electrode 702 of the dimmer is determined and is stored in the memory of the light control device 18A so that light transmittance change rate (change of the light transmittance) in the states described above can be obtained.

Figure 8A:
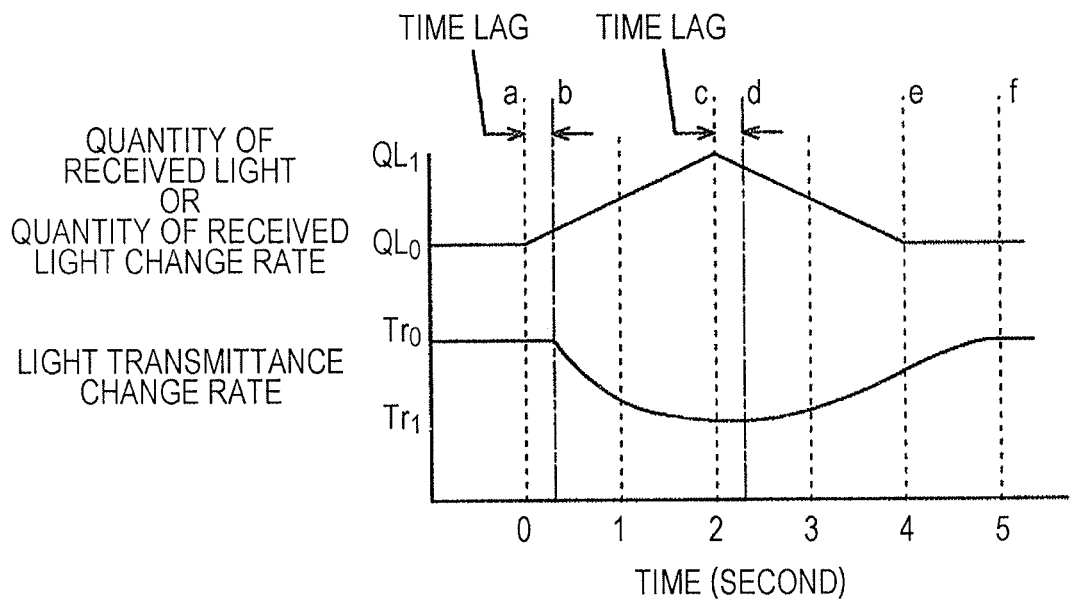
FIGS. 8A and 8B are diagrams schematically illustrating a temporal change of a quantity of received light and the light transmittance of the dimmer.
Figure 8B:
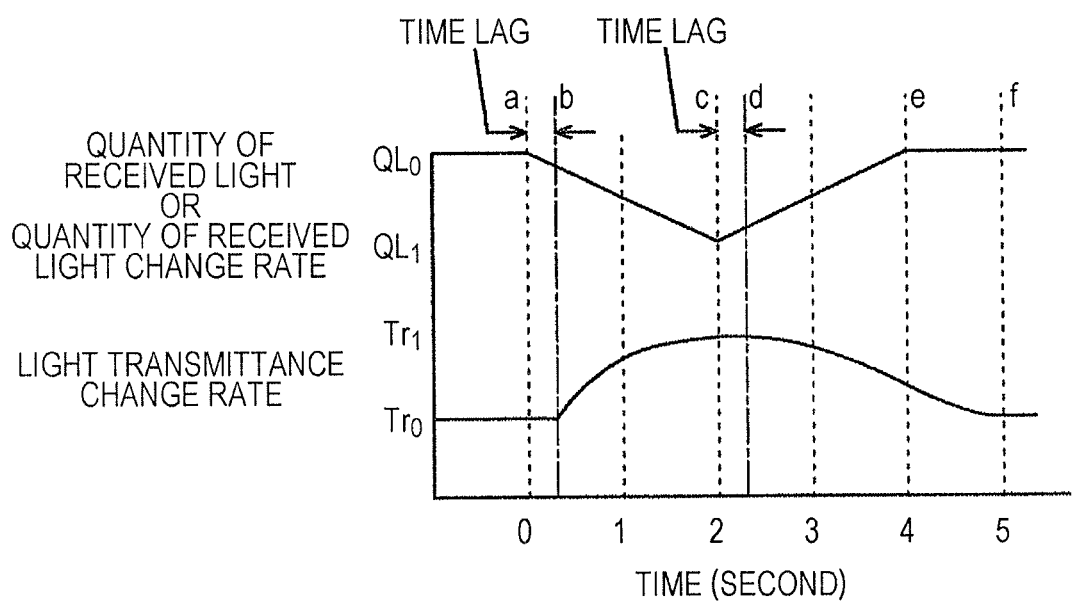

The example illustrated in FIG. 8B shows an inverse increase/decrease state of the change state of the quantity of received light and the quantity of received light change rate, and the change state of the light transmittance and the light transmittance change rate, with the example illustrated in FIG. 8A.

Next, description of the example illustrated in FIG. 9A will be given by dividing the example into: a first stage (the period of "a" to "b" if FIG. 9A); a second stage (the period of "b" to "c" in FIG. 9A); and a third stage (the period of "c" and a subsequent period in FIG. 9A).

(First Stage)

In the first stage (the period of "a" to "b" in FIG. 9A), the quantity of received light QL is increased from the quantity of received light $QL_0$ of an initial state (here, (DELTA)$QL_t$ is approximately equal to 0). Note that the |(DELTA)$QL_t$| is smaller than |(DELTA)$QL_t$| in the first stage (the period of "a" to "b" in FIG. 7A) in the example illustrated in FIG. 7A. In the illustrated example, the time length of the first stage is 0.3 seconds. The time indicated by "a" corresponds to a start time of the change of the quantity of received light. In the following description, a reference of an elapsed time is the start time of the change of the quantity of received light. The light transmittance takes a value $Tr_0$ of an initial state.

(Second Stage)

In the second stage (the period of "b" to "c" in FIG. 9A) and after elapse of 0.3 seconds to elapse of 2.0 seconds), the quantity of received light QL is continuously increased, and becomes $QL_1$ at the end of the second stage. When the second stage is started, the value |(DELTA)$Tr_t$| is started to change. Note that |(DELTA)$Tr_t$| is smaller than |(DELTA)$Tr_t$| in the third stage (the period of "c" to "d" in FIG. 7A) in the example illustrated in FIG. 7A. The value of the light transmittance is decreased from $Tr_0$ to $Tr_1$ from the start to the end of the second stage.

(Third Stage)

In the third stage (the period of "c" in FIG. 9A and a subsequent period, and after elapse of 2.0 seconds), there is no change in the quantity of received light QL, and there is also no change in the value $Tr_1$ of the light transmittance Tr.

Various tests are conducted, and the voltage application state to the first electrode 702 of the dimmer is determined and is stored in the memory of the light control device 18A so that light transmittance change rate (change of the light transmittance) in the states described above can be obtained.

Figure 9A:
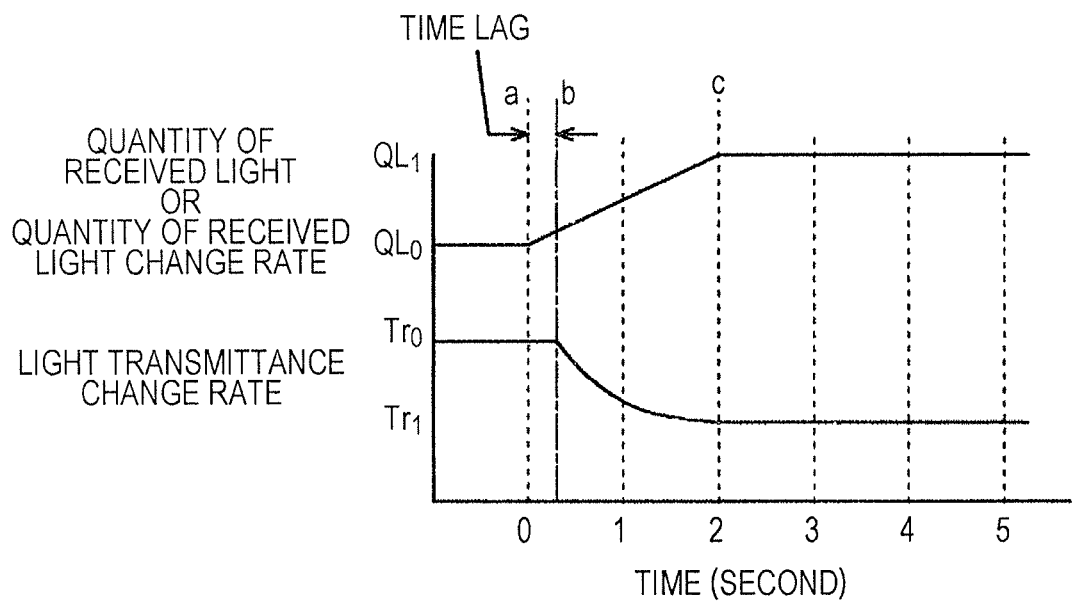
FIGS. 9A and 9B are diagrams schematically illustrating a temporal change of a quantity of received light and the light transmittance of the dimmer.
Figure 9B:
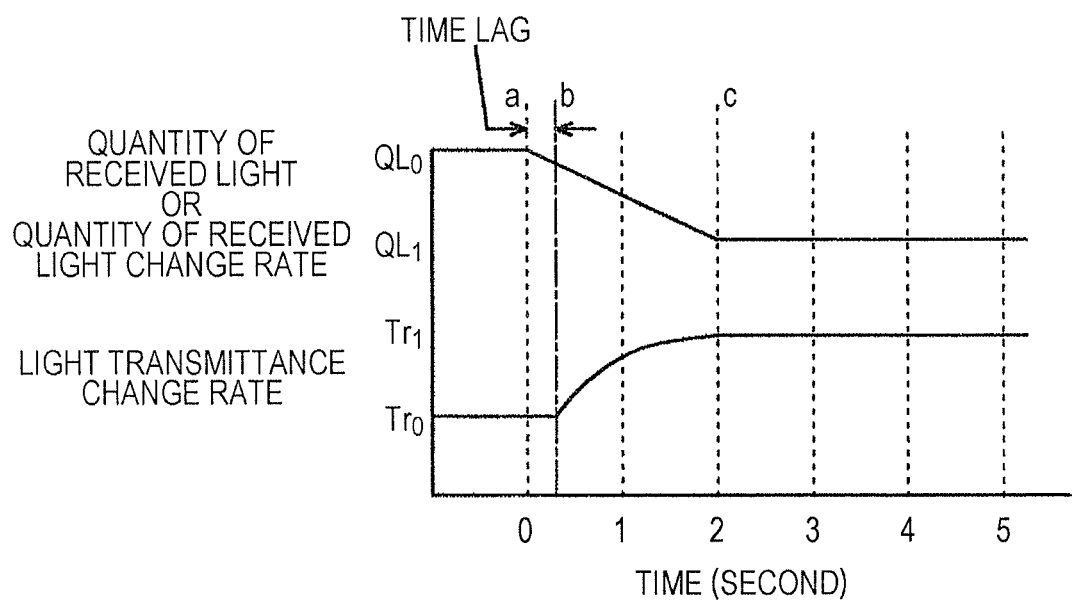

The example illustrated in FIG. 9B shows an inverse increase/decrease state of the change state of the quantity of received light and the quantity of received light change rate, and the change state of the light transmittance and the light transmittance change rate, with the example illustrated in FIG. 9A.

The illumination of the environment where the display device is placed may be measured by the light receiving element 711 or an illumination sensor (environment illumination measuring sensor) that is different from the light receiving element 711, the light transmittance of the dimmer 700 may be controlled by the comparison operation circuit and the second control circuit based on the measurement result, and the brightness of an image formed by the image forming device 111 or 211 may be collectively or independently controlled based on the measurement result of the light receiving element 711 or the environment illumination measuring sensor. The environment illumination measuring sensor may be arranged on an outside end part of the optical device 120 or 320 (to be specific, on the outside end part of the light guide plate 121 or 321), for example.

To be specific in a state where the day is getting to break, or a state of getting dark in the evening, the quantity of received light change rate (DELTA)QL does not exceed the threshold (DELTA)$QL_{th}$ set in advance, but the quantity of received light QL is gradually changed. That is, a change is caused in the quantity of received light $QL_0$ of the initial state. In such a case, the obtained quantity of received light (illumination) is compared with a standard value in the comparison operation circuit of the light control device 18A, and the light transmittance of the dimmer 700 may be controlled by the second control circuit based on a value obtained by the comparison operation circuit. For example, when the quantity of received light measurement result of the light receiving element 711 is a predetermined value (first illumination measurement value) or more, the light transmittance of the dimmer 700 is caused to the a predetermined value (first light transmittance) or less. Meanwhile, when the measurement result of the light receiving element 711 is a predetermined (second illumination measurement value) or less, the light transmittance of the dimmer 700 is caused to be a predetermined value (second light transmittance) or more. Here, the first illumination measurement value may be set to 10 lux, the first light transmittance may be set to any value of 1% to 20%, the second illumination measurement value may be set to 0.01 lux, and the second transmittance may be set to any value of 30% to 99%.

Note that, in the above-described control, while the light transmittance of the dimmer 700 is controlled, the brightness of an image formed in the image forming device 111 or 211 may be performed. The control of the light transmittance in the dimmer 700 and the control of the brightness of an image in the image forming device 111 or 211 may be independently performed, or may be collectively performed. In this way, if the light transmittance of the dimmer is controlled and the brightness of an image formed by the image forming device is controlled based on the measurement result of the light receiving element 711 or the environment illumination measuring sensor, not only high contrast can be provided to an image observed by the observer 20, but also an observation state of the image can be optimized depending on the illumination of surrounding environment of the display device.

In the display device of Example 1, the light control device calculates a quantity of received light change rate based on a quantity of received light measurement result of the light receiving element, determines a light transmittance change rate in the dimmer based on the quantity of received light change rate, and controls light transmittance of the dimmer based on the determined light transmittance change rate. Therefore, a display device that provides the observer who wears the display device with a less unpleasant feeling and that does not force the eyes to bear substantial burden can be provided even if the quantity of incident light from an outside is changed. Further, the light control device determines a start time of a change of a quantity of received light based on a quantity of received light measurement result of the light receiving element, and starts control of light transmittance of the dimmer after elapse of a predetermined time from the start time of the change of the quantity of received light. Therefore, a display device that provides the observer who wears the display device with a less unpleasant feeling and that does not force the eyes to bear substantial burden can be provided even if the quantity of incident light from an outside is changed. Furthermore, the light transmittance of the dimmer is controlled based on the quantity of received light measurement result of the light receiving element. Therefore, the overall structure of the display device can be simplified, and high contrast can be provided to an image observed by the observer. In addition, for example, an observation state of the image can be optimized depending on the illumination of surrounding environment of the display device.

Example 2

Figure 11:
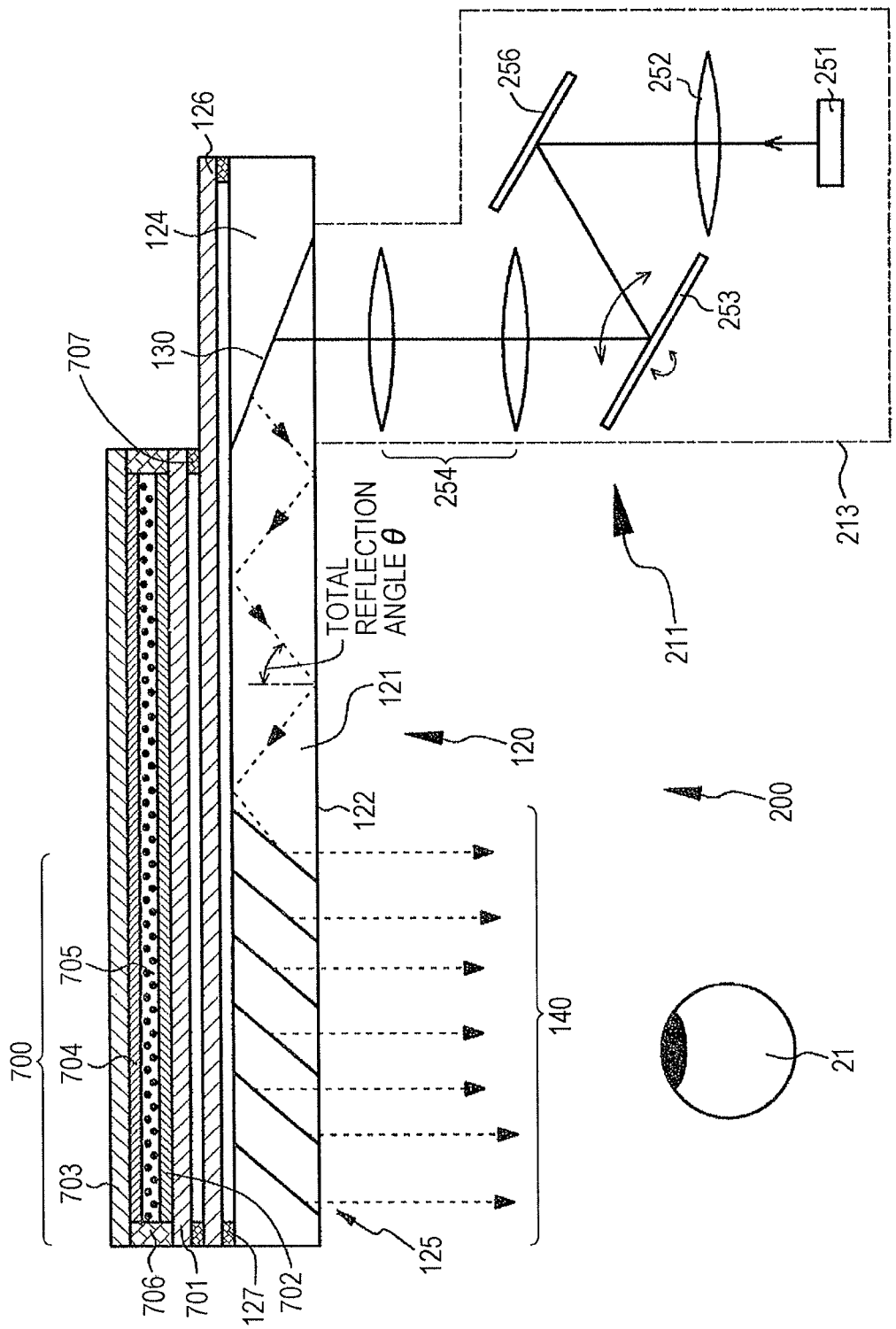
FIG. 11 is a conceptual diagram of an image display device in a display device of Example 2.

Example 2 is a modification example of Example 1. FIG. 11 is a conceptual diagram illustrating an image display device 200 in a display device (head mounted display) according to Example 2. In the second embodiment, an image forming device 211 includes an image forming device of a second configuration. That is, the image forming device 211 includes a light source 251, and a scanning section 253 that scans parallel light emitted from the light source 251. More specifically, the image forming device 211 includes (i) the light source 251, (ii) a collimating optical system 252 that collimates light output from the light source 251 into parallel light, (iii) the scanning section 253 that scans parallel light emitted from the collimating optical system 252, and (iv) a relay optical system 254 that relays parallel light scanned by the scanning section 253 and then emits the result. The entire image forming device 211 is accommodated in a housing 213 (indicated by a dashed line in FIG. 11), an opening section (not illustrated) is formed in the housing 213, and light is emitted from the relay optical system 254 through the opening section. Further, each housing 213 is detachably installed in a temple section 13 by an installation member 19.

The light source 251 includes a light emitting element which emits white color. Further, light emitted from the light source 251 is incident on the collimating optical system 252 that has a positive optical power as a whole, and is then output as parallel light. Further, this parallel light is reflected by a total reflection mirror 256, and is subject to horizontal scanning and vertical scanning by the scanning section 253 that includes a MEMS in which micromirrors are rotatably arranged in two-directional directions and incident parallel light is able to be scanned in a two-directional manner, to become a kind of two-dimensional image to generate virtual pixels (in which the number of pixels may be the same as in Example 1, for example). Further, light from the virtual pixels passes through the relay optical system (parallel light emitting optical system) 254 that is formed by a known relay optical system, and light flux that has been collimated into parallel light is incident on an optical device 120.

Since the optical device 120 on which light flux collimated into parallel light by the relay optical system 254 is incident, in which the light is guided, and from which the light is emitted has the same configuration or structure as that of the optical device described in Example 1, its detailed description will be omitted. Further, since the display device according to Example 2 has substantially the same configuration or structure as that of the display device in the first embodiment except that the image forming device 211 of a different type is used as described above, its detailed description will be omitted.

Example 3

Figure 12:
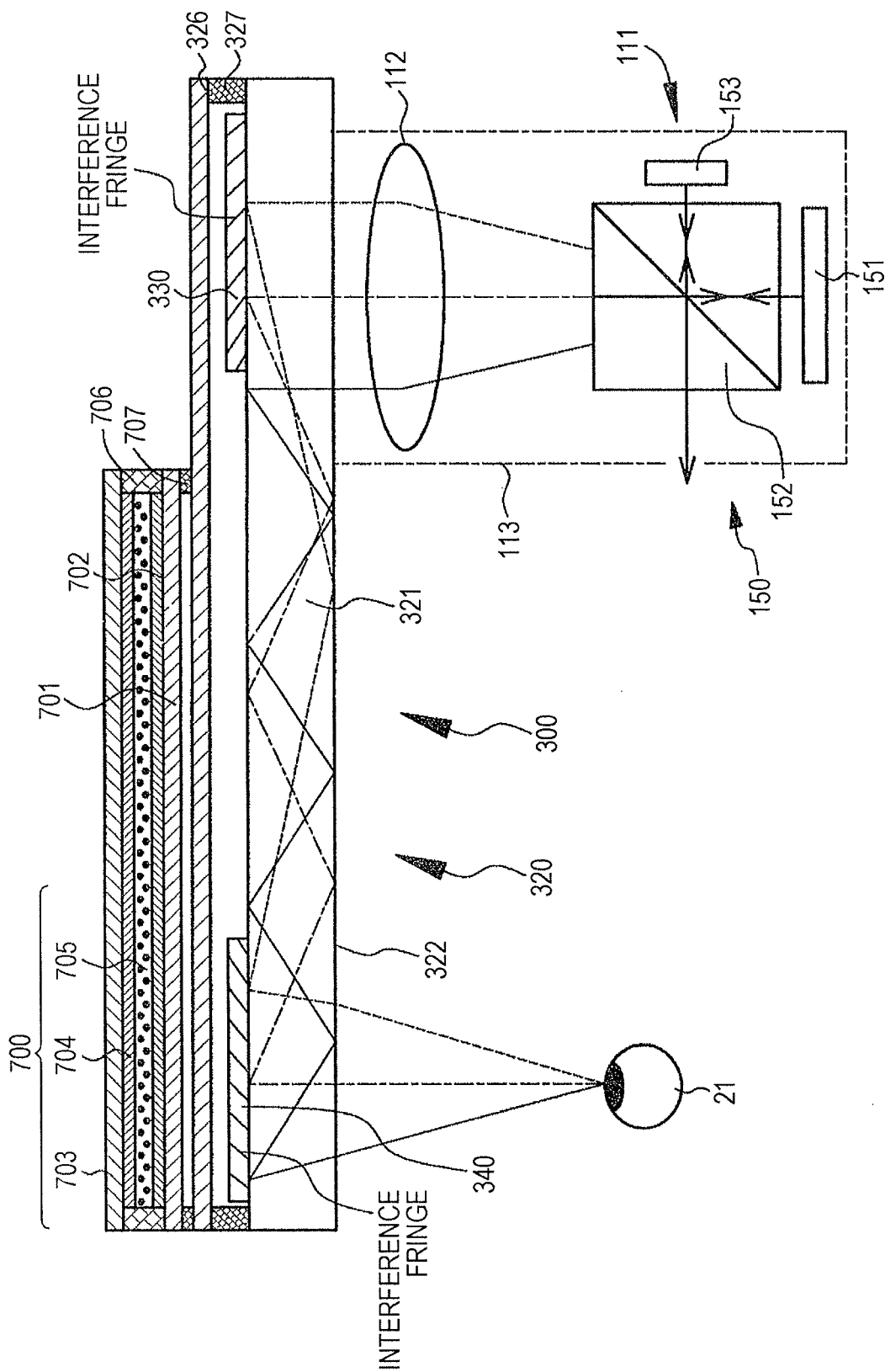
FIG. 12 is a conceptual diagram of an image display device in a display device of Example 3.
Figure 13:
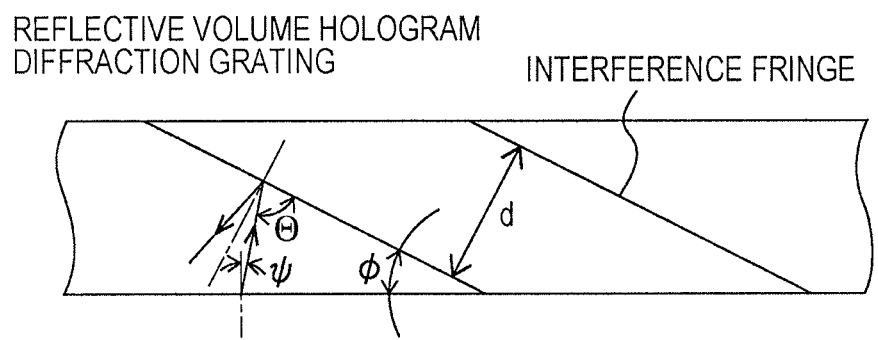
FIG. 13 is a schematic cross-sectional view illustrating an enlarged part of a reflective volume hologram diffraction grating in the display device of Example 3.

Example 3 is a modification example of Example 1. FIG. 12 is a conceptual diagram illustrating the image display device 300 in a display device (head mounted display) according to Example 3. Further, FIG. 13 is an enlarged cross-sectional view schematically illustrating a part of a reflective volume hologram diffraction grating. In Example 3, in a similar way to Example 1, the image forming device 111 includes an image forming device of a first configuration. Further, an optical device 320 has substantially the same basic configuration or structure as that of the optical device 120 in Example 1, except that a first deflection unit and a second deflection unit of a different configuration or structure are used.

In Example 3, the first deflection unit and the second deflection unit are disposed on a front surface (specifically, a second surface 323 of a light guide plate 321) of the light guide plate 321. Further, the first deflection unit diffracts light incident on the light guide plate 321, and the second deflection unit diffracts light propagated inside the light guide plate 321 with total reflection over a plurality of times. Here, the first deflection unit and the second deflection unit include a diffraction grating element, specifically, a reflective diffraction grating element, and more specifically, a reflective volume hologram diffraction grating. In the following description, a first deflection unit formed by the reflective volume hologram diffraction grating is referred to as a "first diffraction grating member 330", and a second deflection unit formed by the reflective volume hologram diffraction grating is referred to as a "second diffraction grating member 340", for convenience of description.

Further, in Example 3 or Example 4 described below, the first diffraction grating member 330 and the second diffraction grating member 340 have a configuration in which one diffraction grating layer is layered. Interference fringes corresponding to one type of wavelength band (or wavelength) are formed in each diffraction grating layer made of a photopolymer material, which is manufactured by a method in the related art. The pitch of the interference fringes formed in the diffraction grating layer (diffraction optical element) is constant, and the interference fringes are linear and are in parallel with the Z axis. Here, axis lines of the first diffraction grating member 330 and the second diffraction grating member 340 are in parallel with the X axis, and normal lines thereof are in parallel with the Y axis.

FIG. 13 is an enlarged cross-sectional view schematically illustrating a part of the reflective volume hologram diffraction grating. Interference fringes having an inclination angle (phi) are formed in the reflective volume hologram diffraction grating. Here, the inclination angle (phi) represents an angle formed by the front surface of the reflective volume hologram diffraction grating and the interference fringes. The interference fringes are formed over the front surface from the inside of the reflective volume hologram diffraction grating. The interference fringes satisfy the Bragg condition. Here, the Bragg condition refers to a condition which satisfies the following formula (A). In formula (A), m is a positive integer, (lambda) is a wavelength, d is the pitch of a grating surface (interval of a virtual flat surface including interference fringes in the normal line direction), and (THETA) is a complementary angle of an incident angle to interference fringes. Further, in a case where light is incident on the diffraction grating member at an incident angle (psi), the relationship between (THETA), the inclination angle (phi), and the incident angle (psi) is illustrated as formula (B).

$$m \times (\text{lambda}) = 2 \times d \times \sin((\text{theta})) \quad (A)$$

$$(\text{THETA}) = 90 \text{ deg} - ((\text{phi}) + (\text{psi})) \quad (B)$$

As described above, the first diffraction grating member 330 is disposed (attached to) on the second surface 323 of the light guide plate 321, and parallel light incident on the light guide plate 321 is diffracted and reflected so that parallel light incident on the light guide plate 321 through the first surface 322 is totally reflected inside the light guide plate 321. Further, as described above, the second diffraction grating member 340 is disposed (attached to) on the second surface 323 of the light guide plate 321, and parallel light propagated inside the light guide plate 321 with total reflection is diffracted and reflected a plurality of times and is emitted from the light guide plate 321 through the first surface 322 as it is.

Further, in the light guide plate 321, the parallel light is propagated therein with total reflection, and is then emitted therefrom. Here, since the light guide plate 321 is thin and the optical path inside the light guide plate 321 is long, the number of total reflections up to the second diffraction grating member 340 varies according to each field angle. More specifically, in parallel light incident on the light guide plate 321, the number of reflections of parallel light incident on at an angle in a direction that is close to that of the second diffraction grating member 340 is smaller than the number of reflections of parallel light incident on the light guide plate 321 at an angle in a direction that is distant from that of the second diffraction grating member 340. This is because parallel light that is diffracted and reflected in the first diffraction grating member 330, which is parallel light incident on the light guide plate 321 at the angle in the direction that is close to that of the second diffraction grating member 340, has a small angle formed with respect to the normal line of the guide plate 321 when light propagated inside the light guide plate 321 collides with an inner surface of the light guide plate 321, compared with parallel light incident on the light guide plate 321 at an angle in the reverse direction. Further, the shape of interference fringes formed inside the second diffraction grating member 340 and the shape of interference fringes formed inside the first diffraction grating member 330 have a symmetric relationship with respect to a virtual surface perpendicular to the axis line of the light guide plate 321. Surfaces of the first diffraction grating member 330 and the second diffraction grating member 340 that do not face the light guide plate 321 are coated by a protection member (protection plate) 326 to prevent damage to the first diffraction grating member 330 and the second diffraction grating member 340. The light guide plate 321 and the protection member 326 are adhered to each other in an outer periphery with an adhesive 327. Further, a transparent protection film may be attached to the first surface 322 to protect the light guide plate 321.

The light guide plate 321 according to Example 4 described below basically includes the same configuration or structure as that of the light guide plate 321 described above.

Since the display device according to Example 3 basically has substantially the same configuration or structure as that of the display device according to Examples 1 and 2, except that the optical device 320 of a different structure is used as described above, its detailed description will be omitted.

Example 4

Figure 14:
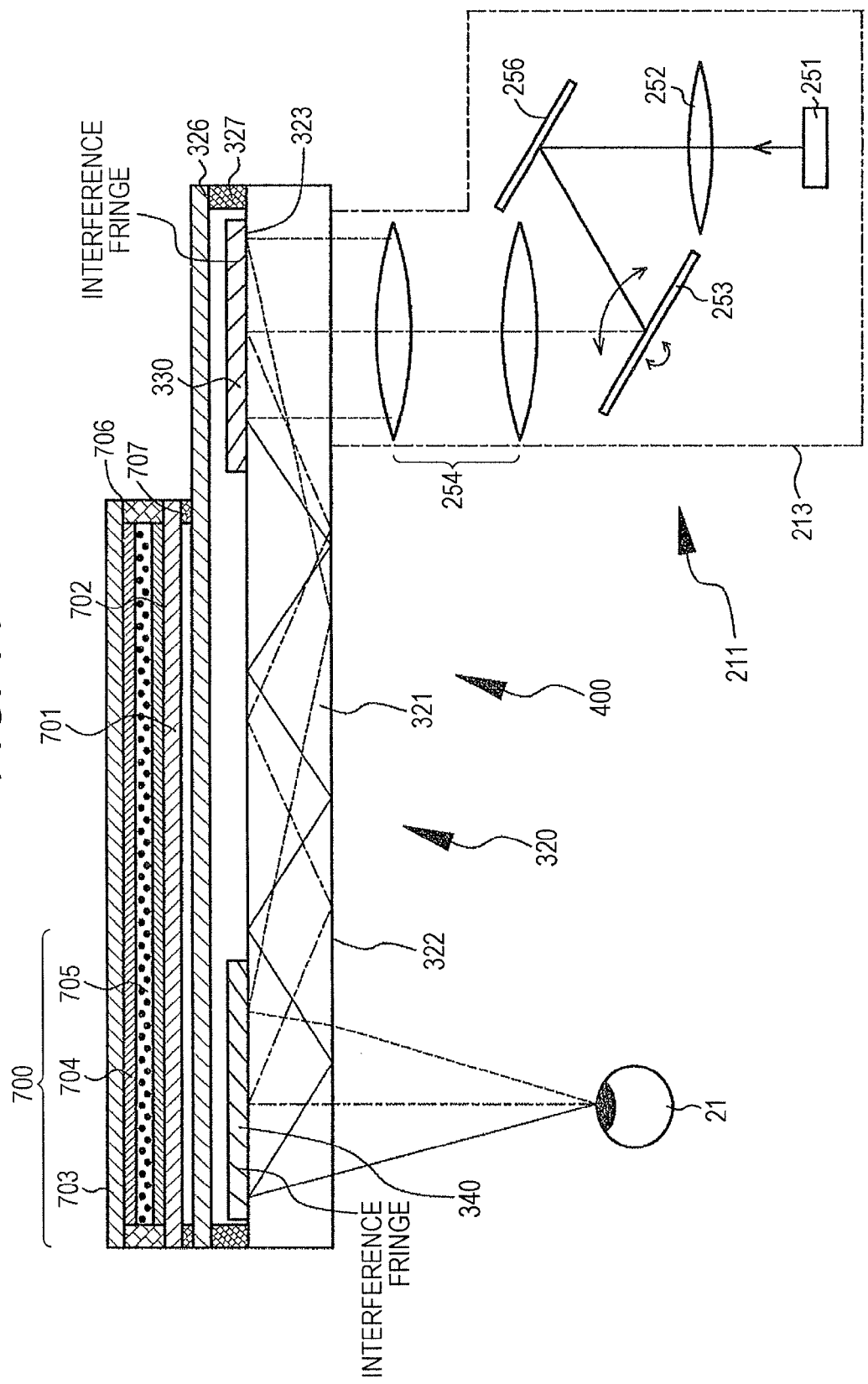
FIG. 14 is a conceptual diagram of an image display device in a display device of Example 4.

Example 4 is a modification example of Example 3. FIG. 14 is a conceptual diagram illustrating an image display device in a display device (head mounted display) according to Example 4. A light source 251, a collimating optical system 252, a scanning section 253, a parallel light emitting optical system (relay optical system) 254, and the like in an image display device 400 according to Example 4 have the same configuration or structure (image forming device of a second configuration) as that of Example 2. Further, an optical device 320 in Example 4 has the same configuration or structure as that of the optical device 320 in Example 3. Since the display device according to Example 4 has substantially the same configuration or structure as that of the display device according to Examples 2 and 3, except for the above-described differences, its detailed description will be omitted.

Example 5

Figure 15:
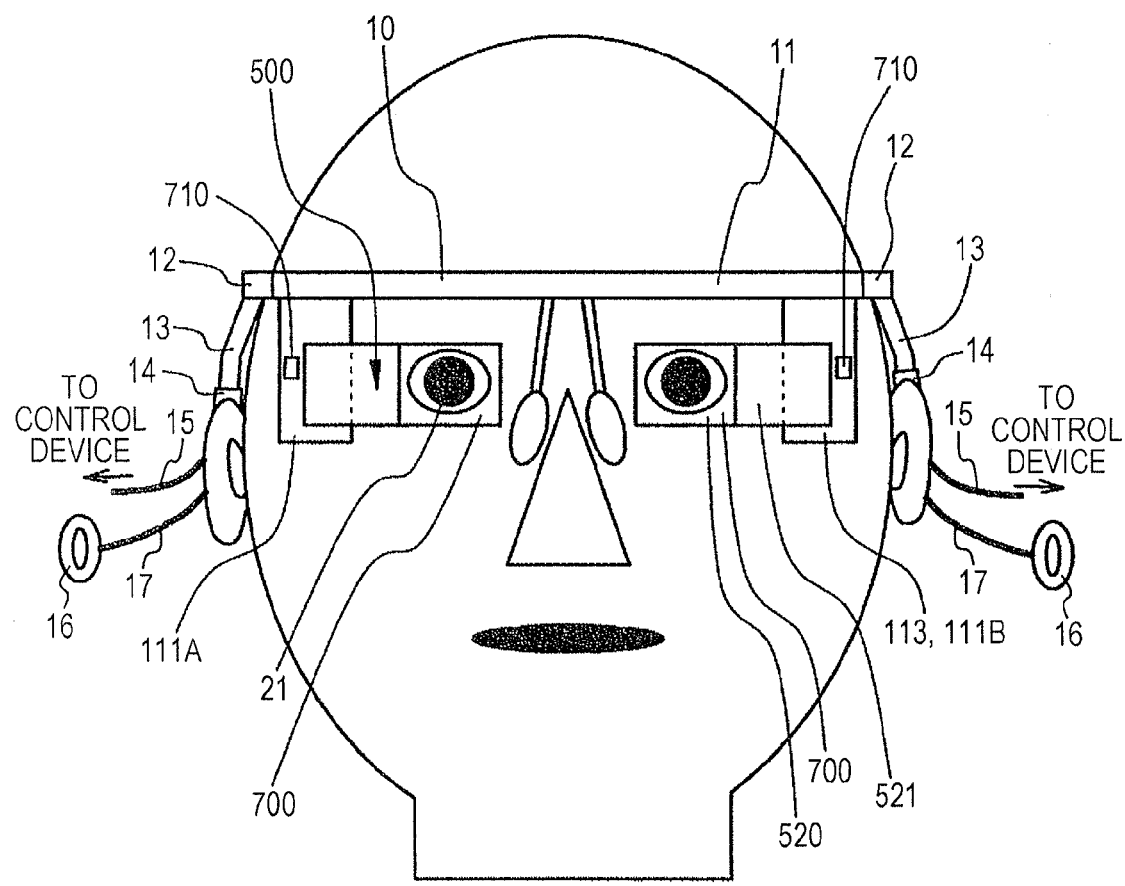
FIG. 15 is a schematic diagram of a display device of Example 5, as viewed from the front.
Figure 16:
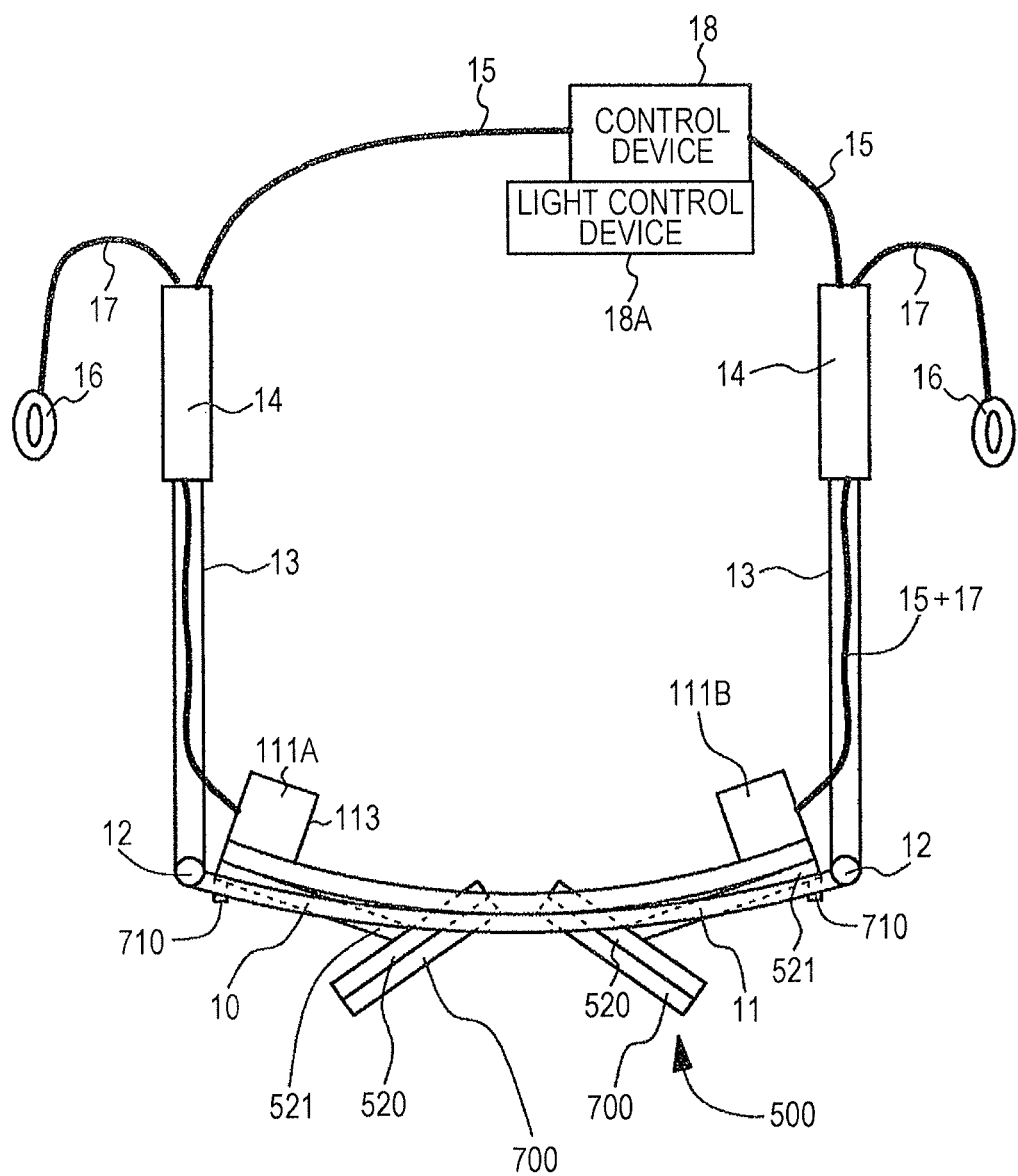
FIG. 16 is a schematic diagram of the display device of Example 5, as viewed from above.

Example 5 is a modification example according to Examples 1 to 4. FIG. 15 is a schematic diagram illustrating a display device according to Example 5, as viewed from the front, and FIG. 16 is a schematic diagram illustrating the display device according to Example 5, as viewed from above.

In Example 5, an optical device 520 that forms the image display device 500 includes a semi-transmissive mirror on which light emitted from image forming devices 111A and 111B is incident, and from which the light is emitted toward the pupil 21 of the observer 20. In Example 5, the light output from the image forming devices 111A and 111B is propagated inside a transparent member 521 such as a glass plate or a plastic plate and is then incident on the optical device 520 (semi-transmissive mirror), but may be propagated in the air and may be then incident on the optical device 520. Further, the image forming device may be the same as the image forming device 211 described in Example 2.

Each of the image forming devices 111A and 111B is installed in the front section 11 using screws, for example. Further, the member 521 is installed in each of the image forming devices 111A and 111B, the optical device 520 (semi-transmissive mirror) is installed in the member 521, and a dimmer 700 is installed in the optical device 520 (semi-transmissive mirror). Further, a light shielding section is installed in a frame. Since the display device according to Example 5 has substantially the same configuration or structure as that of the display device according to Examples 1 to 4, except for the above-described differences, its detailed description will be omitted.

Example 6

Example 6 is a modification example of Examples 1 to 5. In Example 6, the light control device further includes a moving speed calculation unit that calculates a moving speed of the display device, and starts to control the light transmittance of the dimmer based on the moving speed calculated by the moving speed calculation unit. Further, the light control device determines the light transmittance change rate in the dimmer based on the moving speed of the display device calculated by the moving speed calculation unit. The moving speed calculation unit may be formed of a speed/acceleration sensor, and an arithmetic unit that obtains the moving speed based on data from the speed/acceleration sensor. The speed/acceleration sensor and the arithmetic unit may be known speed/acceleration sensor and arithmetic unit. Alternatively, the moving speed calculation unit may be formed of a global positioning system (GPS) and an arithmetic unit that obtains the moving speed based on data from the global positioning system (GPS). Note that the global positioning system (GPS) and the arithmetic unit may be known global positioning system and arithmetic unit. When the moving speed of the display device is fast, the value |(DELTA)$Tr_r$| is made large. When the moving speed of the display device is fast, the predetermined time (time lag) is made short. A relationship of the increase rate between the moving speed and the value |(DELTA)$Tr_r$| of the display device, and the degree of shortening of the moving speed of the display device and a predetermined time may be stored in the memory of the light control device 18A.

Since the display device according to Example 6 has the same configuration or structure as that of the display device according to Examples 1 to 5, except for the above-described differences, its detailed description will be omitted.

Example 7

Figure 17:
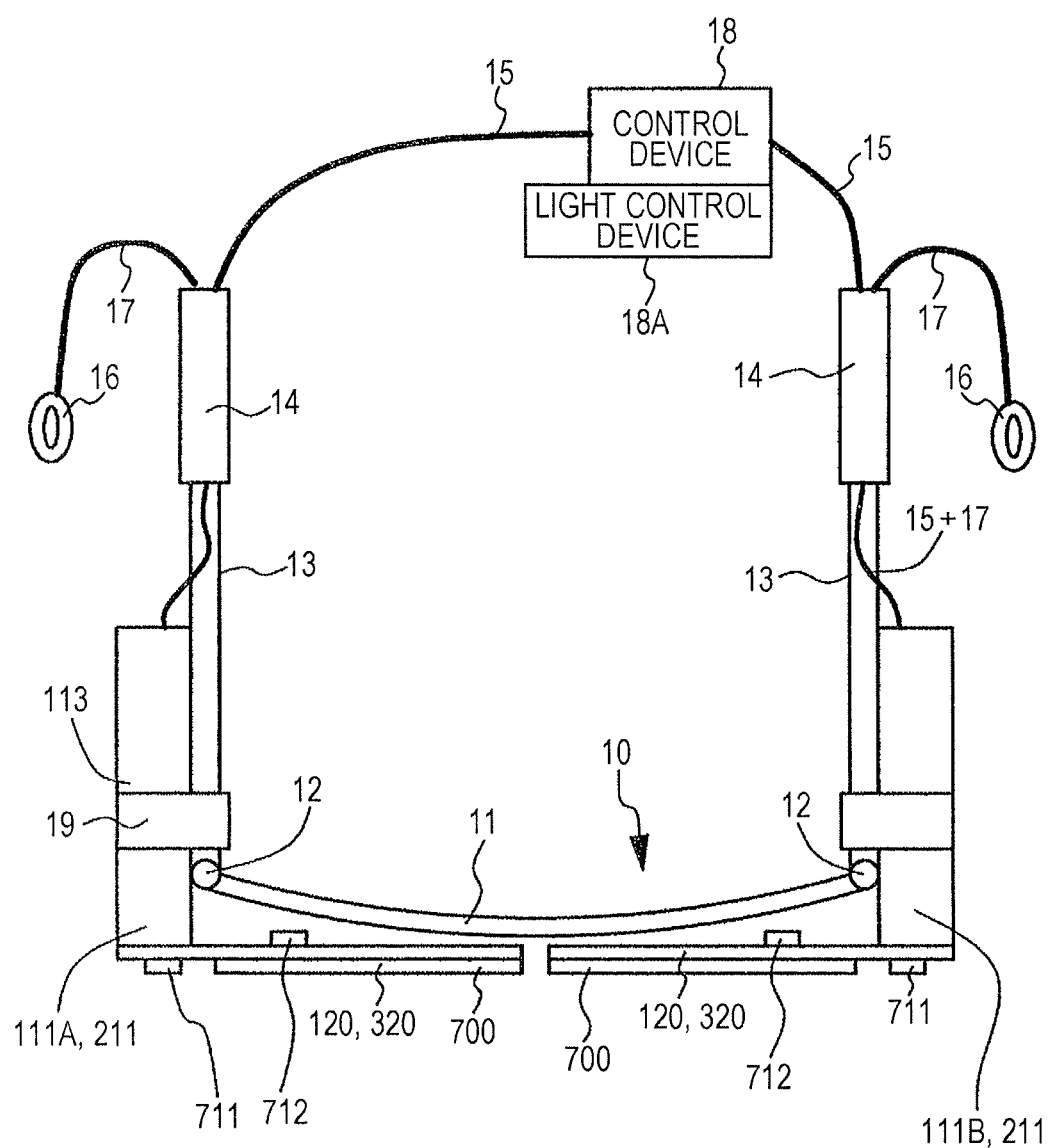
FIG. 17 is a schematic diagram of a display device of Example 7, as viewed from above.

Example 7 is a modification example of Examples 1 to 6. FIG. 17 is a schematic diagram illustrating a display device according to Example 7, as viewed from the top.

The display device according to Example 7 further includes an illumination sensor (transmitted light illumination measuring sensor) 712 that measures the intensity of illumination based on light passing through the dimmer from the external environment, that is, which measures whether environmental light passing through the dimmer is adjusted to a desired intensity of light and is incident on, and the light transmittance of the dimmer 700 is controlled based on the measurement result of the transmitted light illumination measuring sensor 712. Further, additionally or independently, the brightness of an image formed by the image forming device 111 or 211 is controlled based on the measurement result of the transmitted light illumination measuring sensor 712. The transmitted light illumination measuring sensor 712 having a known configuration or structure is disposed closer to the side of the observer, than the optical device 120, 320 or 520. Specifically, the transmitted light illumination measuring sensor 712 may be disposed on a surface of the light guide plate 121 or 321 on the side of the observer. The transmitted light illumination measuring sensor 712 is connected to the light control device 18A through a connector or a wire (not illustrated). A circuit which controls the transmitted light illumination measuring sensor 712 is included in the light control device 18A. The circuit that controls the transmitted light illumination measuring sensor 712 includes an illumination operation circuit that receives a measurement value from the transmitted light illumination measuring sensor 712 and calculates the intensity of illumination, a comparison operation circuit that compares the value of the intensity of illumination calculated by the illumination operation circuit with a standard value, and a transmitted light illumination measuring sensor control circuit that controls the dimmer 700 and/or the image forming device 111 or 211 based on the value obtained by the comparison operation circuit. These circuits may be formed of a known circuit. In control of the dimmer 700, the light transmittance of the dimmer 700 is controlled, whereas in control of the image forming device 111 or 211, the brightness of the image formed by the image forming device 111 or 211 is controlled. The control of the light transmittance in the dimmer 700 and the control of the brightness of an image in the image forming device 111 or 211 may be independently performed, or may be collectively performed. Further, in a case where the measurement result of the transmitted light illumination measuring sensor 712 is not controlled up to a desired intensity of illumination in consideration of the intensity of illumination of the environment illumination measuring sensor (not illustrated), that is, in a case where the measurement result of the transmitted light illumination measuring sensor 712 is not the desired intensity of illumination, or in a case where further fine illumination adjustment is necessary, the light transmittance of the dimmer may be adjusted while monitoring the value of the transmitted light illumination measuring sensor 712.

Example 8

Figure 18A:
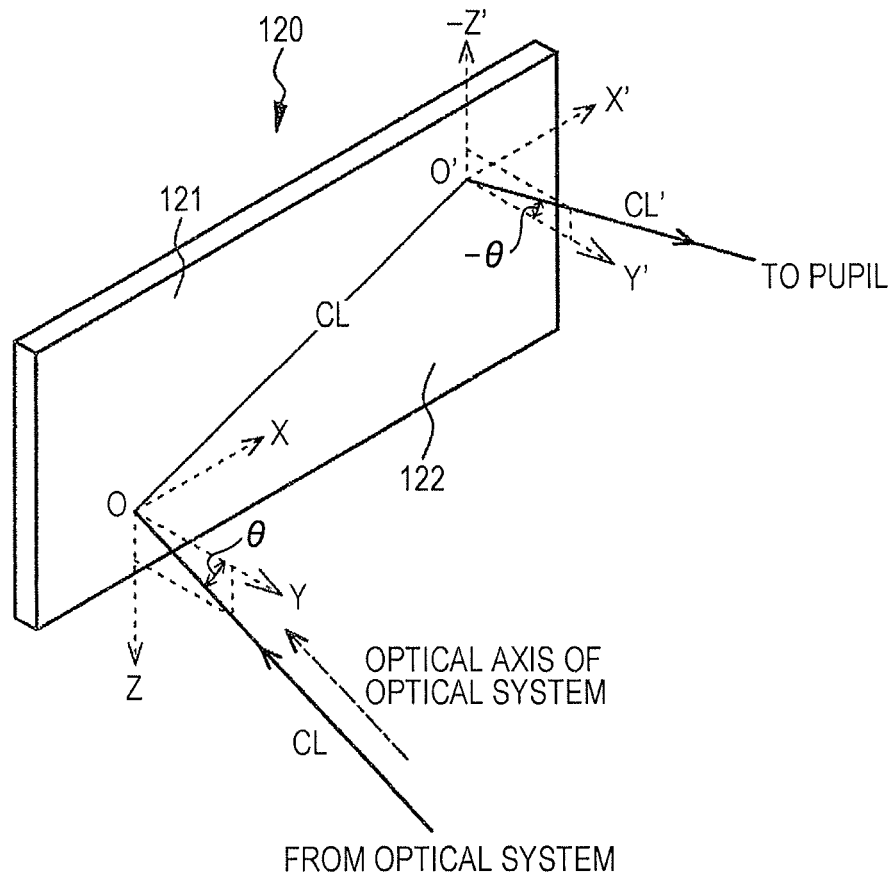
Figure 18B:
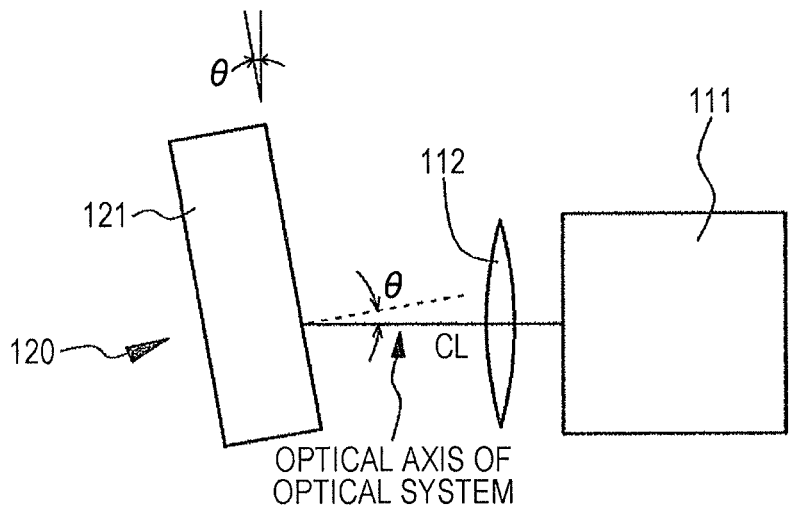
Figure 19:
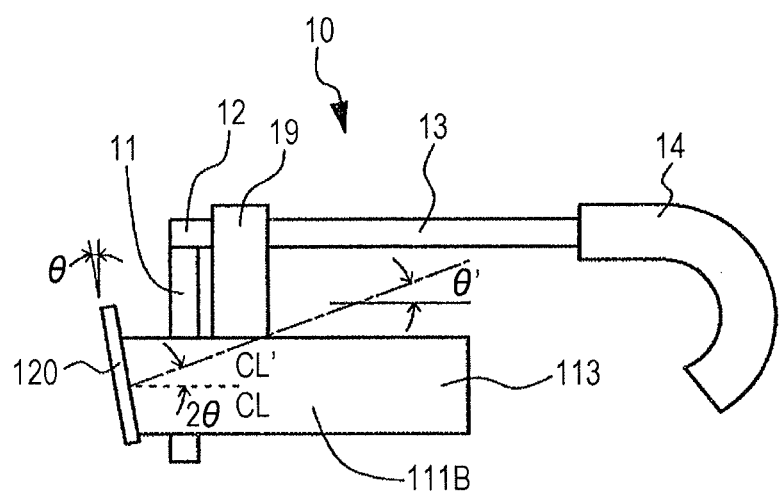
FIG. 19 is a schematic diagram of the display device in Example 8, as viewed from the side.

Example 8 is a modification example of the image display device according to Examples 1 to 7. FIGS. 18A and 18B are conceptual diagrams illustrating an arrangement state of the light guide plate or the like that form the image display device in the display device according to Example 8, and FIG. 19 is a schematic diagram illustrating the display device according to Example 8, as viewed from the side. Note that illustration of a dimmer and a light receiving element are omitted in FIGS. 19 and 20B.

Figure 20A:
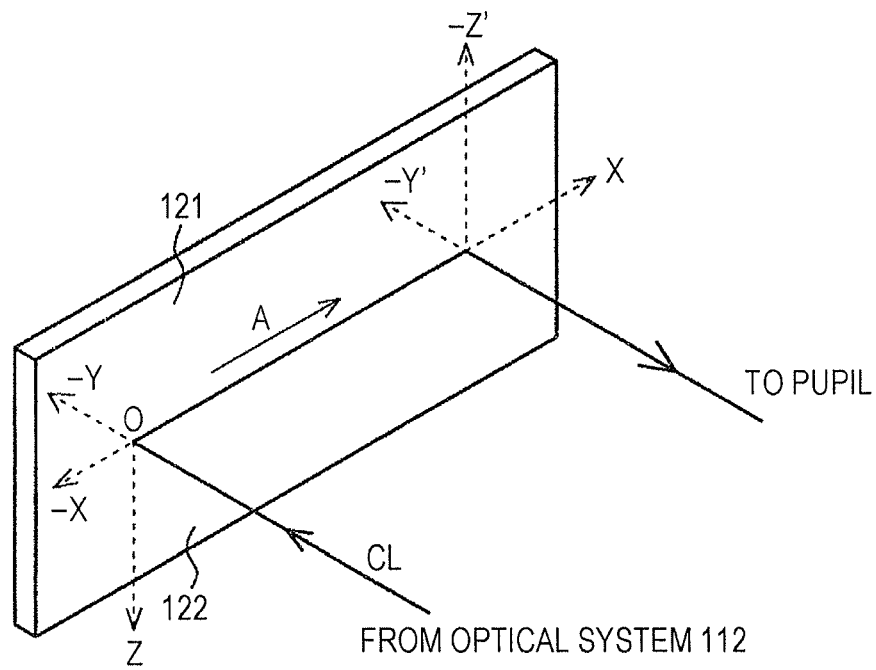
FIGS. 20A and 20B are a diagram schematically illustrating propagation of light in a light guide plate that forms the image display device in the display device of Examples 1 to 7, and a schematic diagram of a head-mounted display of Examples 1 to 7, compared with Example 8, and as viewed from the side, respectively.

In Examples 1 to 7, as illustrated in FIG. 20A, in the image display device 100 or 300, the central incident light ray CL that is emitted from the center of the image forming device 111 or 211 and passes through the node of the optical system 112 or 254 on the side of the image forming device perpendicularly collides with the light guide plate 121 or 321. That is, the central incident light ray CL is incident on the light guide plate 121 or 321 at an incident angle of 0 degrees. Further, in this case, the center of the displayed image coincides with a perpendicular direction of the first surface 122 or 322 of the light guide plate 121 or 321.

That is, in the image display device represented by the image display device 100, as illustrated in FIG. 20A, the central incident light ray CL that is emitted from the center of the image forming device 111 or 211 that is disposed on the optical axis of the collimating optical system 112 is converted into approximately parallel light by the collimating optical system 112, and then perpendicularly is incident on the first surface (incident surface) 122 of the light guide plate 121. Further, the central incident light ray CL travels along a propagation direction A while being totally propagated between the first surface 122 and the second surface 123 by the first deflection unit 130. Following that, the central incident light ray CL is reflected and diffracted by the second deflection unit 140, is perpendicularly emitted from the first surface 122 of the light guide plate 121, and then reaches the pupil 21 of the observer 20.

Figure 20B:
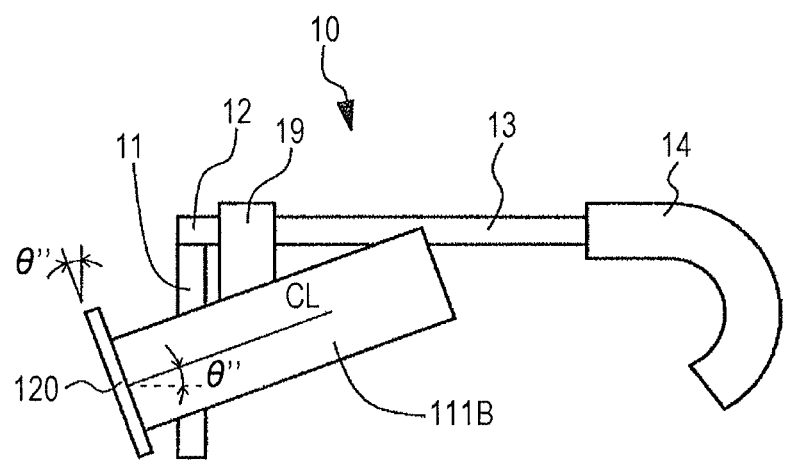

In the display device of the see-through type, when the observer 20 views the observation target that is positioned in the horizontal direction, in order not to interfere with the optical device 120, 320 or 520, it is favorable to shift the optical device 120, 320, or 520 downward for arrangement, with reference to the line of vision (horizontal direction of vision of the observer 20) of the observer 20 in the horizontal direction. In such a case, the entire image display device 100 or 300 is arranged below the horizontal line of vision of the observer 20. By the way, in such a configuration, as illustrated in FIG. 20B, it is necessary to incline the entire image display device 100 by an angle (theta)". Due to the relationship with the installation section (temple section) of the spectacle type frame for installation on the head portion of the observer 20, the angle (theta)" at which the image display device 100 is inclined may be limited, or the degree of freedom in design may be reduced. Thus, in order to prevent obstruction to the horizontal line of vision of the observer 20, it is further desirable to provide an image display device that is able to be arranged with a high degree of freedom and has a high degree of freedom in design.

In Example 8, the central incident light ray CL intersects with the XY plane at an angle (theta) other than 0 degrees. Further, the central incident light ray CL is included in the YZ plane. Further, in Example 8 or Example 9 described below, an optical axis of the optical system 112 or 254 is included in the YZ plane, and intersects with the XY plane at an angle other than 0 degrees, specifically, at an angle (theta) (see FIGS. 18A and 18B). Further, in Example 8 or Example 9 described below, when it is assumed that the XY plane coincides with the horizontal plane, the angle (theta) where the central incident light ray CL intersects with the XY plane is an elevation angle. That is, the central incident light ray CL is directed to the XY plane from the lower side of the XY plane, and collides with the XY plane. Further, the XY plane intersects with the vertical plane at an angle other than 0, specifically, at the angle (theta).

Figure 21A:
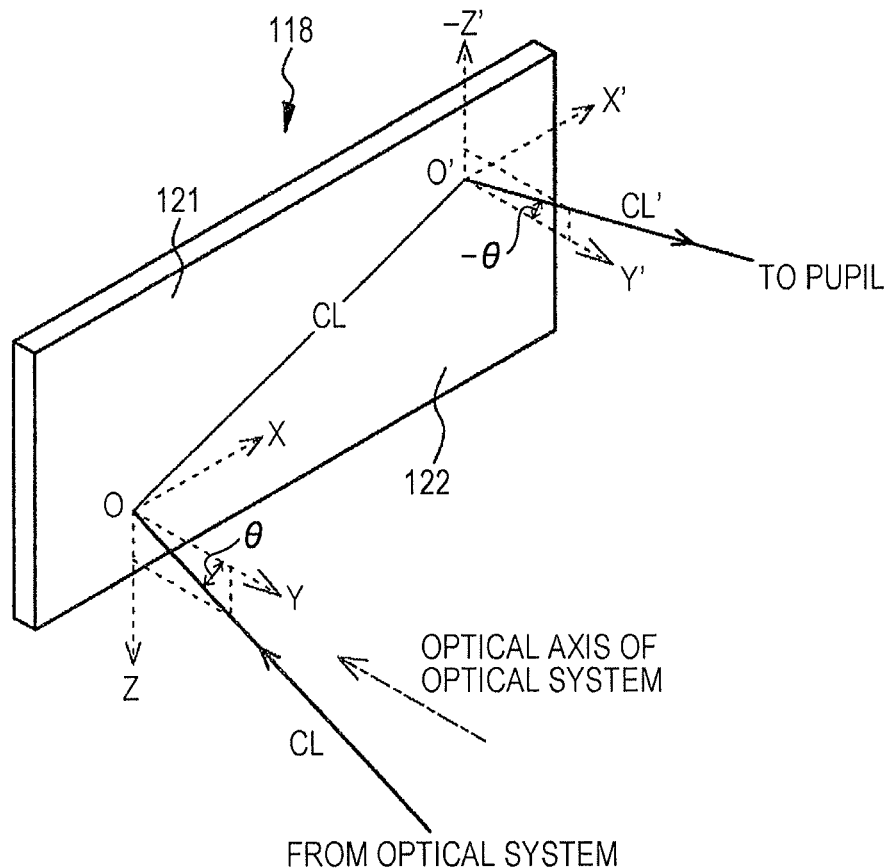

In Example 8, (theta) is 5 deg. More specifically, in such a configuration, the central incident light ray CL (indicated by a dashed line in FIG. 19) is included in the horizontal plane. Further, the optical device 120, 320 or 520 is inclined by the angle (theta) with respect to the horizontal plane. In other words, the optical device 120, 320 or 520 is inclined by an angle (90−(theta)) with respect to the horizontal plane. Further, a central incident light ray CL' (indicated by a dotted line in FIG. 19) output from the optical device 120, 320 or 520 is inclined by the angle 2(theta) with respect to the horizontal plane. That is, when the observer 20 views an object disposed on an infinitely distant side in the horizontal direction, the central incident light ray CL' that is emitted from the optical device 120, 320 or 520 and is incident on the pupil 21 of the observer 20 forms an depression angle (theta)' (=2(theta)) (see FIG. 19). The angle formed by the central incident light ray CL' and the normal line of the optical device 120, 320 or 520 is (theta). In FIG. 18A or 21A described below, a point where the central incident light ray CL' is emitted from the optical device 120, 320 or 520 is indicated as "O", axial lines parallel to the X axis, the Y axis and the Z axis that pass through the point "O'" are expressed as the X' axis, the Y' axis, and the Z' axis.

In the image display device according to Example 8, the central incident light ray CL intersects with the XY plane at the angle (theta) other than 0 degrees. Here, the central incident light ray CL' that is emitted from the optical device and is incident on the pupil 21 of the observer 20 forms the depression angle (theta)', in which the relationship of (theta)'=2(theta) is established. Meanwhile, in the example illustrated in FIG. 20B, in a case where the same depression angle is to be obtained, it is necessary to incline the entire image display device by the angle (theta)". Here, the relationship between (theta)" and (theta) is (theta)"=2(theta). As a result, the example illustrated in FIG. 20B, the optical device should be inclined by 2(theta) with respect to the vertical plane. Meanwhile, in Example 8, the optical device may be inclined by (theta) with respect to the vertical plane, and the image forming device may be maintained in the horizontal direction. Accordingly, it is possible to reduce the limitation to the installation angle of the image display device when the image display device is installed in the installation section of the spectacle type frame, and to obtain a high degree of freedom in design. Further, since the inclination of the optical device with respect to the vertical plane is smaller than that of the example illustrated in FIG. 20B, a phenomenon that external light is reflected by the optical device and is incident on the pupil 21 of the observer 20 hardly occurs. Thus, it is possible to perform image display with high quality.

Since the display device according to Example 8 has the same configuration or structure as that of the display device according to Examples 1 to 7, except for the above-described differences, its detailed description will be omitted.

Example 9

Figure 21B:
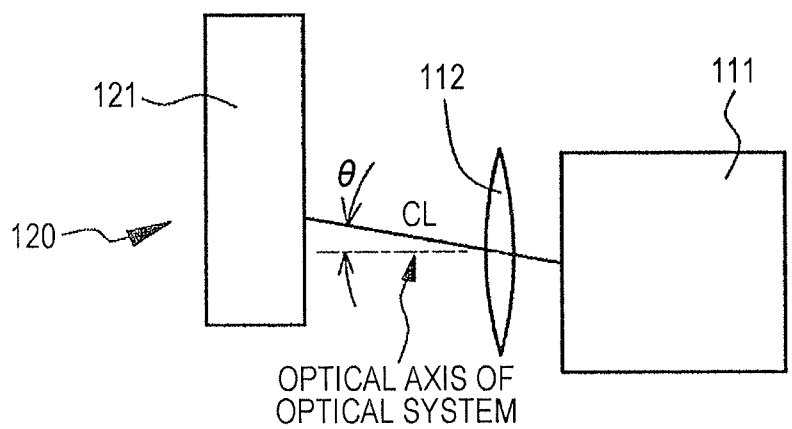

Example 9 is a modification example of the image display device according to Example 8. FIGS. 21A and 21B are conceptual diagrams illustrating an arrangement state of the light guide plate or the like that forms the image display device according to Example 9. Here, in Example 9, the optical axis of the optical system (parallel light emitting optical system or collimating optical system) 112 is parallel to the YZ plane and the XY plane, and passes through a position that is separated from the center of the image forming device 111 or 211. With such a configuration, the central incident light ray CL is included in the YZ, and intersects with the XY plane at the elevation angle (theta). Since the display device according to Example 9 has the same configuration or structure as that of the display device according to Examples 1 to 8, except for the above-described difference, its detailed description will be omitted.

Example 10

Example 10 is a modification example of the display device according to Examples 1 to 9. In Examples 1 to 9, the light transmission control material layer is formed of a liquid crystal material layer. Meanwhile, in the display device in Example 10, the dimmer is formed of an optical shutter in which the light transmission control material layer is formed of a substance generated by an oxidation-reduction reaction of an electrochromic material. Here, the light transmission control material is formed of a layered structure of $IrO_x$/$Ta_2O_5$/$WO_3$ or a material obtained by dissolving thiocyanate (AgSCN) or silver halide (AgX: X is a halogen atom) in water or nonaqueous solution (for example, an organic solvent such as acetonitrile, dimethyl sulfoxide, or methanol). The display device of Example 10 has a similar configuration or structure to the display device of Examples 1 to 9, except for the above points, and therefore, detail description is omitted. The first substrate and the protection member of the dimmer adhere to each other by an adhesive, similarly to Example 1.

Example 11

Example 11 is a modification example of the display device according to Examples 1 to 9. In the display device of Example 11, the dimmer is formed of an optical shutter in which the light transmission control material layer is formed of an inorganic electroluminescence material layer. Here, as a material that forms the inorganic electroluminescence material layer, tungsten oxides ($WO_3$) are used. Further, the first substrate and the second substrate that form the dimmer are made of a transparent glass substrate such as sodalime glass, or white plate glass, and the second substrate is made thinner than the first substrate. To be specific, the thickness of the second substrate is 0.2 mm, and the thickness of the first substrate is 0.4 mm. The display device of Example 11 has a similar configuration or structure to the display device of Examples 1 to 9, except for the above points, and therefore, detail description is omitted. The first substrate and the protection member of the dimmer adhere to each other by an adhesive, similarly to Example 1.

Example 12

Figure 22:
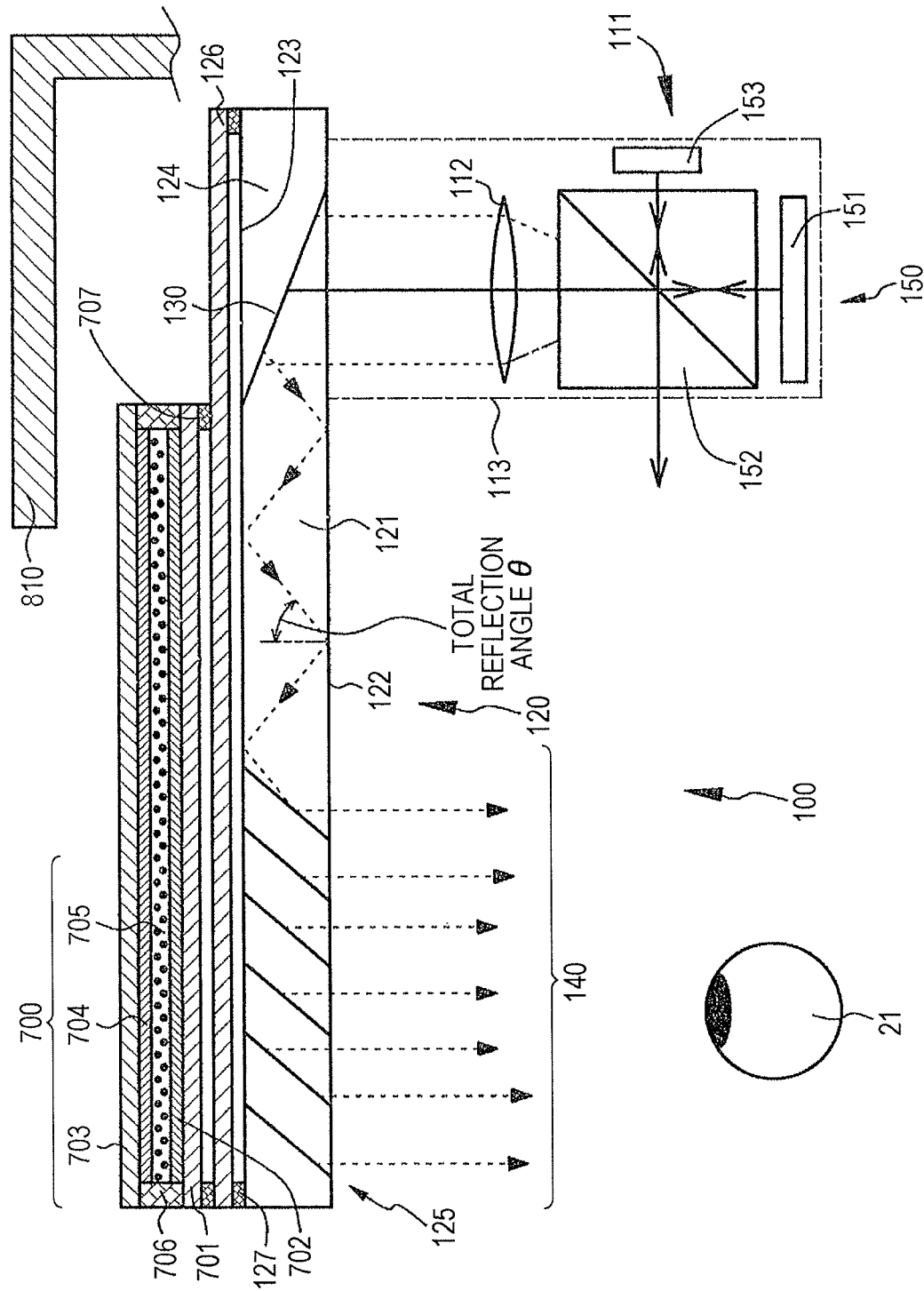
FIG. 22 is a conceptual diagram of a display device of Example 12.
Figure 23:
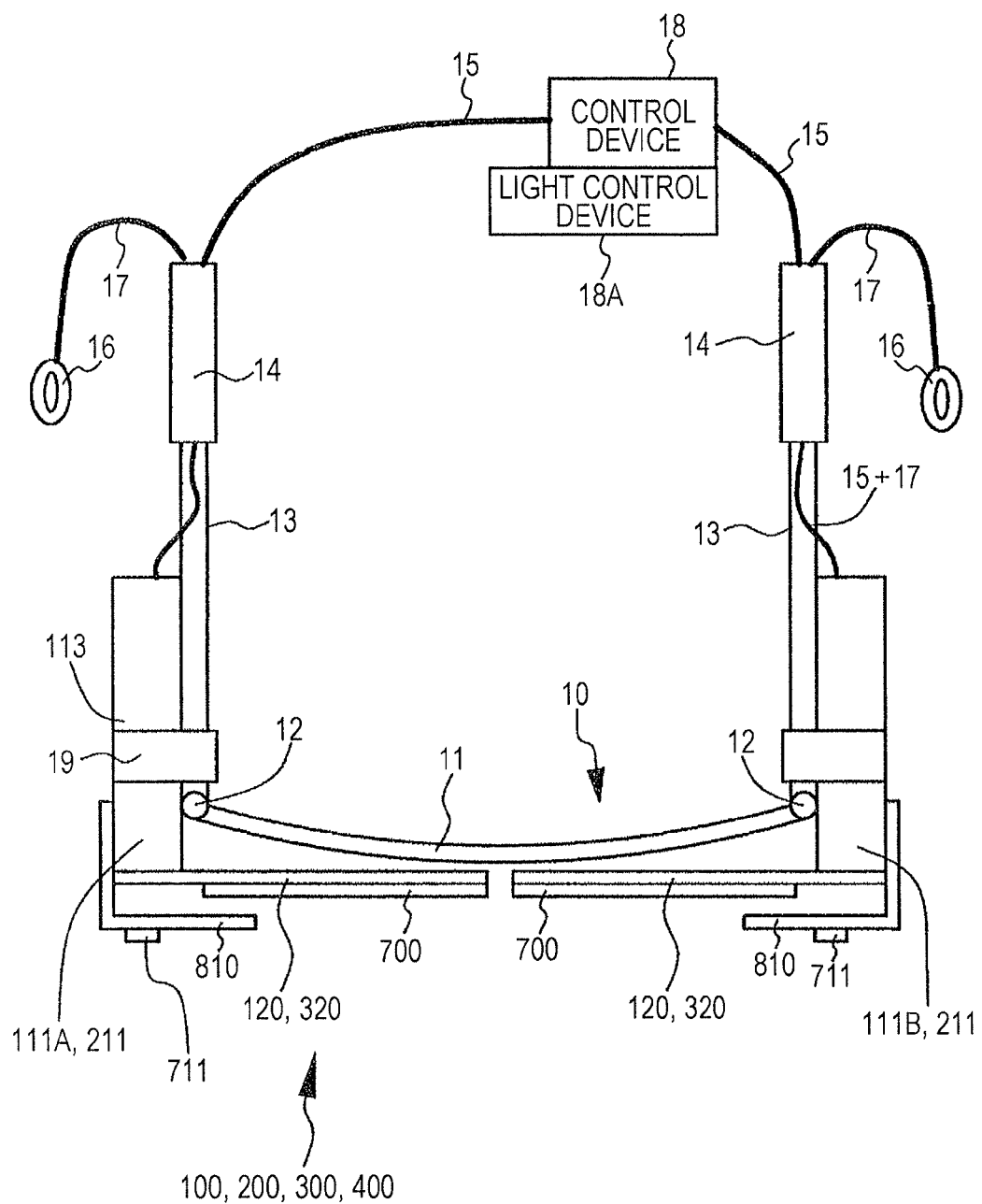
FIG. 23 is a schematic diagram of the display device of Example 12, as viewed from above.
Figure 24:
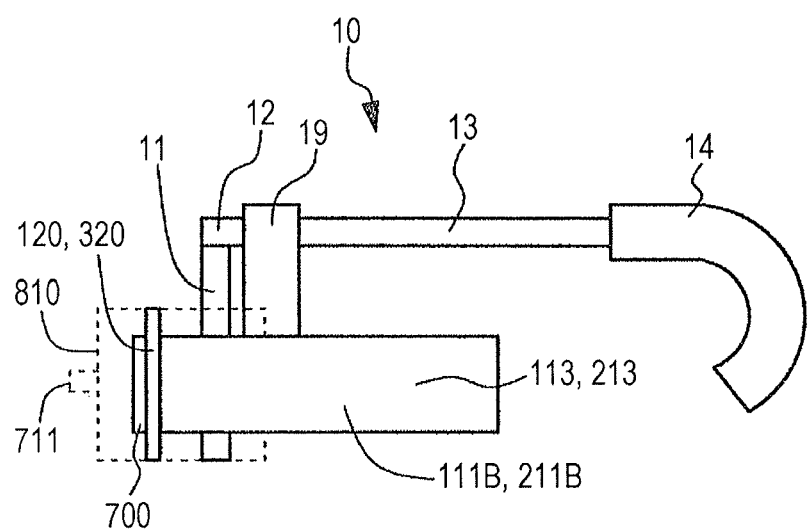
FIG. 24 is a schematic diagram of the display device of Example 12, as viewed from the side.

Example 12 relates to a display device according to the third embodiment of the present disclosure. FIG. 22 is a conceptual diagram of the image display device of Example 12, FIG. 23 is a schematic diagram of the display device of Example 12 as viewed from above (specifically, the head-mounted display, HMD), and FIG. 24 is a schematic diagram as viewed from the side. Note that, in FIG. 24, the shielding member and the light receiving element are indicated by a dashed line.

The display device of Example 12 or Examples 13 to 15 described below and the image display device 100, 200, 300, 400, or 500 have substantially a similar configuration or structure to the display device and the image display device described in Examples 1 to 11. That is, the display device includes the dimmer 700 disposed in an area of the optical device from which at least light is emitted, and which adjusts the quantity of light incident from outside. Further, the dimmer 700 starts a change of the light transmittance after elapse of a predetermined time from the start of the change of the quantity of light from an outside, substantially similarly to Examples 1 to 11.

In the display device of Example 12, a shielding member 810 that shields an incident light to the optical device 120 is arranged in an area of the optical device 120 on which the light emitted from the image forming device 111A or 111B is incident, to be more specific, in an area where the first deflection unit 130 is provided. Here, an area of the optical device 120 on which the light emitted from the image forming device 111A or 111B is incident is included in a projected image of the shielding member 810 to the optical device 120. Further, a projected image of an end portion of the dimmer 700 to the optical device 120 is included in the projected image of the shielding member 810 to the optical device 120.

In Example 12, the shielding member 810 is arranged to the optical device 120 away from each other on a side opposite to the image forming device 111A or 111B. The shielding member 810 is produced, for example, with an opaque plastic material, and the shielding member 810 integrally extends from the housing 113 of the image display device 111A or 111B, is installed to the housing 113 of the image display device 111A or 111B, integrally extends from the frame 10, or is installed to the frame 10. Note that, in the illustrated example, the shielding member 810 integrally extends from the housing 113 of the image display device 111A or 111B.

In the display device of Example 12, a shielding member that shields incident light to the optical device is arranged in an area of the optical device on which the light emitted from the image forming device is incident. Therefore, even if there is a change in the quantity of incident light from an outside due to the operation of the dimmer, the light from an outside is not incident on the area of the optical device on which the light emitted from the image forming device is incident, specifically, on the first deflection unit. Therefore, undesired stray light does not occur, and a decrease in image display quality in the display device is not caused.

Note that the display device of Example 12, or the display device of Examples 13 to 15 described below, and the display device described in Examples 1 to 11 can be appropriately combined.

Example 13

Figure 25:
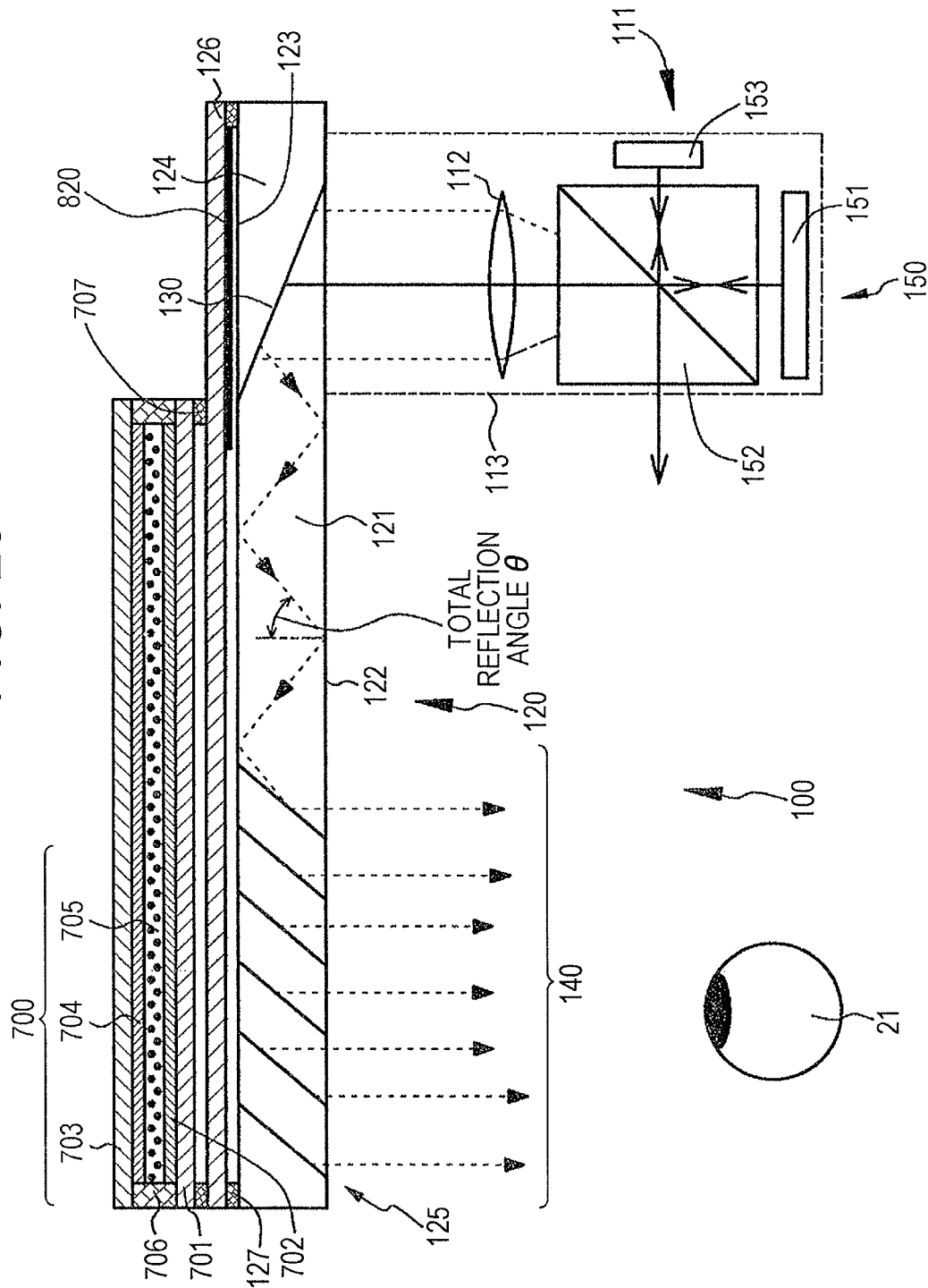
FIG. 25 is a conceptual diagram of a display device of Example 13.

Example 13 is a modification example of the display device according to Example 12. As a conceptual diagram is illustrated in FIG. 25, in the display device of Example 13, the shielding member 820 is arranged in a portion of the optical device 120 on a side opposite to the image forming device 111A or 111B, unlike Example 12. To be specific, by printing an opaque ink on the optical device 120 (specifically, on an inner surface of the protection member 126), the shielding member 820 can be formed. The display device of Example 13 has a similar configuration or structure to the display device of Example 12, except for the above points, and therefore, detail description is omitted. Note that the shielding member 820 of Example 13 and the shielding member 810 of Example 12 can be combined. Note that the shielding member 820 may be formed on an outer surface of the protection member 126.

Example 14

Figure 26:
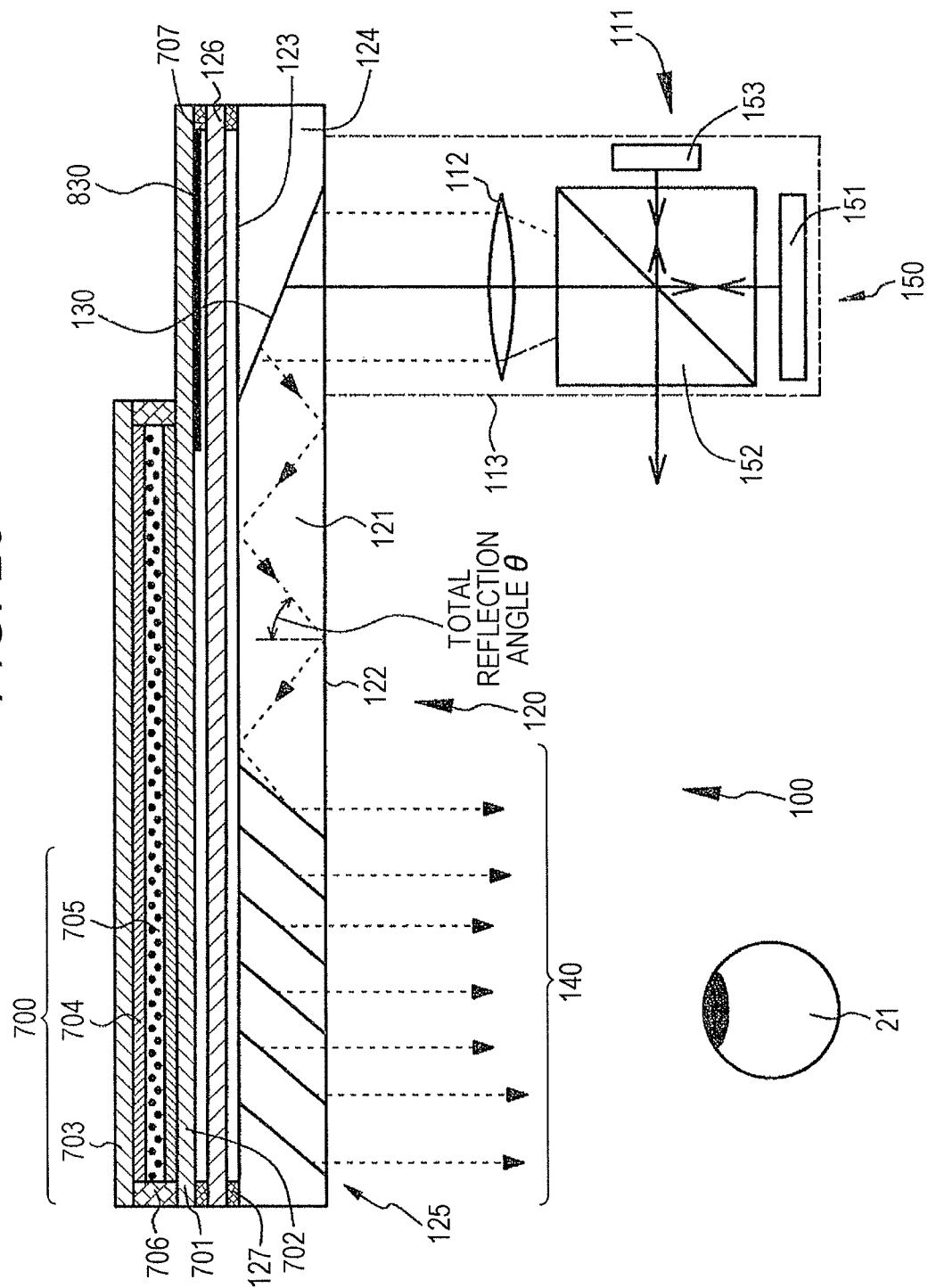
FIG. 26 is a conceptual diagram of a display device of Example 14.
Figure 27:
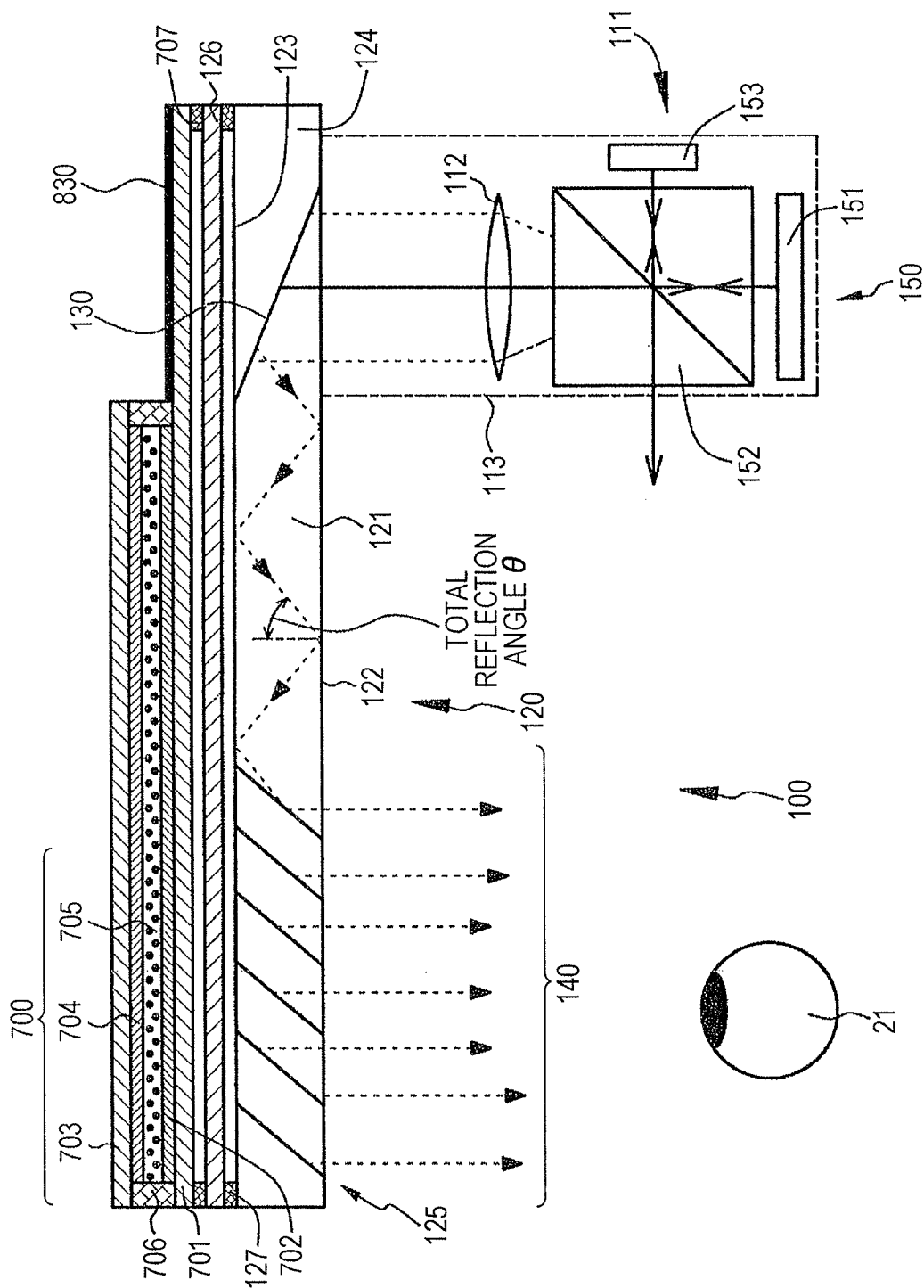
FIG. 27 is a conceptual diagram of a modification example of a display device of Example 14.

Example 14 is a modification example of the display device according to Example 12. As a conceptual diagram is illustrated in FIG. 26 or 27, in the display device of Example 14, the shielding member 830 is arranged in the dimmer 700, unlike Examples 12 and 13. To be specific, by printing an opaque ink on the dimmer 700, the shielding member 830 can be formed. Note that, in the example of FIG. 26, the shielding member 830 is formed on an outer surface of the first substrate 701 of the dimmer 700, and in the example of FIG. 27, the shielding member 830 is formed on an inner surface of the first substrate 701 of the dimmer 700. The display device of Example 14 has a similar configuration or structure to the display device of Example 12, except for the above points, and therefore, detail description is omitted. Note that the shielding member 830 of Example 14 and the shielding member 810 of Example 12 can be combined, the shielding member 830 of Example 14 and the shielding member 820 of Example 13 can be combined, or the shielding member 830 of Example 14, the shielding member 810 of Example 12, and the shielding member 820 of Example 13 can be combined.

Example 15

Figure 28:
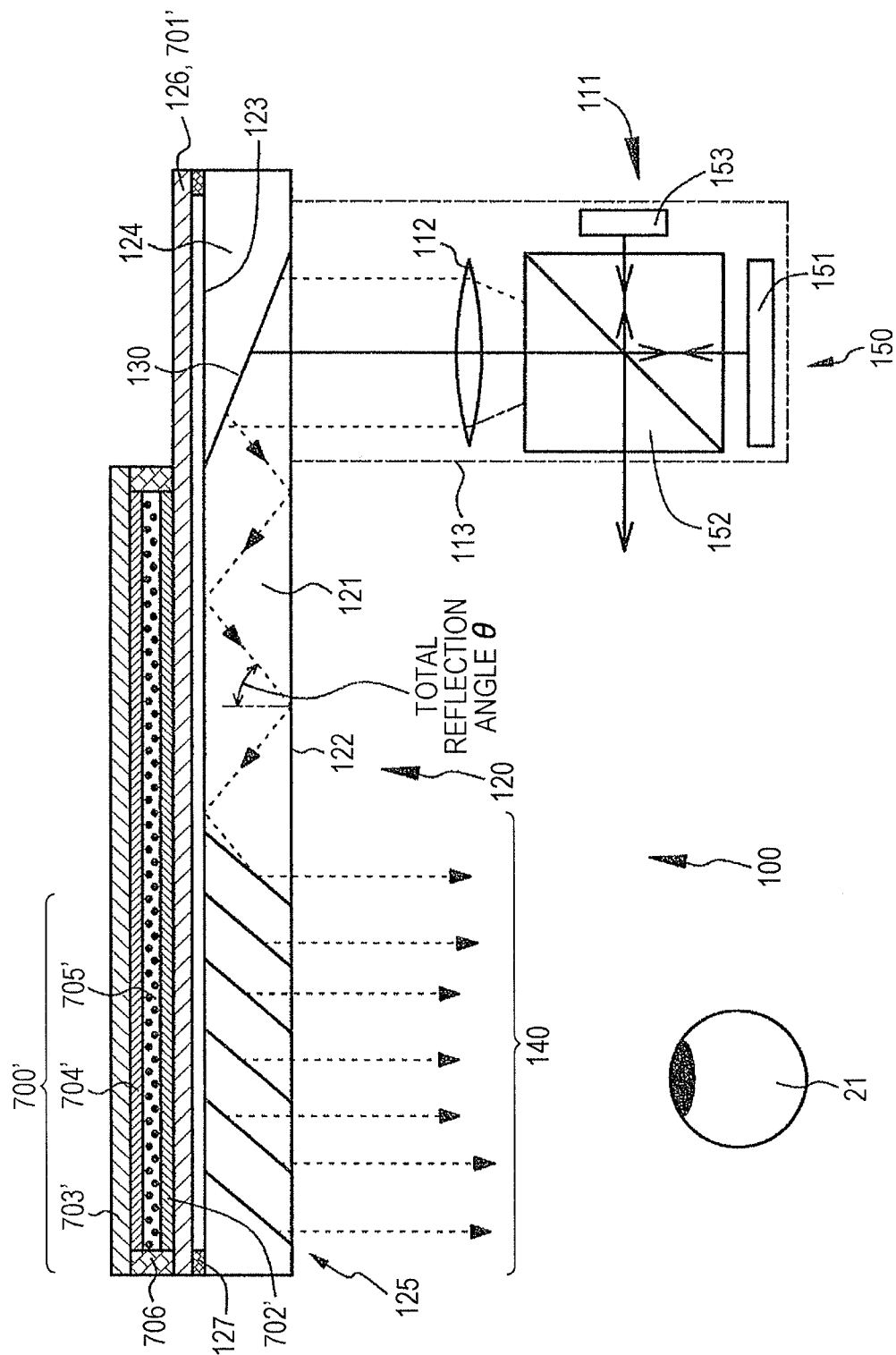
FIG. 28 is a conceptual diagram of an image display device in a display device of Example 15.

Example 15 relates to a display device according to the fourth embodiment of the present disclosure. As the conceptual diagram is illustrated in FIG. 28, a dimmer 700' in the display device of Example 15 include a first substrate 701' that faces an optical device 120, and a second substrate 703' that faces the first substrate 701', electrodes 702' and 704' respectively provided in the first substrate 701' and the second substrate 703', and a light transmission control material layer 705' sealed between the first substrate 701' and the second substrate 703'. Further, the first substrate 701' also serves as a component member (specifically, a protection member 126) of the optical device 120. That is, the first substrate 701' and the protection member 126 are a common member and are shared.

In this way, in Example 15, the first substrate 701' also serves as the component member (protection member 126) of the optical device 120 that forms the dimmer 700'. Therefore, the overall weight of the display device can be decreased, and there is little possibility to provide the user of the display device with an unpleasant feeling.

Figure 29:
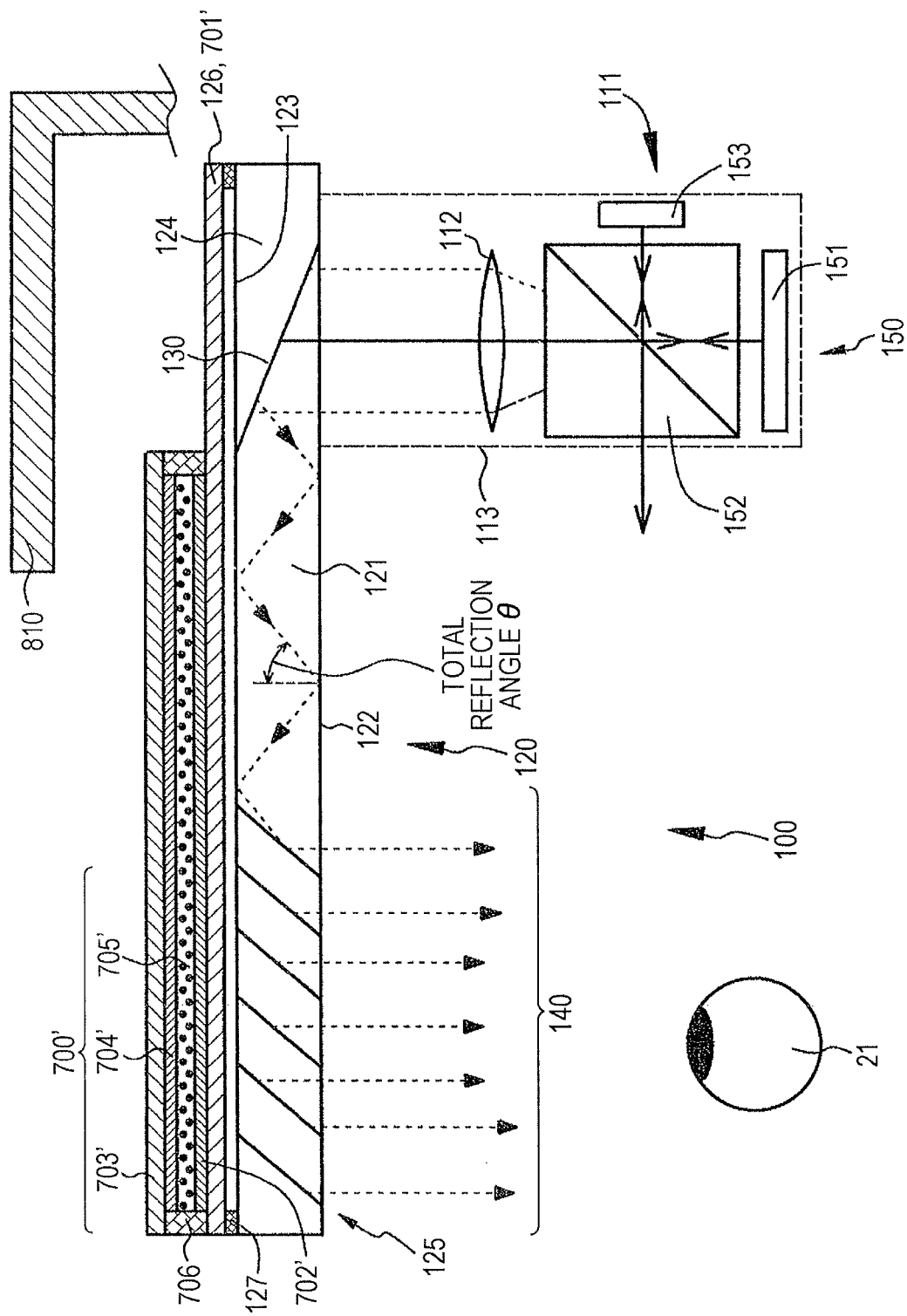
FIG. 29 is a conceptual diagram of a modification example of the display device of Example 15.

The display device of Example 15 has a similar configuration or structure to the display device of Examples 1 to 11, except for the above points, and therefore, detail description is omitted. Further, as illustrated in FIG. 29, a shielding member may be disposed in the display device of Example 15. In this case, the display device can have a similar configuration or structure to Examples 12 to 14, and therefore, detailed description is omitted.

Hereinbefore, the present disclosure has been described based on the favorable embodiments, but the present disclosure is not limited thereto. The configurations or structures of the display device (head mounted display) and the image display device according to the embodiments are only examples, which may be appropriately modified. For example, a surface relay type hologram (see US 20040062505 A1) may be arranged on the light guide plate. In the optical device 320, the diffraction grating element may be formed of a transmissive diffraction grating element, or any one of the first deflection unit and the second deflection unit may be formed of a reflective diffraction grating element and the other one thereof may be formed of a transmissive diffraction grating element. Further, the diffraction grating element may be also formed of a reflective blazed diffraction grating element.

The dimmer may be detachably installed in an area from which light of the optical device is emitted. In this way, to detachably install the dimmer, for example, the dimmer may be installed in the optical device using screws made of a transparent plastic, which may be connected to a control circuit (for example, included in the control device 18 for controlling the image forming device) for controlling the light transmittance of the dimmer through a connector and a wire.

Figure 30:
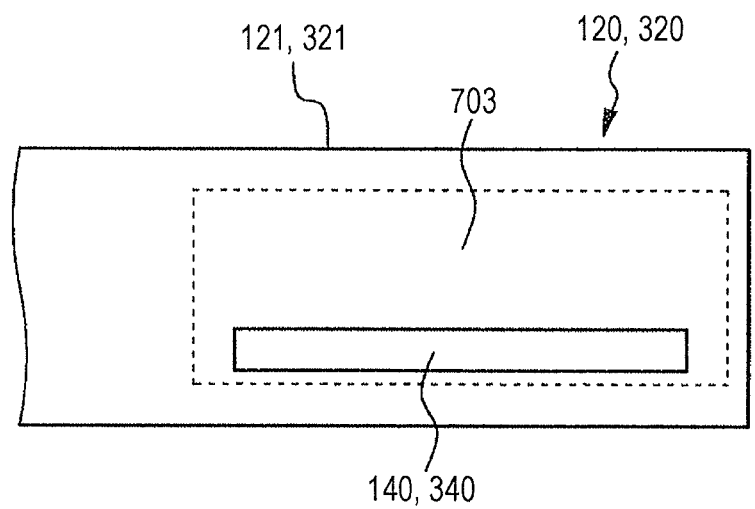
FIG. 30 is a schematic diagram of an optical device and a dimmer in a modification example of the display device of Examples 1 to 4, as viewed from the front.

Further, the image display device described in Examples 1 to 15 may be modified as described below. That is, as FIG. 30 illustrates a schematic diagram of the optical device and a part of the dimmer in the modification examples of the display device of Examples 1 to 4, as viewed from the side, the dimmer 700 may be positioned in a projected image of the second deflection unit 140 or 340. Here, various types of display may be performed in a portion of the optical device 120 or 320 that faces the dimmer 700.

Figure 31:
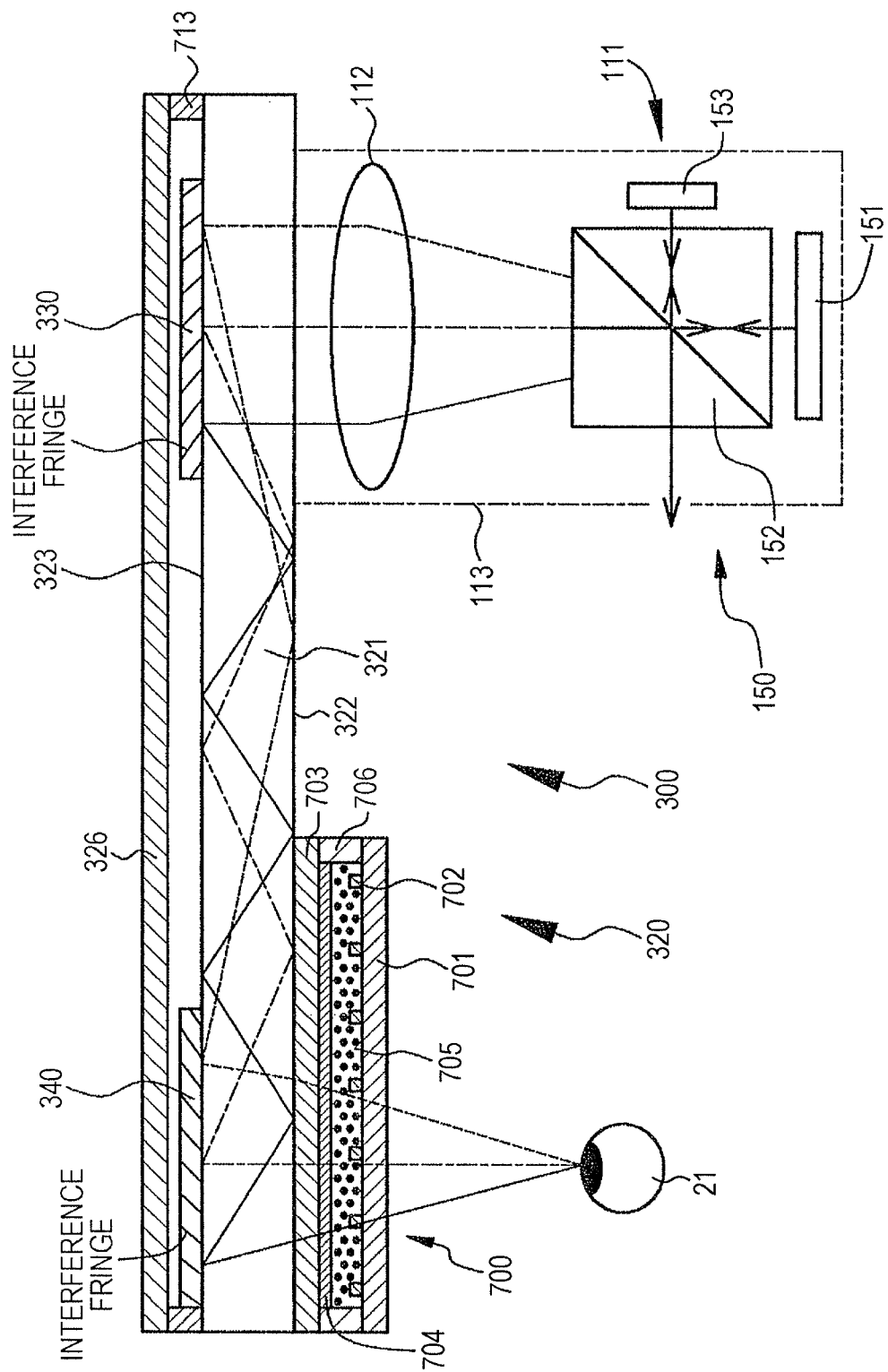
FIG. 31 is a conceptual diagram of another modification example of the display device of Examples 1 to 4.
Figure 32:
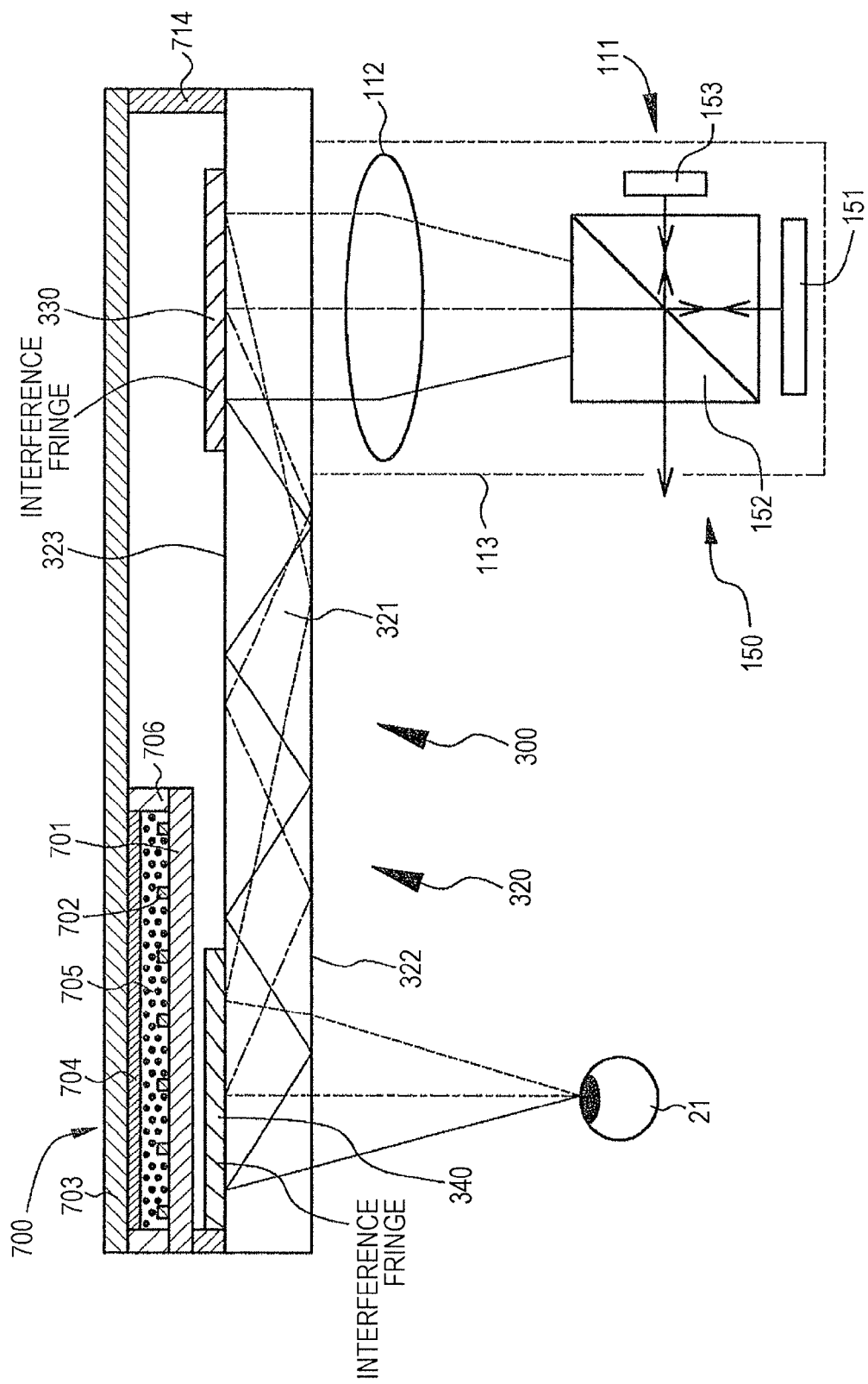
FIG. 32 is a conceptual diagram of still another modification example of the display device of Examples 1 to 4.
Figure 33:
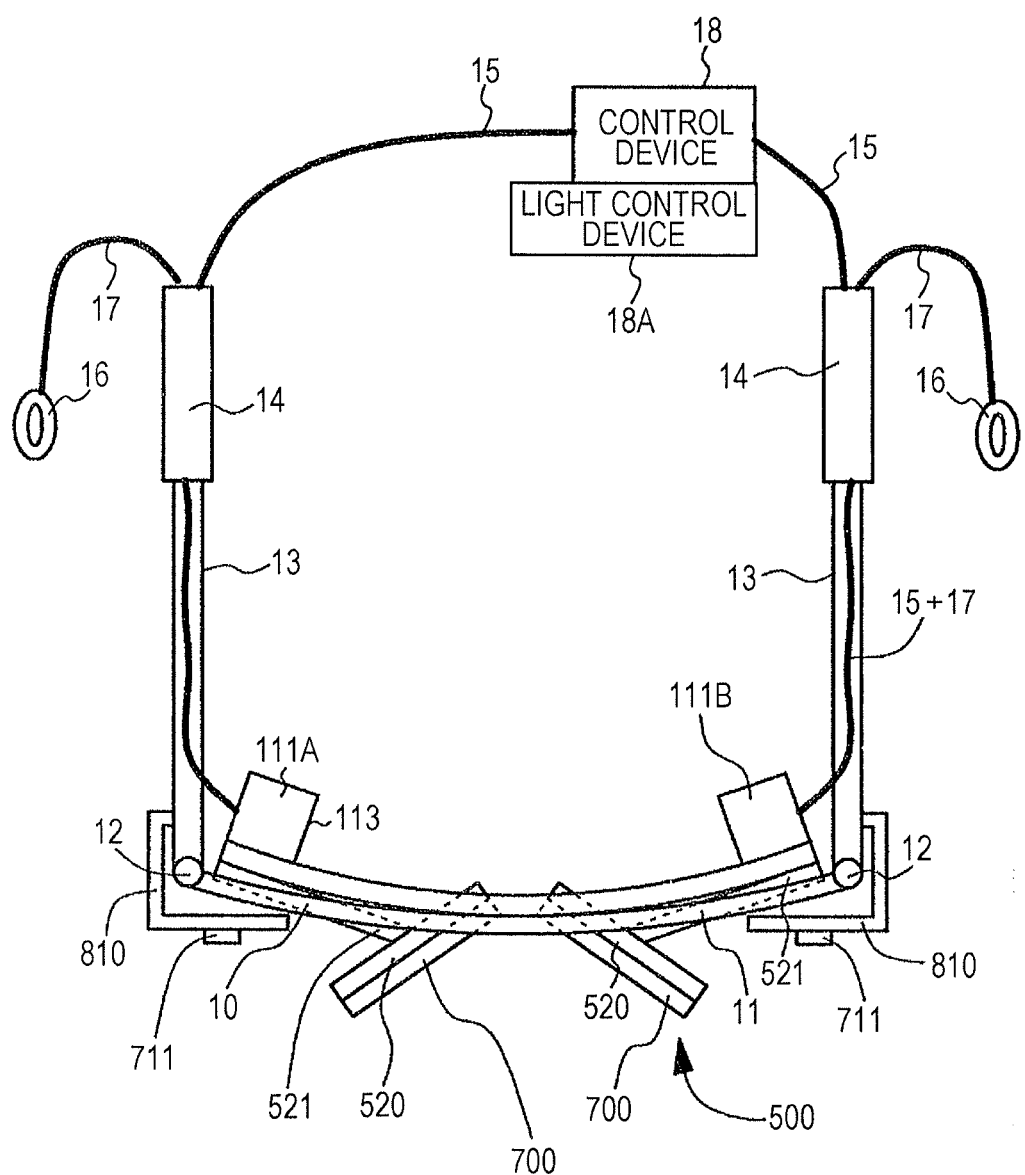
FIG. 33 is a schematic diagram of a display device that is obtained by applying a shielding member described in Example 12 to the display device described in Example 5, as viewed from above.
Figure 34:
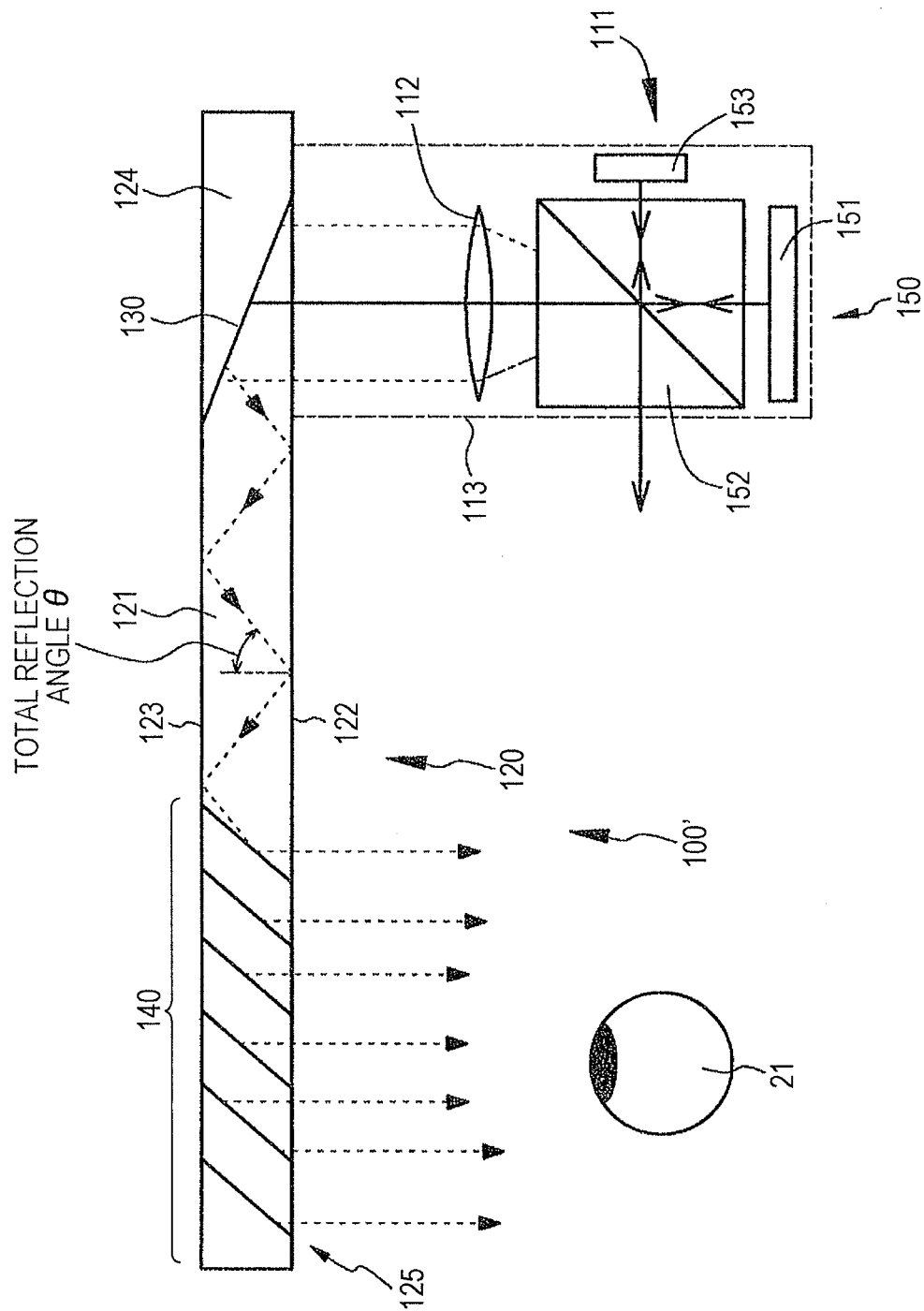
FIG. 34 is a conceptual diagram of an image display device in a display device in the related art.
Figure 35:
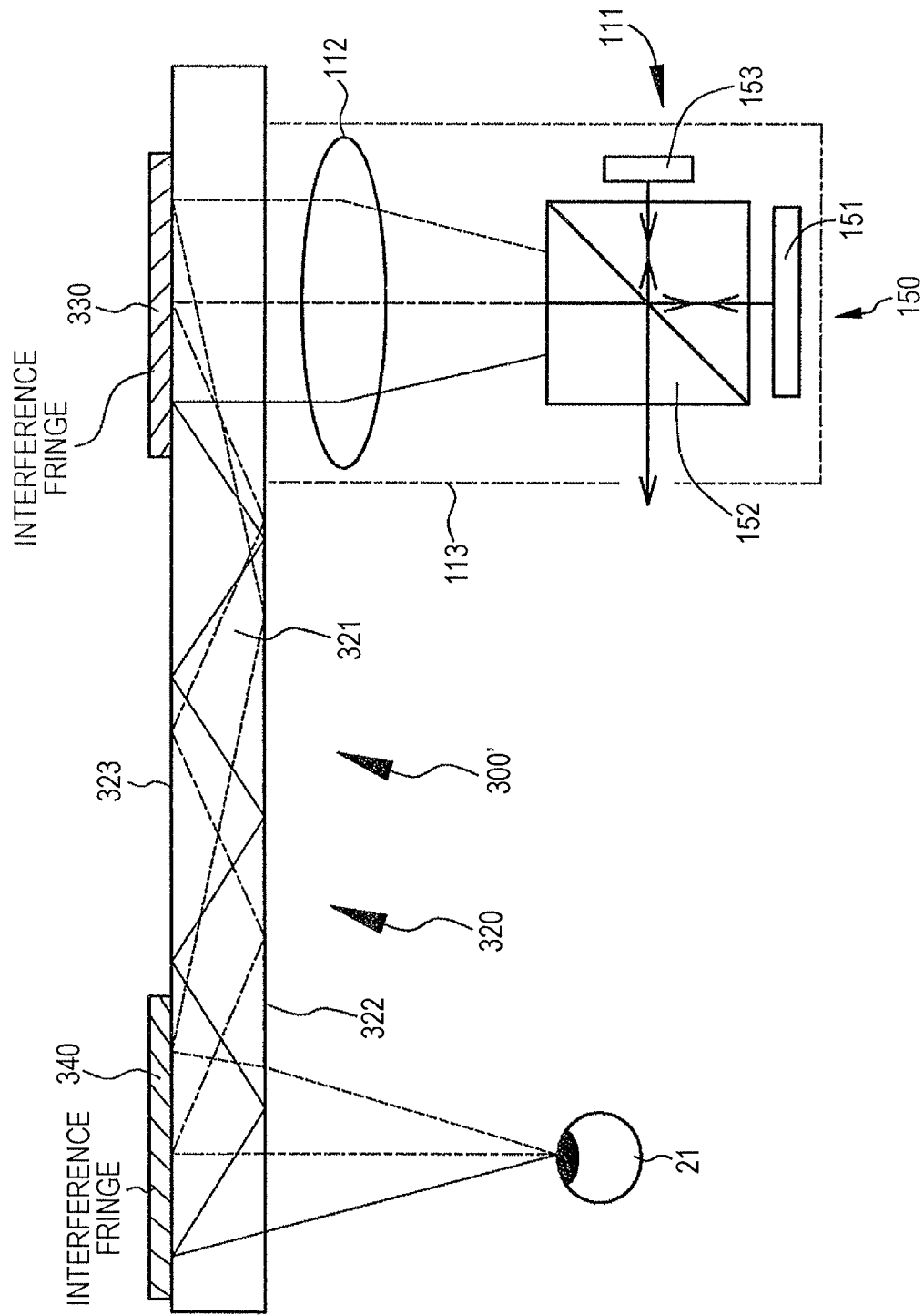
FIG. 35 is a conceptual diagram of an image display device in a modification example of the display device in the related art.

Further, as illustrated in FIG. 31, a protection member 326 is set to have approximately the same length as that of the light guide plate 321, and the protection member 326 is fixed to the light guide plate 321 by the sealing member 713. The sealing member 713 may be arranged on the outer edge portion of the protection member 326. The dimmer 700 is disposed between the light guide plate 321 and the observer 20. Alternatively, as illustrated in FIG. 32, the second substrate 703 of the dimmer 700 is set to have approximately the same length as that of the light guide plate 321, and the second substrate 703 of the dimmer 700 is fixed to the light guide plate 321 by the sealing member 714. The sealing member 714 may be arranged on the outer edge portion of the second substrate 703. Further, FIG. 33 illustrates a schematic diagram of an example, as viewed from above, in which the shielding member 810 described in Example 12 is applied to the display device described in Example 5.

Note that the present disclosure may be implemented as the following configurations.

(1) A display device, comprising:
a first image display device comprising a light guide plate;
a dimmer; and
a light control device configured to:
identify a start time of change in quantity of light received by the display device; and
control transmissivity of the dimmer based on quantity of light received by the display device, after a predetermined amount of time after the start time has elapsed.

(2) The display device of (1), wherein the light control device is configured to control further the transmissivity of the dimmer based on a moving speed of the display device.

(3) The display device of (1) or (2), wherein the light control device is configured to calculate the moving speed of the display device.

(4) The display device of any of (1)-(3), wherein the light control device is configured to:
determine a rate of change of quantity of light passing through the dimmer; and
control further transmissivity of the dimmer based on the determined rate of change of quantity of light.

(5) The display device of any of (1)-(4), wherein the light control device is configured to control transmissivity of the dimmer at least in part by using a table storing a respective value indicative rate of change of dimmer transmissivity for each of a plurality of rates of change of quantity of light.

(6) The device of any of (1)-(5), wherein the light control device is configured to identify the start time as a time when a quantity of light received by the display device exceeds a threshold.

(7) The display device of any of (1)-(6), wherein the display device further comprises:
a frame configured to be mounted on a head of a user,
wherein the first image display device is installed in the frame.

(8) The display device of any of (1)-(7), wherein the display device further comprises:
a second image display device,
wherein the first image display device is configured to provide light to an eye of a user and the second image display device is configured to provide light to another eye of the user.

(9) The display device of any of (1)-(8), wherein the first image display device comprises:
an image forming device comprising a plurality of pixels, the image forming device configured to display an image.

(10) The display device of any of (1)-(9), wherein the first image display device further comprises:
an optical system configured to collimate light emitted from the first image forming device.

(11) The display device of any of (1)-(10), wherein the first image display device further comprises:
an optical device configured to receive light emitted from the image forming device and to emit light to an eye of a user,
wherein the optical device comprises the light guide plate.

(12) The display device of any of (1)-(11), wherein the optical device further comprises:
a first deflection unit configured to deflect light incident on the light guide plate so that the light incident on the light guide plate is substantially reflected inside the light guide plate.

(13) The display device of any of (1)-(12), wherein the optical device further comprises:
a second deflection unit configured to deflect light propagated inside the light guide plate with total reflection over a plurality of times so as to allow the light propagated inside the light guide plate to be emitted from the light guide plate.

(14) The display device of any of (1)-(13), wherein the first and second deflection units are disposed inside the light guide plate.

(15) The display device of any of (1)-(14), further comprising:
a shielding member configured to shield incident light to the optical device,
wherein the shielding member is arranged in an area of the optical device on which the light emitted from the image forming device is incident.

(16) The display device of any of (1)-(15), wherein the dimmer is disposed on a side substantially opposite the image forming device so as to overlap with the shielding member.

(17) The display device of any of (1)-(16), wherein the dimmer comprises an optical shutter.

(18) The display device of any of (1)-(17), wherein the display device is a head-mounted display device.

(19) A method for use in connection with a display device comprising an image display device and a dimmer, the image display device comprising a light guide plate, the method comprising:
identifying a start time of change in quantity of light received by the display device; and
controlling transmissivity of the dimmer based on quantity of light received by the display device, after a predetermined amount of time after the start time has elapsed.

(20) At least one non-transitory computer-readable storage medium storing processor-executable instructions that, when executed by at least one processor, cause the at least one processor to perform a method for use in connection with a display device comprising an image display device and a dimmer, the image display device comprising a light guide plate, the method comprising:

identifying a start time of change in quantity of light received by the display device; and controlling transmissivity of the dimmer based on quantity of light received by the display device, after a predetermined amount of time after the start time has elapsed.

Further note that the present disclosure may be implemented as the following configurations.

(1)

A display device including:

(i) a frame adapted to be mounted on a head of an observer; and (ii) an image display device installed to the frame, wherein the image display device includes (A) an image forming device, and (B) an optical device on which light emitted from the image forming device is incident, and from which the light is emitted to a pupil of the observer, the display device further including:

(iii) a dimmer disposed in an area of the optical device from which the light is emitted, and adapted to adjust a quantity of light incident from an outside, (iv) a light control device, and (v) a light receiving element adapted to measure the quantity of light from an outside, the light control device calculates a quantity of received light change rate based on a quantity of received light measurement result of the light receiving element, determines a light transmittance change rate in the dimmer based on the quantity of received light change rate, and controls light transmittance of the dimmer based on the determined light transmittance change rate.

(2) The display device according to (1), wherein the light control device includes a table related to a relationship between the quantity of received light change rate and the light transmittance change rate in the dimmer.

(3) The display device according to (2) wherein the table is created based on a change of a pupil diameter of the observer that follows a change of a quantity of light incident from an outside.

(4) The display device according to any one of (1) to (3) wherein the light control device further determines a start time of a change of the quantity of received light based on the quantity of received light measurement result of the light receiving element, and starts control of the light transmittance of the dimmer after elapse of a predetermined time from the start time of the change of the quantity of received light.

(5) The display device according to (4), wherein the light control device further includes a moving speed calculation unit adapted to calculate a moving speed of the display device, and the light control device further determines the light transmittance change rate in the dimmer based on the moving speed of the display device calculated by the moving speed calculation unit.

(6) The display device according to any one of (1) to (3), wherein the light control device further includes a moving speed calculation unit adapted to calculate a moving speed of the display device, and the light control device further determines the light transmittance change rate in the dimmer based on the moving speed of the display device calculated by the moving speed calculation unit.

(7) The display device according to (6) wherein the light control device further determines a start time of a change of the quantity of received light based on the quantity of received light measurement result of the light receiving element, and starts control of the light transmittance of the dimmer after elapse of a predetermined time from the start time of the change of the quantity of received light.

(8) The display device according to (7), wherein the light control device further starts control of the light transmittance of the dimmer based on the moving speed of the display device calculated by the moving speed calculation unit.

(9) The display device according to any one of (1) to (8), wherein the light receiving element measures, in the optical device, a quantity of light of an outside area corresponding to a background of an image observed by the observer.

(10) The display device according to (9), wherein the light receiving element has directivity to received light.

(11) The display device according to any one of (1) to (10) wherein brightness of an image formed by an image forming device is controlled based on the quantity of received light measurement result of the light receiving element.

(12) The display device according to any one of (1) to (11), wherein the light receiving element is arranged outside the optical device.

(13) The display device according to any one of (1) to (12) further including an illumination sensor that measures illumination based on the light transmitted through the dimmer from an outside, and control of light transmittance of the dimmer is performed based on a measurement result of the illumination sensor.

(14) The display device according to (13), wherein brightness of an image formed by an image forming device is controlled based on the measurement result of the illumination sensor.

(15) The display device according to (13) or (14) wherein the illumination sensor is arranged on a side of the observer than the dimmer.

(16) The display device according to any one of (1) to (15), wherein optical device includes (a) a light guide plate in which an incident light is propagated inside with total reflection and from which the incident light is then emitted, (b) a first deflection unit adapted to deflect the light incident on the light guide plate so that the light incident on the light guide plate is totally reflected inside the light guide plate, and (c) a second deflection unit adapted to deflect the light propagated inside the light guide plate with total reflection over a plurality of times so as to allow the light propagated inside the light guide plate with total reflection to be emitted from the light guide plate.

(17) The display device according to (16), wherein the second deflection unit is positioned in a projected image of the dimmer.

(18) The display device according to (17), wherein the second deflection unit is coated by the dimmer.

(19) The display device according to any one of (1) to (18), wherein the dimmer is formed of an optical shutter applying a liquid crystal shutter or a color change of a substance generated by an oxidation-reduction reaction of an electrochromic material.

(20)

A display device including: (i) a frame adapted to be mounted on a head of an observer; and (ii) an image display device installed to the frame, wherein the image display device includes (A) an image forming device, and (B) an optical device on which light emitted from the image forming device is incident, and from which the light is emitted to a pupil of the observer, the display device further including:

(iii) a dimmer disposed in an area of the optical device from which the light is emitted, and adapted to adjust a quantity of light incident from an outside, (iv) a light control device, and (v) a light receiving element adapted to measure the quantity of light from an outside, and the light control device determines a start time of a change of a quantity of received light based on a quantity of received light measurement result of the light receiving element, and starts control of light transmittance of the dimmer after elapse of a predetermined time from the start time of the change of the quantity of received light.

(21) The display device according to (20), wherein the light control device further includes a moving speed calculation unit adapted to calculate a moving speed of the display device, and the light control device further starts control of the light transmittance of the dimmer based on the moving speed of the display device calculated by the moving speed calculation unit.

(22) The display device according to (20) or (21), wherein the light receiving element measures, in the optical device, a quantity of light of an outside area corresponding to a background of an image observed by the observer.

(23) The display device according to (22), wherein the light receiving element has directivity to received light.

(24) The display device according to any one of (20) to (23) wherein brightness of an image formed by an image forming device is controlled based on the quantity of received light measurement result of the light receiving element.

(25) The display device according to any one of (20) to (24), wherein the light receiving element is arranged outside the optical device.

(26) The display device according to any one of (20) to (25) further including an illumination sensor that measures illumination based on the light transmitted through the dimmer from an outside, and control of light transmittance of the dimmer is performed based on a measurement result of the illumination sensor.

(27) The display device according to (26), wherein brightness of an image formed by an image forming device is controlled based on the measurement result of the illumination sensor.

(28) The display device according to (26) or (27) wherein the illumination sensor is arranged on a side of the observer than the dimmer.

(29) The display device according to any one of (20) to (28), wherein optical device includes (a) a light guide plate in which an incident light is propagated inside with total reflection and from which the incident light is then emitted, (b) a first deflection unit that deflects the light incident on the light guide plate so that the light incident on the light guide plate is totally reflected inside the light guide plate, and (c) a second deflection unit adapted to deflect the light propagated inside the light guide plate with total reflection over a plurality of times so as to allow the light propagated inside the light guide plate with total reflection to be emitted from the light guide plate.

(30) The display device according to (29), wherein the second deflection unit is positioned in a projected image of the dimmer.

(31) The display device according to (30), wherein the second deflection unit is coated by the dimmer.

(32) The display device according to any one of (20) to (31), wherein the dimmer is formed of an optical shutter applying a liquid crystal shutter or a color change of a substance generated by an oxidation-reduction reaction of an electrochromic material.

(33)

A display device including: (i) a frame adapted to be mounted on a head of an observer; and (ii) an image display device installed to the frame, wherein the image display device includes (A) an image forming device, and (B) an optical device on which light emitted from the image forming device is incident, and from which the light is emitted to a pupil of the observer, the display device further including:

(iii) a dimmer disposed in an area of the optical device from which at least light is emitted, and adapted to adjust a quantity of light incident from an outside, and (iv) a shielding member disposed in an area of the optical device on which the light emitted from the image forming device is incident, and adapted to shield light from an outside to be incident on the optical device, the dimmer starts a change of light transmittance after elapse of a predetermined time from a start of a change of the quantity of light from an outside.

(34) The display device according to (33), wherein an area of the optical device on which the light emitted from the image forming device is incident is included in a projected image of the shielding member to the optical device.

(35) The display device according to (33) or (34), wherein the shielding member is arranged to the optical device away from each other on a side opposite to the image forming device.

(36) The display device according to any one of (33) to (35), wherein the shielding member is arranged on a portion of the optical device on a side opposite to the image forming device.

(37) The display device according to any one of (33) to (35), wherein shielding member is arranged in the dimmer.

(38) The display device according to any one of (33) to (36), wherein a projected image of an end portion of the dimmer to the optical device is included in a projected image of the shielding member to the optical device.

(39) The display device according to any one of (33) to (38) further including:

(v) a light control device, and (vi) a light receiving element that measures the quantity of light from an outside, wherein the light control device determines a start time of a change of a quantity of received light based on a quantity of received light measurement result of the light receiving element, and starts control of light transmittance of the dimmer after elapse of a predetermined time from the start time of the change of the quantity of received light.

(40) The display device according to (39), wherein the light control device further includes a moving speed calculation unit adapted to calculate a moving speed of the display device, and the light control device further starts control of the light transmittance of the dimmer based on the moving speed of the display device calculated by the moving speed calculation unit.

(41) The display device according to (39) or (40), wherein the light receiving element measures, in the optical device, a quantity of light of an outside area corresponding to a background of an image observed by the observer.

(42) The display device according to (41), wherein the light receiving element has directivity to received light.

(43) The display device according to any one of (39) to (42) wherein brightness of an image formed by an image forming device is controlled based on the quantity of received light measurement result of the light receiving element.

(44) The display device according to any one of (39) to (43), wherein the light receiving element is arranged outside the optical device.

(45) The display device according to any one of (39) to (44) further including an illumination sensor that measures illumination based on the light transmitted through the dimmer from an outside, and control of light transmittance of the dimmer is performed based on a measurement result of the illumination sensor.

(46) The display device according to (45), wherein brightness of an image formed by an image forming device is controlled based on the measurement result of the illumination sensor.

(47) The display device according to (45) or (46) wherein the illumination sensor is arranged on a side of the observer than the dimmer.

(48) The display device according to any one of (33) to (47), wherein the optical device includes (a) a light guide plate in which an incident light is propagated inside with total reflection and from which the incident light is then emitted, (b) a first deflection unit that deflects the light incident on the light guide plate so that the light incident on the light guide plate is totally reflected inside the light guide plate, and (c) a second deflection unit adapted to deflect the light propagated inside the light guide plate with total reflection over a plurality of times so as to allow the light propagated inside the light guide plate with total reflection to be emitted from the light guide plate.

(49) The display device according to (48), wherein the second deflection unit is positioned in a projected image of the dimmer.

(50) The display device according to (49), wherein the second deflection unit is coated by the dimmer.

(51) The display device according to any one of (39) to (50), wherein the dimmer is formed of an optical shutter applying a liquid crystal shutter or a color change of a substance generated by an oxidation-reduction reaction of an electrochromic material.

(52)

A display device including:

(i) a frame adapted to be mounted on a head of an observer; and (ii) an image display device installed to the frame, wherein the image display device includes (A) an image forming device, and (B) an optical device on which light emitted from the image forming device is incident, and from which the light is emitted to a pupil of the observer, the display device further including:

(iii) a dimmer disposed in an area of the optical device from which at least light is emitted, and adapted to adjust a quantity of light incident from an outside, and the dimmer includes a first substrate facing the optical device and a second substrate facing the first substrate, electrodes respectively provided in the first substrate and in the second substrate, and a light transmission control material layer sealed between the first substrate and the second substrate, the first substrate also serves as a component member of the optical device, and the dimmer starts a change of light transmittance after elapse of a predetermined time from a start of a change of the quantity of light from an outside.

(53) The display device according to (52), wherein the second substrate is thinner than the first substrate.

It should be understood by those skilled in the art that various modifications, combinations, sub-combinations and alterations may occur depending on design requirements and other factors insofar as they are within the scope of the appended claims or the equivalents thereof.

Some embodiments may comprise a non-transitory computer readable storage medium (or multiple non-transitory computer readable media) (e.g., computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of processor-executable instructions) that, when executed on one or more computers or other processors, perform methods that implement the various embodiments discussed above. As is apparent from the foregoing examples, a non-transitory computer-readable storage medium may retain information for a sufficient time to provide computer executable instructions in a non-transitory form.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as one or multiple additional items.

REFERENCE SIGNS LIST

10 Frame
11 Front section
12 Hinge
13 Temple section
14 End cover section
15 Wire (signal line, power line, and the like)
16 Headphone section
17 Headphone section wire
18 Control device (control circuit)
18A Light control device
19 Installation member
20 Observer
21 pupil
100, 200, 300, 400, and 500 Image display device
111, 111A, 111B, 211 Image forming device
112 Optical system (Collimating optical system)
113 and 213 Housing
120 and 320 Optical device (light guide unit)
121 and 321 Light guide plate
122 and 322 First surface of light guide plate
123 and 323 Second surface of light guide plate 124 and 125 A part of light guide plate
126 and 326 Protection member (protection plate)
127 and 327 Adhesive member
130 First deflection unit
140 Second deflection unit
330 First deflection unit (first diffraction grating member)
340 Second deflection unit (second diffraction grating member)
150 Reflective spatial light modulator
151 Liquid crystal display device (LCD)
152 Polarized beam splitter
153 Light source
251 Light source
252 Collimating optical system
253 Scanning section
254 Optical system (relay optical system)
255 Cross prism
256 Totally reflected mirror
520 Optical device (semi-transmission mirror)
521 Transparent member
700, 700A, and 700' Dimmer
701, 701A, and 701' First substrate
702, 702A, and 702' First electrode
703, 703A, and 703' Second substrate
704, 704A, and 704' Second electrode
705, 705A, and 705' Light transmission control material layer
706 Sealant
707 Adhesive
711 Light receiving element
712 Illumination sensor (transmitted light illumination measuring sensor)
713 and 714 sealing member
810, 820, and 830 Shielding member

The invention claimed is:

1. A display device, comprising:
a first image display device comprising a light guide plate;
a dimmer; and
a light control device including a moving speed calculation unit configured to calculate a moving speed of the display device, wherein the light control device is configured to:
identify a start time of change in quantity of light received by the display device; and
control transmissivity of the dimmer based on a quantity of light received by the display device, after a predetermined amount of time after the identified start time has elapsed, and based on the moving speed of the display device.

2. The device of claim 1, wherein the light control device is configured to identify the start time as a time when the quantity of light received by the display device exceeds a threshold.

3. The display device of claim 1, wherein the display device further comprises:
a frame configured to be mounted on a head of a user, wherein the first image display device is installed in the frame.

4. The display device of claim 1, wherein the display device further comprises:
a second image display device,
wherein the first image display device is configured to provide light to an eye of a user and the second image display device is configured to provide light to another eye of the user.

5. The display device of claim 1, wherein the first image display device comprises:
an image forming device comprising a plurality of pixels, the image forming device configured to display an image.

6. The display device of claim 5, wherein the first image display device further comprises:
an optical system configured to collimate light emitted from the first image forming device.

7. The display device of claim 5, wherein the first image display device further comprises:
an optical device configured to receive light emitted from the image forming device and to emit light to an eye of a user,
wherein the optical device comprises the light guide plate.

8. The display device of claim 7, wherein the optical device further comprises:
a first deflection unit configured to deflect light incident on the light guide plate so that the light incident on the light guide plate is substantially reflected inside the light guide plate.

9. The display device of claim 8, wherein the optical device further comprises:
a second deflection unit configured to deflect light propagated inside the light guide plate with total reflection over a plurality of times so as to allow the light propagated inside the light guide plate to be emitted from the light guide plate.

10. The display device of claim 9, wherein the first and second deflection units are disposed inside the light guide plate.

11. The display device of claim 7, further comprising:
a shielding member configured to shield incident light to the optical device,
wherein the shielding member is arranged in an area of the optical device on which the light emitted from the image forming device is incident.

12. The display device of claim 11, wherein the dimmer is disposed on a side substantially opposite the image forming device so as to overlap with the shielding member.

13. The display device of claim 1, wherein the dimmer comprises an optical shutter.

14. The display device of claim 1, wherein the display device is a head-mounted display device.

15. A display device, comprising:
a first image display device comprising a light guide plate;
a dimmer; and
a light control device configured to:
identify a start time of change in a quantity of light received by the display device;
determine a rate of change of a quantity of light passing through the dimmer; and
control transmissivity of the dimmer based on quantity of light received by the display device after a predetermined amount of time after the start time has elapsed, the determined rate of change of the quantity of light, and by using a table storing a respective value indicative rate of change of dimmer transmissivity for each of a plurality of rates of change of quantity of light.

* * * * *